US006288206B1

(12) United States Patent
Stewart et al.

(10) Patent No.: US 6,288,206 B1
(45) Date of Patent: Sep. 11, 2001

(54) CHIRAL POLYMER COMPOSITIONS EXHIBITING NONLINEAR OPTICAL PROPERTIES

(75) Inventors: Kevin R. Stewart, Schenectady; Janet L. Gordon, Clifton Park; Kwok Pong Chan, Troy; David G. Gascoyne, Schenectady; Feng Pan, Clifton Park, all of NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

(21) Appl. No.: 09/432,312

(22) Filed: Nov. 2, 1999

Related U.S. Application Data
(60) Provisional application No. 60/123,516, filed on Mar. 8, 1999.

(51) Int. Cl.$^7$ .................................................. C08G 64/00
(52) U.S. Cl. .......................... 528/201; 528/205; 528/211; 528/219; 528/422
(58) Field of Search ..................................... 528/204, 205, 528/211, 219, 422

(56) References Cited

U.S. PATENT DOCUMENTS

| | | | |
|---|---|---|---|
| 4,755,574 | 7/1988 | Choe | 526/258 |
| 4,879,421 | 11/1989 | Kazlauskas | 568/737 |
| 5,207,952 | 5/1993 | Griffin, III | 252/582 |
| 5,359,008 | 10/1994 | Amano et al. | 525/295 |
| 5,708,178 | 1/1998 | Ermer et al. | 546/276.7 |
| 5,777,063 | 7/1998 | Gordon et al. | 528/74 |
| 5,856,422 | 1/1999 | Chan et al. | 528/125 |
| 5,883,218 | 3/1999 | Gordon et al. | 528/202 |

FOREIGN PATENT DOCUMENTS

| | | |
|---|---|---|
| 0 338 845 | 10/1989 | (EP) . |
| 0 351 832 | 1/1990 | (EP) . |
| WO 90/02348 | 3/1990 | (GB) . |

OTHER PUBLICATIONS

F. Cherioux et al., "New Third–Order Nonlinear Polymers Functionalized with Disperse Red and Disperse Orange Chromophores with Increased Stability" *Chem Mater.* 2921–27 (1997).

T. Verbiest et al., "Second–Order Nonlinear Optical Properties of a Chromophore–Functionalized Polypeptide", *Adv. Mater.* 756–59 (1996).

Seth R. Marder and Joseph W. Perry, "Nonlinear Optical Polymers: Discovery to Market in 10 Years?" *Science 263*, 1706–07 (Mar. 25, 1994).

David Bradley, "Plastics That Play on Light," *Science 261*, 1272–73 (Sep. 3, 1993).

S. Hagishita et al., "Optical Activity of Bis–1, 1'–spiroindanes. I. Optical Resolution and Absolute Configuration," *Bull. Chem. Soc. Jpn.* 44, 496–505 (Feb. 1971).

R. S. Cahn et al., "Specification of Molecular Chirality," *Angew. Chem. Int. Ed. Engl. 5*, 385–416 (1966).

Romas J. Kazlauskas, "Resolution of Binaphthols and Spirobiindanols Using Cholesterol Esterase," *J. Am. Chem. Soc. 111*, 4953–59 (1989).

C. G. Overberger et al., "Optical Properties of Inherently Dissymmetric Polyamides," *J. Polym. Sci.: Part. A–1 9*, 1139–51 (1971).

Q. Mi, et al., "Optically Active Aromatic Polyimides Having Axially Dissymetric 1,1'–Binaphthalene–2,2'–diyl Units," *Macromolecules 29*, 5758–59 (1996).

F. Kondo et al., "Synthesis and Photoinduced Transformation of a New Helical Aromatic Polyamide," *Polym. Prepr.*, 209–10 (Sep. 1997).

W. S. Huang et al., "Development of Highly Enantioselective Polymeric Catalysts Using Rigid and Sterically Regular Chiral Polybinaphthols," *J. Am. Chem. Sci.*, 4313–14 (1997).

T. Verbiest et al., "Nonlinear Optical Activity and Biomolecular Chirality," *J. Am. Chem. Soc. 116*, 9203–05 (1994).

M. Kauranen et al., "Second–Harmonic Generation from Chiral Surfaces," *J. Chem. Phys. 101*, 8193–99 (Nov. 1, 1994).

M. Kauranen et al., "Chirality Effects in Second–Order Nonlinear Optics," *Photoactive Organic Materials 129–44* (F. Kajzar et al. eds., 1996).

H. Ashitaka et al., "Chiral Optical Nonlinearity of Helicenes," *Nonlinear Optics 4*, 281–97 (1993).

P. Kaatz et al., "Relaxation Processes in Nonlinear Optical Polymide Side–Chain Polymers," *Macromolecules 29*, 1666–78 (1996).

Special Polymers for Electronics and Optoelectronics 151 (J. A. Chilton and M. T. Goosey, eds., 1995).

C. R. Moylan et al., "(Dicyanomethylene)pyran Derivatives with $C_{2v}$ Symmetry: An Unusual Class of Nonlinear Optical Chromphores," *J. Am. Chem. Soc. 118*, 12950–55 (1996).

C. C. Teng and H. T. Man, "Simple Reflection Technique for Measuring the Electro–Optic Coefficient of Poled Polymers," *Appl. Phys. Lett. 56*, 1734–36 (Apr. 30, 1990).

(List continued on next page.)

*Primary Examiner*—Duc Truong
(74) *Attorney, Agent, or Firm*—Heslin Rothenberg Farley & Mesiti P.C.; Martha L. Boden, Esq.

(57) ABSTRACT

Chiral organic polymers doped with or appended by nonlinear optical dyes are disclosed. The use of chiral polymers produces a more stable noncentrosymmetric environment for the dye molecules resulting in unexpectedly long relaxation times as compared with previously used organic polymers. In addition, the NLO/chiral polymer materials exhibit high electro-optical coefficients ($r_{33}$), high nonlinear optical coefficients ($d_{33}$), improved long-term thermal stability, and at the same time retain the processing advantages associated with organic polymers. Thus, the present NLO/chiral polymer materials are extremely well-suited for use in second-order nonlinear optical and optoelectronics devices.

45 Claims, No Drawings

OTHER PUBLICATIONS

B. P. Bespalov et al., "Chemistry of Quinomethides: II. Reaction of 7,7,8,8–Tetracyanoquinodimethide with Aromatic Amines," *J. Org. Chem. USSR (Engl. transl.)* 1072–77 (1974).

V. P. Rao et al., "Achieving Excellent Tradeoffs among Optical, Chemical and Thermal Properties in Second–Order Nonlinear Optical Chromphores," *Chem. Commun.*, 1237–38 (1996).

M Sukwattanasinitt et al., "A Convenient Introduction of NLO Chromphores into Electron–Rich Acetylenic Polymers," *ACS Polym. Preprints 36*, 497–98 (1995).

H, Saadeh et al., "Polyimides with Diazo Chromophore Exhibiting High Thermal Stability and Large Electrooptic Coefficients," *Macromolecules 30*, 5403–07 (1997).

H. Moorlag and A. I. Meyers, "An Asymmetric Synthesis of a $C_2$ Symmetric Tetrasubstituted Biaryl: 2,2'–Dihydroxy–6, 6'–Dimethyl–1,1'–Biphenyl, A Stable Chiral System," *Tetrahedron Lett. 34*, 6993–96 (1993).

Horst Neudeck and Karl Schlögl, "Darstellung Optisch Aktiver, 5,5'–disubstituierter 2,2'–Spirobiindane zur Überprüfung von Näherungsansaätzen für Chiralitätsfunktionen," *Chem. Ber. 110 2624–39* (1977).

Fumio Toda and Koichi Tanaka, "Efficient Optical Resolution of 2,2'–Dihydroxy–1,1'–binaphthyl and Related Compounds by Complex Formation with Novel Chiral Host Compounds Derived from Tartaric Acids," *J. Org. Chem. 53*, 3607–09 (1988).

Y. B. Kozlikovskii et al., "Condensation of Phenol with Methyl Ethyl and Diethyl Ketones in the Presence of Aluminum Phenolate," *J. Org. Chem. USSR (Engl. transl.)* 556–62 (1987).

Xiaoming Wu and Alex K.–Y. Jen, "Synthesis of Novel Stable Nonlinear Optical Chromophores," *ACS Polym. Preprints 9*, 1091–92 (1998).

CHIRAL POLYMER COMPOSITIONS EXHIBITING NONLINEAR OPTICAL PROPERTIES

CROSS REFERENCE TO RELATED APPLICATION

This application claims the priority of U.S. Provisional Patent Application Ser. No. 60/123,516, filed Mar. 8, 1999, the disclosure of which is incorporated herein by reference.

The following invention was made with Government support under contract number F33615-95-C-5432 awarded by the United States Air Force. The Government has certain rights in this invention.

FIELD OF THE INVENTION

The present invention relates to chiral polymer compositions having nonlinear optical properties, and more particularly to chiral polymers doped with or appended by second order nonlinear optical materials.

BACKGROUND OF THE INVENTION

A considerable amount of research has been directed toward the development of organic polymeric materials which exhibit second-order nonlinear optical (NLO) and linear electro-optical (EO) properties. Such materials are useful in the production of efficient, ultrafast, and low voltage electro-optical devices, such as modulators, switches, and tunable filters, to name a few. Among the advantages of incorporating organic polymers into electro-optical devices over traditional materials, such as inorganic-based crystals, include ease of processing and device fabrication with low production costs. To be useful in electro-optical devices, organic polymeric materials must exhibit high NLO coefficients, demonstrate good long-term stability of the NLO or EO effect, have good structural and chemical stability, and show low optical propagation losses.

In general, organic polymers exhibiting nonlinear optical and electro-optical properties are produced by incorporating into the polymer a dye chromophore having nonvanishing microscopic hyperpolarizability and macroscopic polar order. Such dyes must possess strong optical nonlinearities along a single charge transfer axis, a requirement which can be met by including a donor group at one end of a π-conjugated electron system and an acceptor group at the other end.

Incorporation of these nonlinear optical chromophores (dyes) into polymers can be accomplished by dissolving the chromophore into a polymer host (guest/host systems), by covalent bonding of the chromophore as a sidechain onto the polymer backbone or main chain, or by using the chromophore to cross-link polymer chains. Because guest/host systems are the simplest NLO polymer systems to create, many guest/host systems have been investigated, with poly (methyl methacrylate) or polystyrene as the most prominent hosts together with typical donor-acceptor substituted chromophores, such as N-ethyl-N-hydroxyethylamino-nitroazobenzene. See, for example, D. Burland et al., *Chem. Rev.* 94, 31–75 (1994); see also S. R. Marder & J. W. Perry, *Science* 263 1706–1707 (1994). In addition, second-order nonlinear optical properties of dye-attached polymers were disclosed by Amano et al. in U.S. Pat. No. 5,359,008 and were reported by P. Kaatz et al., *Macromolecules* 29, 1666–1678 (1996). Examples of such dye-appended polymers include azo-dye-attached poly(methyl methacrylate) and polyimides, stilbene-dye attached poly(methyl methacrylate), and dye-appended polysiloxanes, polyacrylates, polyesters, polyurethanes, polyamides, polystyrenes, polycarbonates, polyethers, and the like.

To enhance second-order nonlinear optical properties, dye-containing polymers are typically "poled". In the technique of "poling", an external electric field is applied to break the isotropic symmetry of the polymers during which the NLO dye chromophores are aligned by coupling to their dipole moment. This poling procedure imposes noncentrosymmetry on the polymer material. The desired noncentrosymmetry is most easily induced at temperatures close to the glass transition temperature, $T_g$, of the polymer because of the increased mobility of the NLO dye molecules in the softening polymer matrix. Cooling is then performed in the presence of the applied electric field, which results in the formation of a polymer glass at the lower temperatures. A temperature-stable and oriented system is thereby provided.

To meet device stability requirements, polymers having a very high glass transition temperature ($T_g>150°$ C.) are typically chosen, and very large dyes having a high melting point are typically appended to or mixed with the polymer. It is important for use in second-order nonlinear optical applications that the poled polymers remain in their poled configuration over time, and in general, a polymer having a high $T_g$ provides a stronger frame to prevent relaxation of the aligned dyes which were poled by the electrical field. Thus, a nonlinear optical/electro-optical polymer with a higher $T_g$ usually has a slower relaxation time at a given temperature. However, in many known polymers, such as poly(methyl methacrylate)-based compositions, the alignment is thermodynamically unstable and decays quickly, resulting in greatly reduced nonlinearity.

In addition to thermal stability requirements, electro-optical devices require polymeric compositions which have high NLO and EO coefficients, thereby necessitating the use of dyes exhibiting high NLO and EO activity. However, the trade-off is that dyes exhibiting high activity normally have lower thermal stability, thereby limiting the poling temperature. Additionally, at high temperatures, device processes such as generating channel waveguides become more difficult than at lower temperatures.

Thus, a need exists for NLO and EO organic polymer compositions which exhibit not only high $T_g$'s but also improved long-term stability at elevated temperatures. Such polymeric materials should also exhibit large electro-optical and nonlinear optical coefficients, comparable to those of inorganic crystals such as lithium niobate, but without the associated drawbacks, i.e. difficulty in growing, vulnerability to cracking, and high expense. Organic polymers fulfilling these requirements would be useful in the development of optoelectronics devices having higher data rates, all optical as well as electro-optical switching, and high parallel capacity logic functions. In addition, such polymers would be useful in the development of fiber optic communications systems and optical computation and parallel optical image processing systems.

The novel chiral polymer compositions of the present invention, which include nonlinear optical chromophores incorporated therein, meet the aforementioned needs.

SUMMARY OF THE INVENTION

The present invention is based on the unexpected discovery that noncentrosymmetric chiral organic polymers coupled with nonlinear optical dyes exhibit high nonlinear optical and electro-optical coefficients making the materials desirable for use in very fast and high capacity processing systems, such as nonlinear optical and optoelectronics devices. In addition, the chirality of the polymer framework results in unexpectedly long relaxation times for the present materials as compared with other dye/polymer compositions. As an added benefit, the novel chiral nonlinear optical/electro-optical polymers of the present invention exhibit similar properties to those associated with high molecular weight polymers, such as excellent mechanical strength, high thermal stability, hydrolytic resistance, and excellent processability. Thus, the present polymers and polymer materials are more desirable than either inorganic crystals or prior art organic polymers for use in optoelectronics devices.

In one aspect, the present invention is therefore a chiral polymer material which exhibits nonlinear optical properties. The chiral polymer material comprises a chiral polymer backbone and a nonlinear optical component. The nonlinear optical component is in admixture with the chiral polymer backbone or is chemically bonded to the backbone of the chiral polymer as a pendent sidegroup and comprises an electron donating group and an electron accepting group chemically connected by a continuous π electron chain. When the nonlinear optical component is a pendent sidegroup, and optionally, when the nonlinear optical component is in admixture, then the chiral polymer backbone comprises structural units which contain a chiral moiety derived from a chiral diol compound. Typically, the material exhibits an electro-optical coefficient of at least 5 pm/V.

Another aspect of the present invention is directed to a chiral polymer material exhibiting nonlinear optical properties, which includes a nonlinear optical component, as described above, and a chiral polymer backbone comprising structural units containing a chiral moiety derived from a chiral bisphenol compound. The nonlinear optical component may be in admixture with the chiral polymer or may be chemically bonded to the backbone of the chiral polymer as a pendent sidegroup. Preferably, the chiral bisphenol moiety included in the chiral polymer backbone is selected from the group having structures (IA), (IB), (IIA), (IIB), (IIIA), (IIIB), (IVA), (IVB), (VA), (VB), (VIA), (VIB), (VIIA), and (VIIB).

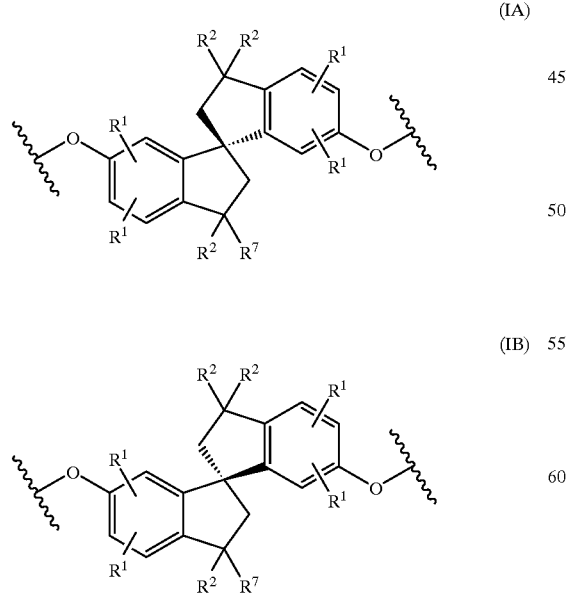

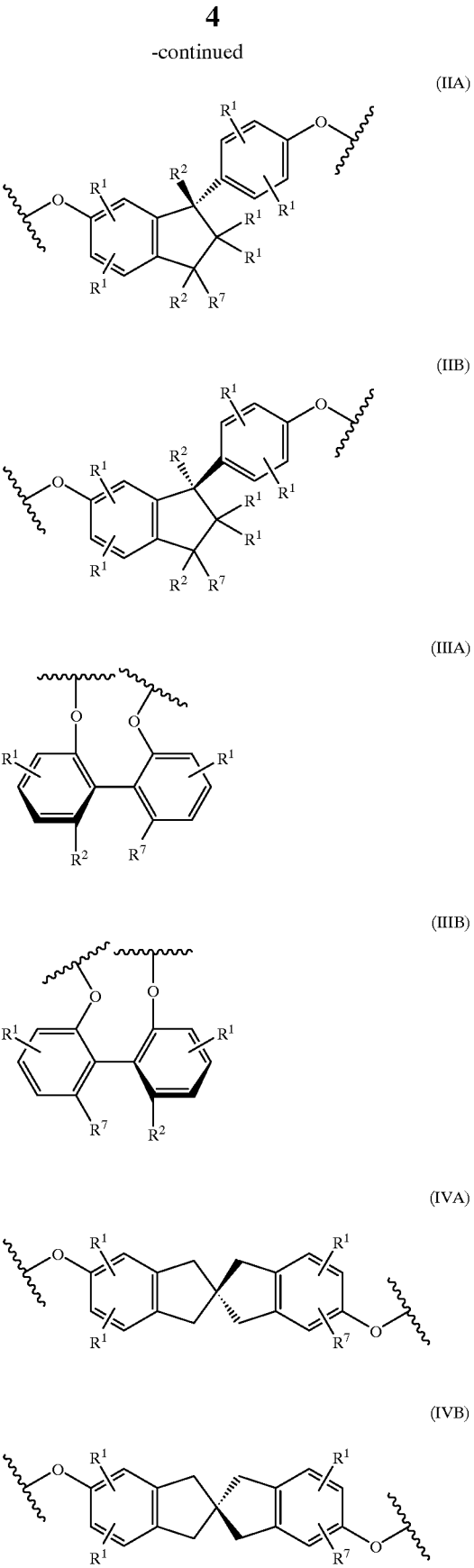

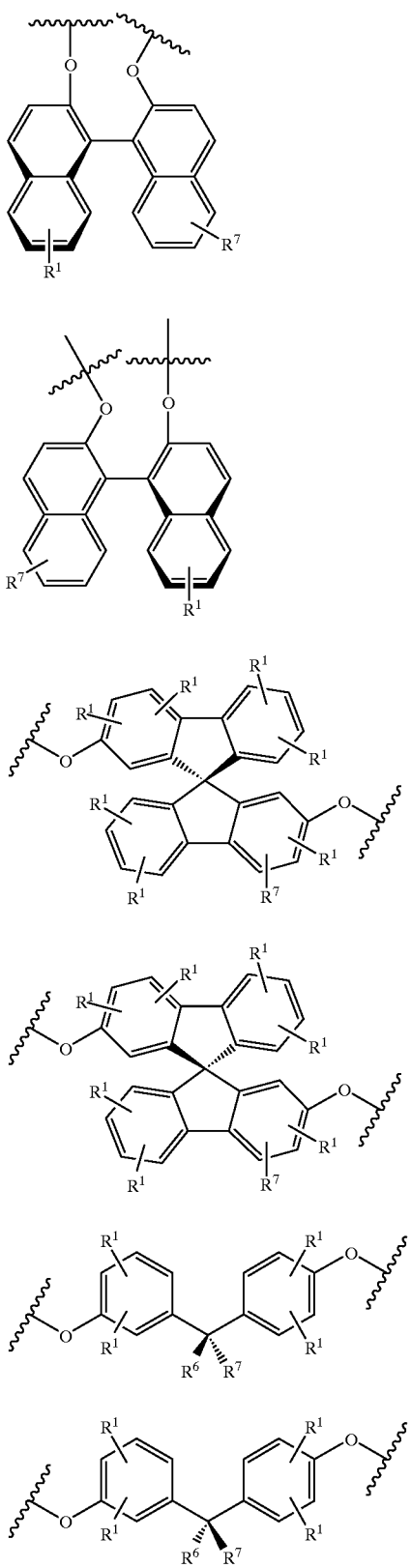

(VA)
(VB)
(VIA)
(VIB)
(VIIA)
(VIIB)

In the structural moieties above, as well as those below, use of a wavy line "⌇⌇⌇" indicates the point of attachment of the moiety to the polymer backbone. Each $R^1$, $R^2$, $R^6$, and $R_7$ substituent of chiral structural moieties (IA), (IB), (IIA), (IIB), (IIIA), (IIIB), (IVA), (IVB), (VA), (VB), (VIA), (VIB), (VIIA), and (VIIB), and in the structures depicted and described below, is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or deuterated equivalents thereof. However, when the nonlinear optical sidegroup is bonded to the chiral structural moiety of the polymer backbone forming an appended chiral polymer, $R^7$ may be a radical through which the sidegroup is bonded. In addition, $R^6$ differs from $R^7$.

The chiral/nonlinear optical materials which include moieties (IA), (IB), (IIA), (IIB), (IIIA), (IIIB), (IVA), (IVB), (VA), (VB), (VIA), (VIB), (VIIA), or (VIIB) have long relaxation times and high electro-optical and nonlinear optical coefficients. Generally, the electro-optical coefficients are at least 5 pm/V. In the doped chiral polymers, a concentration ranging from about 1 wt. % to about 40 wt. % nonlinear optical component is preferred, and a range from about 5 wt. % to about 35 wt. % is more preferred. In the dye-appended chiral polymers, preferably, from about 1% by mole to about 100% by mole of the monomers are appended with a nonlinear optical component, and more preferably, from about 10% by mole to about 50% by mole of the monomers are appended.

DESCRIPTION OF THE PREFERRED EMBODIMENTS

To restate, the present invention relates to novel nonlinear optical chiral polymer compositions, which are of the guest-host type and composed of dye-doped chiral polymers prepared by physical mixing, and the invention also relates to novel nonlinear optical chiral polymers, which are appended by electro-optical dyes covalently bonded as sidechains to the backbone of the chiral polymers. Typically, the novel materials are poled by an electric field at temperatures close to the glass transition temperature ($T_g$), and slow electro-optical decay is observed. Hence, because of their higher stability, the poled dye-doped and appended chiral polymers are especially useful for long term electro-optical applications. In addition, the second-order nonlinear optical chiral polymer materials exhibit high nonlinear optical and electro-optical coefficients and are therefore useful in any application which requires second-order nonlinear optical properties, such as in optical switches, optical modulators, or wavelength tranducers, for example.

The doped chiral polymer compositions of the present invention include any chiral polymer in admixture with any nonlinear optical chromophore or dye. The dye-appended chiral polymer compositions comprise a chiral polymer backbone, which contains optically pure chiral moieties derived from chiral diol compounds, and NLO dye residues, which are covalently bonded to the chiral polymer as sidechains.

As used herein, "chiral" refers to asymmetric molecules, polymers, residues, or moieties thereof, the mirror images of which are nonsuperimposable and which are related like right and left hands. Each mirror image is referred to herein as an "enantiomer". Chiral materials are characterized as exhibiting "optical activity", which refers to the ability to change the direction of the plane of polarized light to either the right or left as it passes through the material. The term "chiral polymer" refers to an optically active polymer. Typically, a chiral polymer is prepared from a single enantiomer of a starting monomer. By contrast, a racemic polymer, which is derived from an equal mixture of monomeric enantiomers, is normally centrosymmetric and has no net dipole.

It should be noted that the examples included herein are for illustrative purposes only, and that the invention is in no way limited to the embodiments used in the examples. As would be obvious to one of skill, the examples that follow can be repeated substituting other chiral bisphenols and other NLO dyes. In addition, unless otherwise indicated, the reactants and reagents used in the reactions described herein are readily available materials. Such materials can be conveniently prepared in accordance with conventional preparatory procedures or obtained from commercial sources. Deuterated compounds for use in the preparation of deuterated polymeric and dye materials may be prepared using deuterated reactants in the reactions.

"Alkyl", as used herein, refers to saturated hydrocarbon residues containing twenty or fewer carbons in straight or branched chains, as well as cyclic structures, which are referred to as "cycloalkyl". "Alkoxy", alone or in combination, refers to the same residues, containing, in addition, and oxygen atom at the point of attachment. "Alkenyl" refers to unsaturated aliphatic hydrocarbon residues containing twenty or fewer carbons and having one or more double bonds, and "cycloalkenyl" refers to the cyclic structures. "Aryl" includes phenyl, substituted phenyl, naphthyl and the like; "aryloxy" also includes an oxygen atom at the point of attachment. "Alkoxyalkyl" and "aryloxyalkyl" include methoxymethylene, ethoxymethylene, methoxyetheylene, butoxymethylene, propoxyethylene, phenoxymethylene, phenoxyethylene, and the like; "arylalkyl" and "alkylaryl" include phenylethyl, phenylpropyl, benzyl, methylphenyl, ethylphenyl, and the like. "Haloalkyl" and "haloaryl" include chloromethyl, 3-chloropropyl, 3,4-dichlorophenyl, dichloromethyl, trichloromethyl, fluoromethyl, difluoromethyl, trifluoromethyl, phenoxyphenyl, 4-methylphenyl, 2,4-dimethylphenyl, and the like. In addition, "deuterated" means that at least one hydrogen is replaced with the deuterium isotope. The term "halogen" means fluorine, chlorine, bromine, or iodine. The term "aliphatic" refers to hydrocarbons characterized by a straight- or branched- chain arrangement of constituent carbon atoms. The term "aromatic" refers to unsaturated cyclic hydrocarbons cantaining one or more rings.

Chiral Polymer Backbone

Typically, the chiral polymer materials are chiral polycarbonates, chiral polyurethanes, chiral poly(aryl) esters, and chiral poly(aryl)ethers. Preferably, the chiral polymers include chiral moeities derived from chiral bisphenols, and most preferably chiral moeities (IA), (IB), (IIA), (IIB), (IIIA), (IIIB), (IVA), (IVB), (VA), (VB), (VIA), (VIIA), or (VIIB) above.

Each $R^1$ is preferably hydrogen or deuterium, and each $R^2$ is preferably and alkyl group such as methyl, a halogenated alkyl group, such as trifluoromethyl, or a deuterated equivalent thereof. In the doped polymers, $R^7$ is preferably hydrogen or deuterium in chiral moieties (IIIA), (IIIB), (IVA), (IVB), (VA), (VB), (VIA), (VIB), but in chiral moieties (IA), (IB), (IIA), (IIB), (VIIA), and (VIIB), $R^7$ (as well as $R^6$ in (VIIA), and (VIIB)) is preferably an alkyl group such as methyl, a halogenated alkyl group, such as trifluoromethyl, or a deuterated equivalent thereof. Furthermore, as stated above, $R^6$ differs from $R^7$. $R^7$ may instead be a radical through which the sidegroup is bonded when the nonlinear optical dye is appended as a sidegroup to the chiral moiety in the polymer backbone.

most often, the chiral spirobiindane moieties (IA) and (IB) are derived from the enantiomers of 6,6'-dihydroxy-3,3,3',3'-tetramethyl spirobiindane, also referred to herein as "SBI", wherein $R^2$ and $R^7$ are methyl, and $R^1$ is hydrogen. SBI is usually used as the starting material due to its ease in preparation and the commercial availability and low cost of 2,2-bis(4-hydroxyphenyl) propane, which is commonly known as and referred to herein as "bisphenol-A" or "BPA". SBI is represented by the following structure:

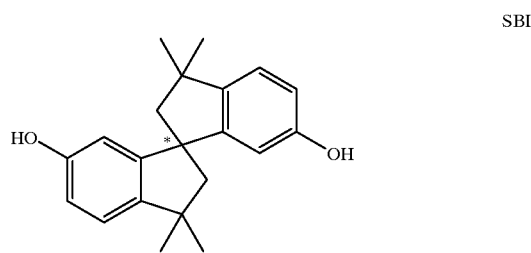

SBI wherein the asterisk (*) represents the chiral axis of rotation.

The optical rotational orientations and absolute configurations associated with structural moieties (IA) and (IB) derived from the enantiomers of SBI are, respectively, (R)(+) and (S)(−). Thus, as used herein, "(R)(+)-SBI" refers to (R)(+)-6,6'-dihydroxy-3,3,3',3'-tetramethyl spirobiindane or its associated derivatives, and "(S)(−)-SBI" refers to (S)(−)-6,6'-dihydroxy-3,3,3',3'-tetramethyl spirobiindane or moieties thereof.

Methods for preparing racemic spirobiindane bisphenols for use in the practice of this invention are disclosed in various references. For example, substituted spirobiindane bisphenols can be conveniently prepared by reacting the appropriately substituted BPA with concentrated hydrochloric acid, as described by Curtis in *J. Chem. Soc.*, 415–418 (1962). In addition, Baker and Besly, *J. Chem. Soc.* 1421–24 (1939), U.S. Pat. No. 2,979,534, and Stueben, *J. Poly. Sci.*, Part A, 3,3209–17 (1965) disclose the conversion of bisphenols, such as BPA, to the corresponding spirobiindanols using sulfuric acid, benzenesulfonic acid, or p-toluenesulfonic acid. The preparation of spirobiindanols using the aforementioned condensation reaction of BPA in the presence of sulfuric acid is reaction in the presence of anhydrous methanesulfonic acid or hydrochloric acid, and U.S. Pat. No. 4,605,789 teaches the reaction in the presence of strong acid cation exchange resins.

Racemic spirobiindanol mixtures may be resolved into their individual enantiomers for use in the present chiral polymers using an esterase catalyzed asymmetric hydrolysis, which is disclosed by Kazlauskas in U.S. Pat. No. 4,879,421 for racemic esters of SBI.

The indane moieties of formulas (IIA) and (IIB), are usually derived from the enantiomers of 5-hydroxy-3-(4-hydroxyphenyl)- 1,1,3-trimethyl indane, which is also referred to herein as "IBP", wherein each $R^1$ is hydrogen, and each $R^2$ and $R^7$ are methyl. IBP is represented by the following structure.

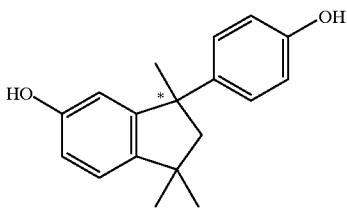

IBP wherein the asterisk (*) represents the chiral carbon.

The absolute configurations corresponding to the structural moieties derived from the enantiomers of IBP are (S)(−) for (IIA), and (R)(+) for (IIB). Thus, as used herein, "(S)(−)-IBP" refers to (S)(−)-5-hydroxy-3-(4-hydroxyphenyl)-1,1,3-trimethyl indane and moieties thereof, and "(R)(+)-IBP" refers to (R)(+)-5-hydroxy-3-(4-hydroxyphenyl)-1,1,3-trimethyl indane and its derivatives.

Substituted and unsubstituted racemic indane bisphenols can be prepared according to the method disclosed in U.S. Pat. No. 4,334,106 by treating iso-propenyl phenol (IPP) or a mixture of its linear oligomers with a stoichiometric excess of organic acid. IPP can be prepared by base catalyzed cracking of BPA. Alternatively, indane bisphenols can be prepared by reacting the corresponding indanamine with sodium nitrite in the presence of aqueous acid as described by J. C. Wilson, *Journal of Polymer Science: Polymer Chemistry Edition* 13, 749–754 (1975). Also, see U.S. Pat. No. 2,979,534. The indanamine can be prepared by the method described by J. C. Petropoulos and J. J. Fisher, *J. Amer. Chem. Soc.* 80, 1938 (1958) from the corresponding carboxy indane compound. As another alternative, the indane bisphenols can be prepared according to the process set forth in commonly assigned patent application entitled "METHOD FOR PREPARING HIGH PURITY INDANE BISPHENOLS", which was filed on Mar. 31, 1998 and corresponds with Attorney Docket No. 0953.044.

Racemic indane bisphenol mixtures may be resolved into their individual enantiomers for use in the present invention using a lipase-catalyzed stereo- and regio-selective hydrolytic process, which is disclosed for the preparation of IBP enantiomers in the commonly assigned U.S. patent application filed Oct. 24, 1997 entitled METHOD FOR PREPARING OPTICALLY ACTIVE 5-HYDROXY-3-(4'-HYDROXYPHENYL)-,1,1,3-TRIMETHYLINDANE corresponding to Attorney Docket No. 0953.031.

Chiral moieties (IIIA) and (IIIB) are typically derived from the enantiomers of 2,2'-dihydroxy-5,5'-dimethylbiphenyl, wherein each $R^1$ is hydrogen, and $R^2$ and $R^7$ are each methyl. Individual bisphenol enantiomers containing the chiral (IIIA) and (IIIB) moieties both substituted and unsubsituted may be prepared according to the aysmmetric synthesis disclosed by H. Moorlag and A. I. Meyers, *Tetrahedron Lett.* 34, 6993–96 (1993). In addition, resolution of bisphenols containing a racemic mixture of moieties (IIIA) and (IIIB) is reported by S. Kanoh et al., *Bull. Chem. Soc. Jpn.* 60, 2307 (1987).

Chiral residues (IVA) and (IVB) are typically derived from substituted and unsubstituted 2,2'-spirobiindanes, such as 2,2'-spirobi[1H-indene]-5,5'-diol, wherein each $R^1$, $R^2$, and $R^7$ is hydrogen. Optical resolution of this group of spirobiindanes into their individual enantiomers containing moieties (IVA) and (IVB) can be achieved by means of (−)-α-phenethylamine, as disclosed by H. Neudeck and K. Schloegl, *Chem. Ber.* 110, 2624–39 (1977).

Racemic mixtures of the diols of (VA) and (VB) may be resolved into their individual enantiomers using an esterase catalyzed asymmetric hydrolysis, which is disclosed by Kazlauskas in U.S. Pat. No. 4,879,421 and in *J. Am. Chem. Soc.* 111, 4953–59 (1989) for [1,1'-binaphthalene]-2,2'-diol. In this exemplary compound, $R^1$ and $R^7$ are both hydrogen, although the invention is not limited to this example.

Optical resolution of racemic diols containing moieties (VIA) and (VIB) can be achieved by complex formation with chiral host compounds derived from tartaric acid. This method is taught by F. Toda and K. Tanaka in *J. Org. Chem.* 53, 3607–09 (1988) for 2,2'-dihydroxy-9,9'-spirobifluorene, where both $R^1$ and $R^7$ are hydrogen in moieties (VIA) and (VIB).

Racemic bisphenol compounds from which chiral moieties (VIIA) and (VIIB) are derived include, for example, 2,4'-(1-methylpropylidene)bisphenol, which can be prepared by the technique described in Y. B. Kozlikovskii et al., *Zh. Org. Khim.* 23 (3), 614–21 (1987)(English translation), wherein each $R^1$ is hydrogen, $R^6$ is methyl, and $R^7$ is ethyl. However, other substituted bisphenols may be used to obtain moieties (VIIA) and (VIIB). The enantiomers may be separated using traditional separation techniques, such as fractional crystallization or HPLC using columns packed with chiral stationary phase. Likewise, traditional separation techniques may be used to resolve any of the other racemic bisphenol mixtures discussed above into their individual enantiomers for use in the present chiral polymer compositions. Deuterated bisphenols are commercially available or may be conveniently prepared in accordance with conventional preparatory procedures.

It should be noted that the present invention is not limited to the use of enantiomeric moieties derived from the preferred chiral bisphenols mentioned above, and that the enantiomers of other substituted bisphenols are equally effective in producing chiral polymers.

The relative molar amounts or mole fractions of the chiral moiety included in the chiral polymers can be selected within the preferred ranges provided below and can be selected for specific applications or to enhance certain properties. For example, the optical rotations increase as the amount of the chiral moiety is increased. Other properties may be found to vary with the relative amount of the chiral monomers contained in the polymers, and one of skill would be able to optimize whichever property is desirable by adjusting the amount of chiral monomer appropriately.

Nonlinear Optical Component

The electro-optical effect of the chiral polymers is enhanced with the addition of the dye chromophore. Conventional nonlinear optical chromophores for use in doping and appending the chiral polymers include dyes having strong electron donors and acceptors and exhibiting large second-order polarizability. A continuous π electron chain chemically connects the electron donors and acceptors. Preferably, the electron donating groups are selected from —SH, —$SR_q$, —OH, —$OR_r$, —$NH_2$, —$NR_sR_t$, or the like, wherein $R_q$, $R_r$, $R_s$, and $R_t$ each represent independently an alkyl group, an aryl group, —$(CH_2)_{n'}$OH, —$(CH_2)_{n''}NH_2$, or —$(CH_2)_{n'''}$ SH, wherein n', n", and n'" each represent an integer independently. Most preferably, the electron donating groups are aliphatic amines, aromatic amines, or combinations of aliphatic/aromatic amines having formula —$NR_sR_t$, as previously defined. Electron accepting groups are preferably selected from —CN, —$NO_2$, —COOH, —$COCH_3$, —CHO, —$CONH_2$, —$CHC(CN)_2$, —C(CN)C(CN)$_2$, a halogen atom or the like. Most preferably, the electron accepting groups will be cyano (—CN), or nitro (—$NO_2$). At least one hydrogen of each group described above may be substituted with a deuterium atom. When the nonlinear optical component is a sidegroup, then the nonlinear optical component is bonded to the chiral polymer backbone via the electron donating group.

Nonlinear optical chromophores useful as sidegroups or useful in doping the chiral polymer include those having structures (NL1) through (NL28).

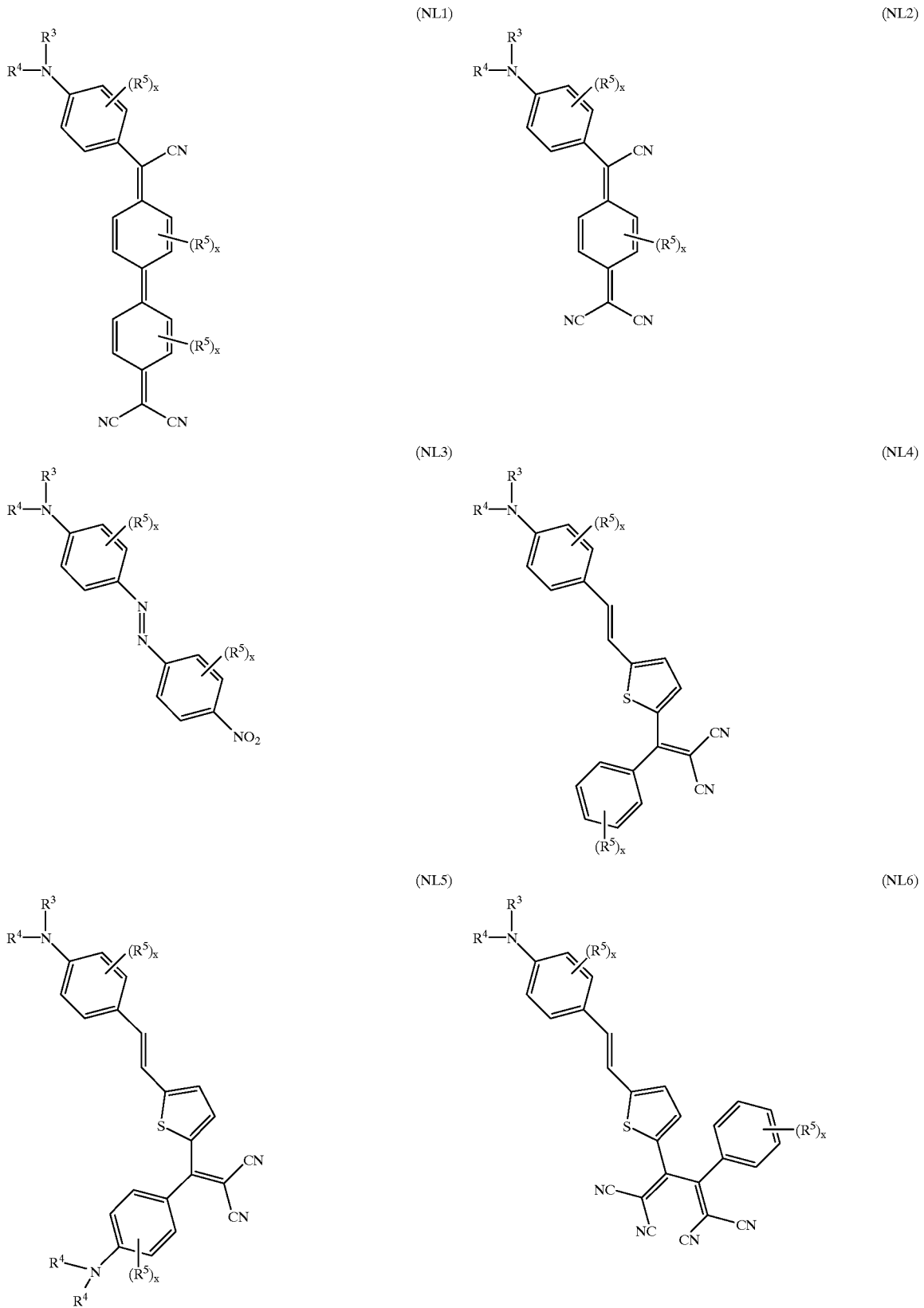

-continued
(NL7)
(NL8)
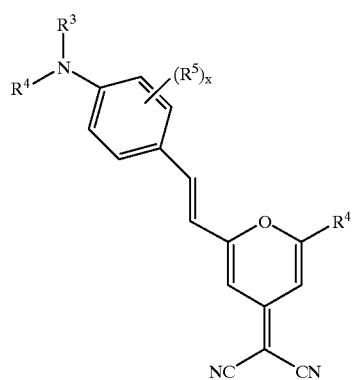
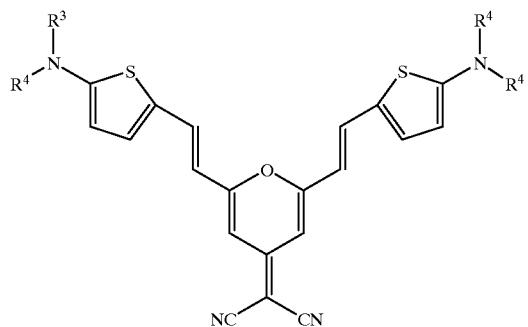
(NL9)
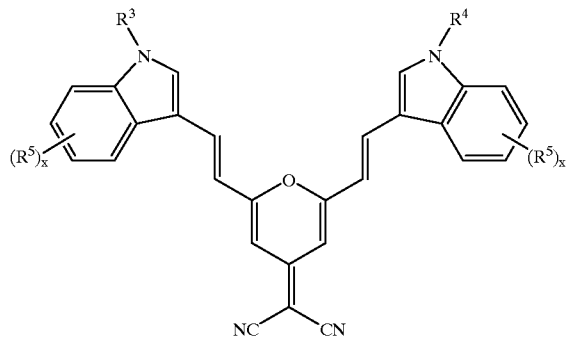
(NL10)
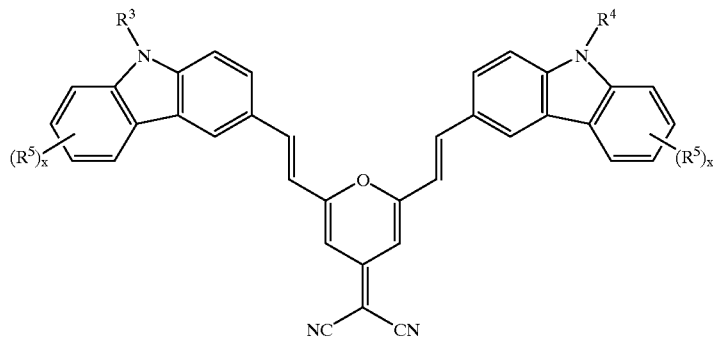
(NL11)

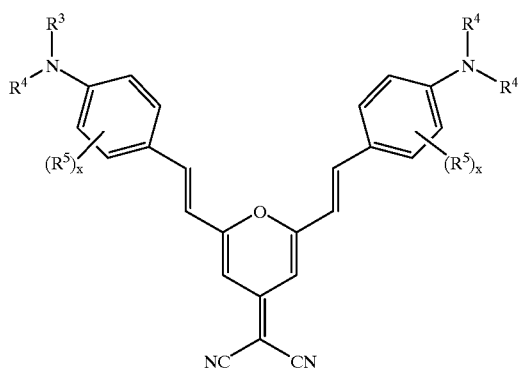
(NL12)
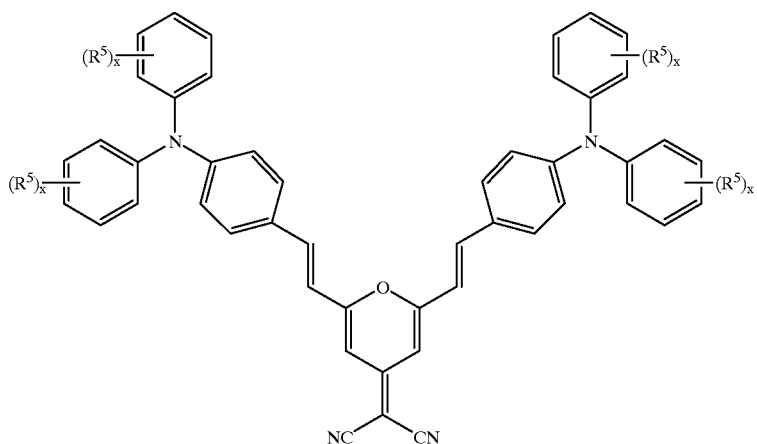
(NL13)
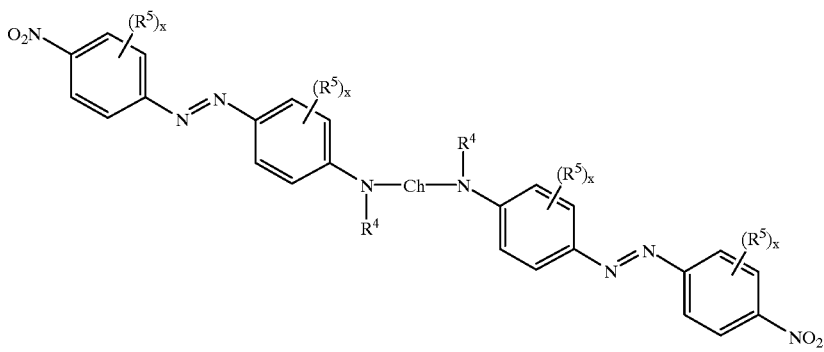
(NL14)
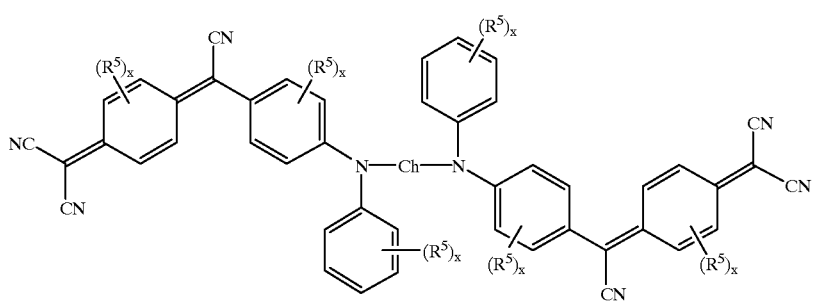
(NL15)

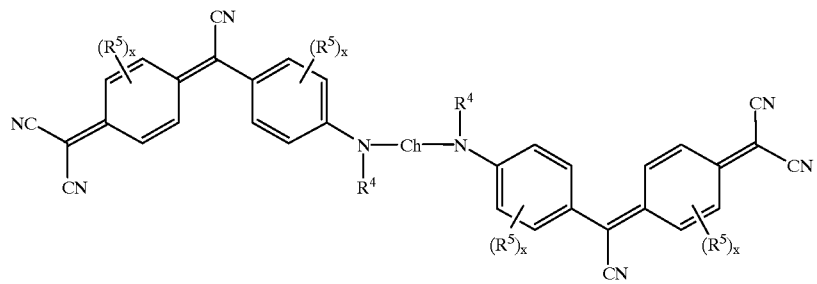
(NL16)
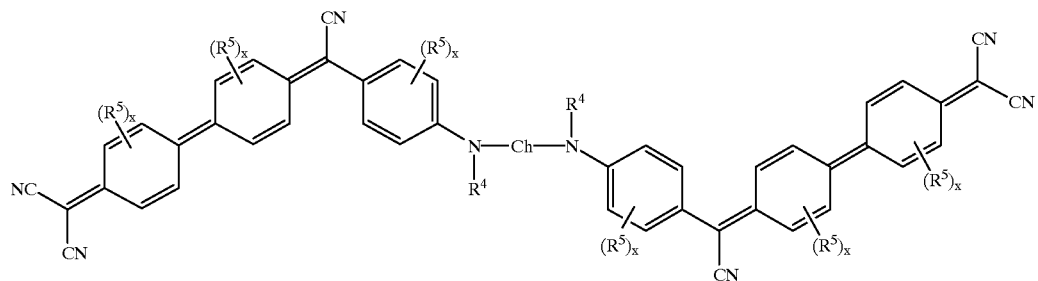
(NL17)
wherein Ch is a chiral residue;
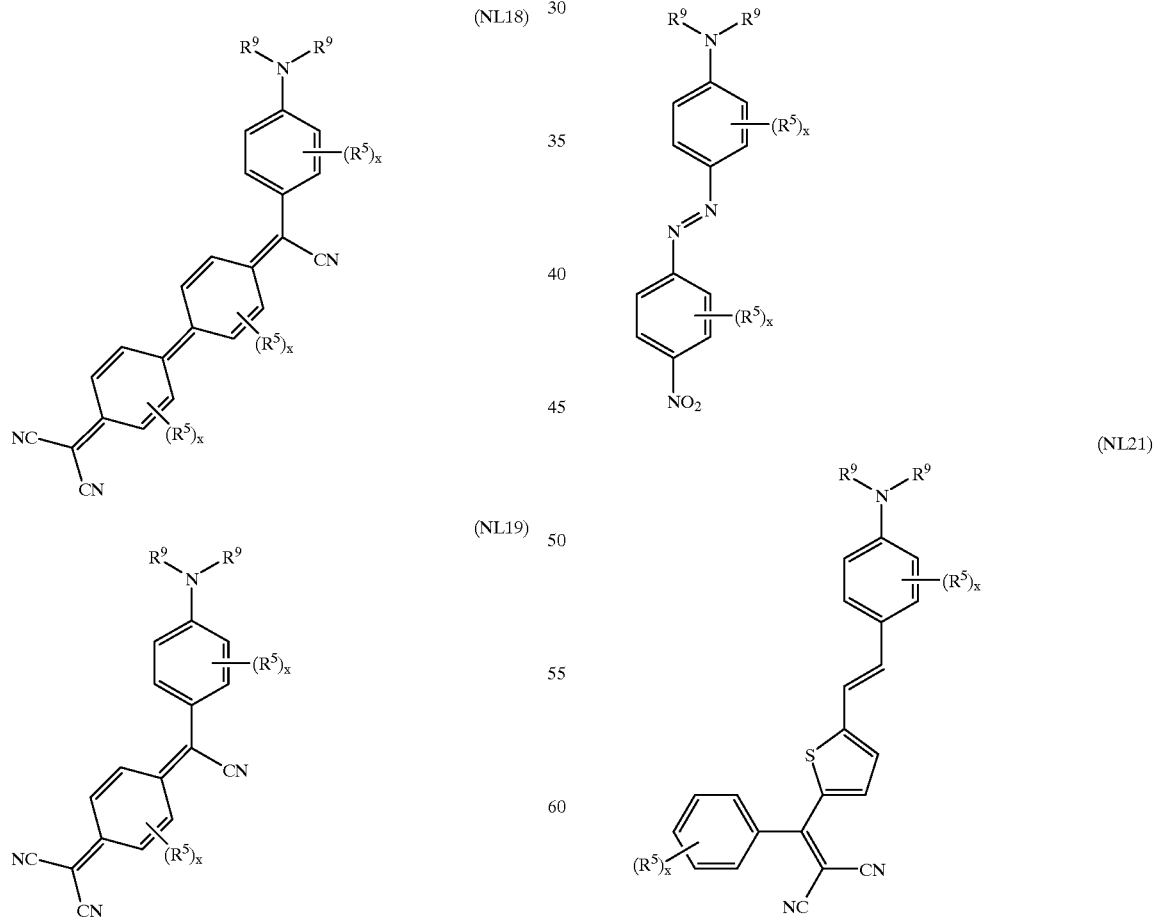

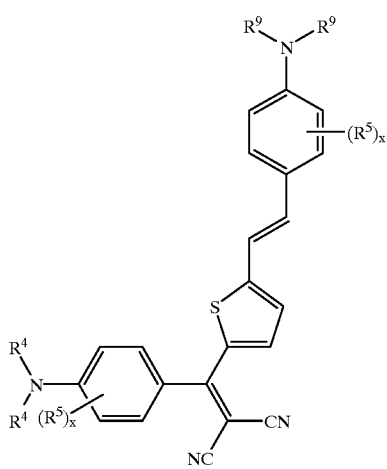
(NL22)
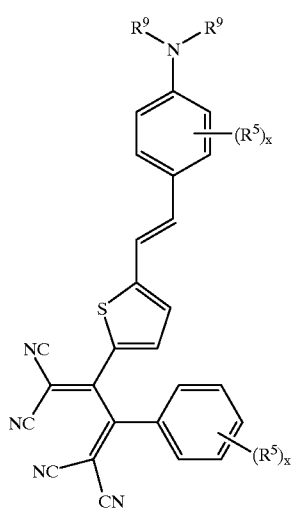
(NL23)
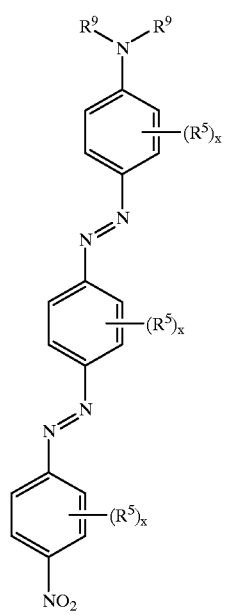
(NL24)
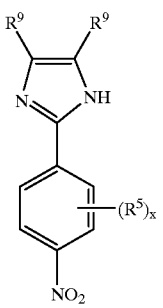
(NL25)
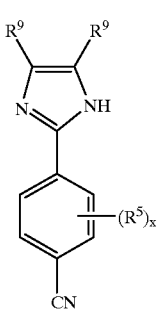
(NL26)
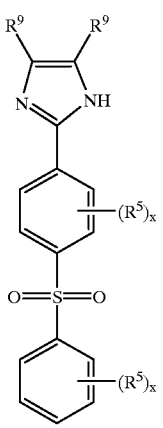
(NL27)
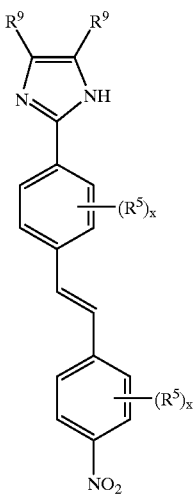
(NL28)

When the nonlinear optical component is a sidegroup, then $R^3$ in structures (NL1)–(NL12) is an alkoxy, alkyl, alkoxyalkyl, or alkyl ester radical, and each $R^9$ in structures (NL18)–(NL28) is independently a radical or an alkyl radical having from 1 to 6 carbon atoms or a deuterated equivalent thereof. However, when the NLO component is a dopant, then $R^3$ in structures (NL1)–(NL12) is hydrogen, deuterium, alkyl, cycloalkyl, alkenyl, cycloalkenyl, aryl, alkylaryl, arylalkyl, or a deuterated equivalent thereof. Furthermore, when the nonlinear optical component is a dopant, it may have one of structural formulae (NL13)–(NL17). Each $R^4$ in structures (NL1)–(NL12), (NL14), (NL16)–(NL17), and (NL22) is independently hydrogen, deuterium, alkyl, cycloalkyl, alkenyl, cycloalkenyl, aryl, alkylaryl, arylalkyl, or a deuterated equivalent thereof. Each $R^5$ in formulae (NL1)–(NL28) is independently deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof; and each "x" is independently 0 or an integer from 1 to 4.

Nonlinear optical chromophores and sidegroups particularly useful in the present invention include tricyanodiphenoquinodimethane dyes and their residues having structural formulae (NL1) and (NL18); tricyanoquinodimethane dyes and their residues having formula (NL2) and (NL19); amino-nitro-azobenzene dyes/residues (NL3) and (NL20); dicyanovinyl dyes (NL4), (NL5), (NL21), and (NL22); tetracyanobutadiene dyes (NL6) and (NL23); [(nitrophenylazo)phenylazo]phenylamine dyes (NL7) and (NL24); and dicyanomethylene pyran dyes and their residues having structural formulae (NL8)–(NL13). Other useful nonlinear optical sidechains include imidazolium dye residues having structures (NL25)–(NL28). In addition, the nonlinear optical chromophores may be chiral dopants, such as chiral amino-nitro-azobenzene dyes of formula (NL14); chiral tricyanoquinodimethane dyes (NL15) and (NL16); and chiral tricyanodiphenoquinodimethane dyes of formula (NL17).

Due to ease in preparation and/or commercial availability, the phenyl groups in the aforemetioned dyes are typically unsubstituted, and each "x" in the representative formula is typically 0. When used as a dopant, a preferred tricyanodiphenoquinodimethane dye (NL1) is 13-[4-(dimethylamino)phenyl]-13,14,14-tricyanodiphenoquinodimethane, wherein $R^3$ and $R^4$ are each methyl. Of the tricyanoquinodimethane dyes, a preferred dopant (NL2) is 7-[4-(dimethylamino)phenyl]-7,8,8-tricyanoquinodimethane, wherein $R^3$ and $R^4$ are each methyl. Methods for preparing tricyanodiphenoquinodimethane and tricyanoquinodimethane dyes are disclosed by Bespalov et al. in *J. Org. Chem. USSR* (*Engl. Transl.*) 10, 1072 (1974). A preferable amino-nitro-azobenzene dye (NL3) is N,N-diphenyl-4-(4-nitrophenylazo)aniline, wherein $R^3$ and $R^4$ are each phenyl in the dopant. N,N-diphenyl-4-(4-nitrophenylazo)aniline may be prepared by the technique described by Prime et al. in *J. Thermal Analysis* 46, 1133 (1996). A dicyanovinyl dye (NL4) is preferably 2-[(5-{(E)-2-[4-(dimethylamino)phenyl]-1-ethenyl}-3-thienyl)(phenyl)methylene]malononitrile, and (NL5) is preferably 2-[[4-(dimethylamino)phenyl](5- {(E)-2-[4-(dimethylamino)phenyl]- 1-ethenyl }-3-thienyl) methylene]malononitrile, wherein $R^3$ and each $R^4$ are methyl in the dopant. These dicyanovinyl dyes may be prepared by the method disclosed in Roa et al., *J. Chem. Soc. Chem. Commun.* 1237(1996). A preferable tetracyanobutadiene dye (NL6) is 2-[(5- {(E)-2-[4-(dimethylamino) phenyl]-1-ethenyl}-3-thienyl)-3-phenyl)-1,3-butadiene-1,1,4,4-tetracarbonitrile, wherein $R^3$ and $R^4$ are both methyl in the dopant. Methods for preparing this tetracyanobutadiene dye are disclosed in Sukwattanasinitt et al., *ACS Polymer Prints* 36, 497 (1995) and Wu et al., *ACS Polymer Prints* 39, 1091(1998). A preferred [(nitrophenylazo)phenylazo] phenylamine dopant (NL7) is N,N-dimethyl-4-[4-(4-nitrophenylazo)phenylazo]aniline, which may be prepared by the method of Saadeh et al., *Macromolecules* 30, 5403–5407 (1997). In this dye, $R^3$ and $R^4$ are both methyl in the dopant.

As for dicyanomethylene pyran dyes, (NL8) is preferably [2-[2-[4-(dimethylamino)phenyl]ethenyl]-6-methyl-4H-pyran-4-ylidene]-propanedinitrile (CAS No. [51325-91-8]), which can be obtained commercially from Aldrich Chemical Co., and wherein each $R^4$ is methyl, and $R^3$ is methyl when the dye is in admixture with the chiral polymer. (NL9) is preferably [2,6-bis[2-[5-(dibutylamino)-2-thienyl]ethenyl]-4H-pyran-4-ylidene]-propanedinitrile, CAS No. [183718-82-3, wherein each $R^4$ is butyl, and $R^3$ is also butyl when used as a dopant. (NL10) is preferably [2,6-bis[2-(1-hexyl-1H-indol-3-yl)ethenyl]-4H-pyran -4-ylidene]-propanedinitrile, CAS No. [168561-24-8], or a residue thereof, wherein $R^3$ and $R^4$ are hexyl in the dopant. (NL11) is preferably [2,6-bis[2-(9-hexyl-9H-carbazol-3-yl)ethenyl]-4H-pyran-4-ylidene]-propanedinitrile, CAS No. [168561-23-7], wherein $R^4$ and $R^3$ are hexyl. (NL12) is preferably either [2,6-bis[2-[4-(dibutylamino)phenyl]ethenyl]-4H-pyran-4-ylidene]-propanedinitrile, CAS No. [168561-19-1], wherein each $R^4$ and $R^3$ are butyl in the dopant or [2,6-bis [2-[4-(diphenylamino)phenyl]ethenyl]-4H-pyran-4-ylidene]-propanedinitrile, wherein each $R^4$ and $R^3$ are phenyl. Likewise, (NL13) is preferably [2,6-bis[2-[4-(diphenylamino)phenyl]ethenyl]-4H-pyran-4-ylidene]-propanedinitrile CAS No. [65891-59-0]. Each of the exemplary compounds and moieties listed above for (NL9)-(NL13), wherein "x" is 0, as well as those having substitution on the phenyl groups, can be prepared according to the method disclosed by Moylan et al., *J. Am. Chem. Soc.* 118, 12950–12955 (1996).

Sidegroups (NL1)–(NL12) and (NL18)–(NL24) may be appended to the polymer under conventional Mitsunobu conditions. In this reaction, an alcohol is coupled with a carboxylic acid in the presence of diethylazodicarboxylate and triphenylphosphine to produce an ester. Thus, when the dye is an alkyl alcohol amine or dialkyl diol amine, it will react with a carboxylic acid located at the $R^7$ or $R^8$ position (as shown below) of the moiety to which it attaches. Each alkyl hydroxy group is located on the nitrogen of the dye at the $R^3$ or $R^9$ position(s) prior to the appendage. The reaction is illustrated in Example 18 below using N-ethyl-N-hydroxyethyl-4-(4-nitrophenylazo)aniline as the dye. Alternatively, when there is no carboxylic acid, the alkyl alcohol(s) of the dye may be coupled with hydroxy group(s) on the polymeric chain to produce an ether. Examples 22 and 24 below illustrate the addition reaction using 7-[(4-methyl-4-hydroxylethylamino)phenyl]-7,8,8-tricyanoquinodimethane and 7-[(4-dihydroxyethylamino) phenyl]-7,8,8-tricyanoquinodimethane, respectively, as the dyes.

The imidazole sidechains (NL25)–(NL28) may be conveniently prepared and added to the polymer chain by combining ammonium acetate, a benzil-containing monomer, and substituted or unsubstituted aromatic aldehydes. For example, (NL25)(x=0) is produced from 4-nitrobenzaldehyde; (NL26)(x=0) from 4-cyanobenzaldehyde; (NL27)(x=0) from 4-phenylsulfonylbenzaldehyde; and (NL28)(x=0) from 2-(4-nitrophenyl)-1-ethenylbenzaldehyde. Example 23 below illustrates this reaction with 4-nitrobenzaldehyde.

Other dopants useful for incorporation into the chiral polymers include nonlinear optical components containing a chiral moiety, such as (NL14)–(NL17). In this embodiment, the nonlinear optical component is in admixture with the chiral polymer and includes a chiral residue which chemically bridges the electron donating group to a second electron donating group. The second electron donating group is preferably selected from the electron donating groups listed above, but most preferably is an amine selected from the group of aliphatic amines, aromatic amines, or combination aliphatic/aromatic amines. The second electron donating group is chemically connected to a second electron accepting group by a continuous π electron chain, and the second electron donating group is as previously listed, but most preferably is a cyano group or a nitro group. The chiral moiety is preferably one of (IA), (IB), (IIA), (IIB), (IIIA), (IIIB), (IVA), (IVB), (VA), (VB), (VIA), (VIB), (VIIA), or (VIIB).

The following examples illustrate the preparation of chiral nonlinear optical components useful in doping the chiral polymers. Use of an asterisk (*) indicates the chiral axis of rotation and also indicates that either enantiomer may be used to form the chiral nonlinear optical component.

EXAMPLE 1

Reaction 1

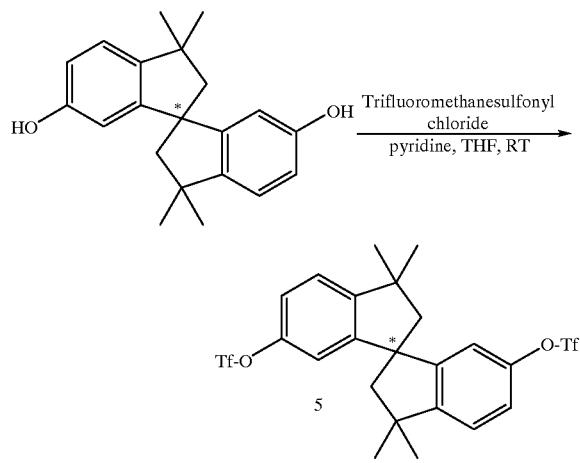

A tetrahydrofuran (THF)(50 mL) solution of chiral SBI (3 g, 9.7 mmoles) is treated with trifluoromethanesulfonyl chloride (3.6 g, 21.4 mmoles) at room temperature. The mixture is cooled with an ice bath, and pyridine (1.7 g) is added. The ice bath is removed, and the reaction is stirred at room temperature for 5 hours. The reaction mixture is poured into 200 mL of water and the product extracted with chloroform (3×50 mL). The chloroform layer is isolated, and the solvent is removed to give the desired chiral SBI bis-trifluoromethanesulfonate (structure5).

Reaction 2

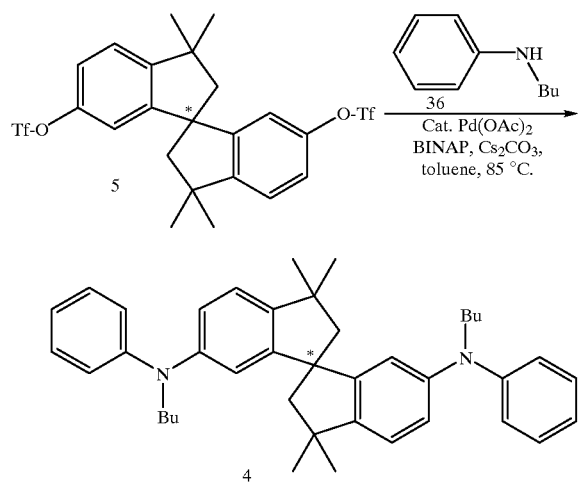

A 100 mL reaction flask is charged with chiral SBI bis-trifluoromethanesulfonate 5 (2 g, 3.5 mmoles), N-butylaniline (1.1 g, 7.3 mmoles) 36, palladium diacetate (16 mg, 2 mole %), BINAP [2, 2'-bis(diphenylphosphino)-1,1'-binaphthyl] (43 mg, 2 mole %), cesium carbonate ($Cs_2CO_3$) (2.4 g, 7.3 mmoles), and toluene (30 mL). The reaction mixture is heated at 85° C. for 24 hours under an argon atmosphere. The solvent is evaporated, and the residue is purified by column chromatography to give the desired bis-aniline compound 4.

Reaction 3

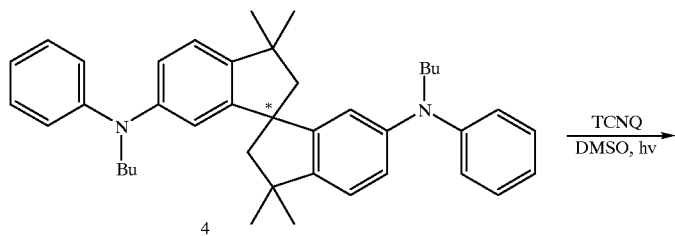

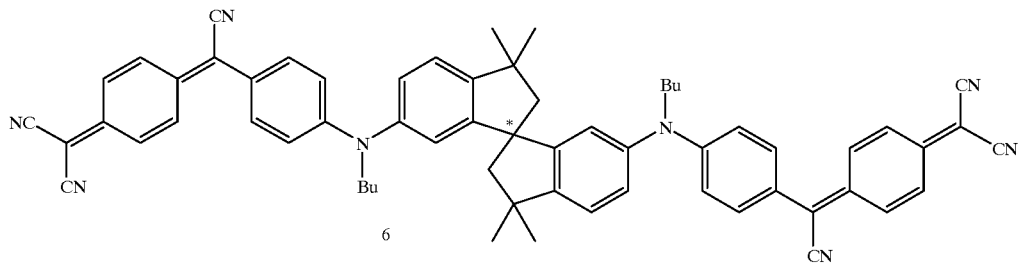

A 1 L reaction flask is charged with bis-aniline compound 4 (2 g, 3.9 mmoles), TCNQ [7,7,8,8-tetracyanoquinodimethane](1.6 g, 7.8 mmoles), and DMSO (200 mL). The solution is mechanically stirred and irradiated with a high intensity UV lamp (21 mW/cm$^2$ at 365 nm) for 24 hours. 150 mL of the solvent is removed under vacuum, and the desired chiral bis-tricyanoquinodimethane compound 6 is collected by filtration. Chiral dye 6 represents an embodiment of nonlinear optical component (NL15), wherein "x" is 0, each R$^4$ is a butyl group (Bu), and Ch is an enantiomer of SBI.

EXAMPLE 2

The procedure of Example 1 is followed, except that Reaction 4 below is performed after Reaction 1, instead of Reactions 2 and 3.

mmoles), palladium diacetate (Pd(OAc)$_2$)(16 mg, 2 mole %), BINAP [2,2'-bis(diphenylphosphino)-1,1'-binaphthyl] (43 mg, 2 mole %), cesium carbonate (Cs$_2$CO$_3$)(2.4 g, 7.3 mmoles), and toluene (30 mL). The reaction mixture is heated at 85° C. for 24 hours under an argon atmosphere. The solvent is evaporated, and the residue is purified by column chromatography to give the desired chiral dye 3, which is an example of chiral nonlinear optical dye (NL14), wherein each R$^4$ is a phenyl group (Ph), "x" is 0, and Ch is an enantiomer of SBI.

EXAMPLE 3

The procedure of Example 1 is followed except that 13,13,14,14-tetracyanodiphenoquinodimethane (structure 37) is substituted for 7,7,8,8-tetracyanoquinodimethane (TCNQ) in Reaction 3 to give chiral dye 39. Chiral dye 39

Reaction 4

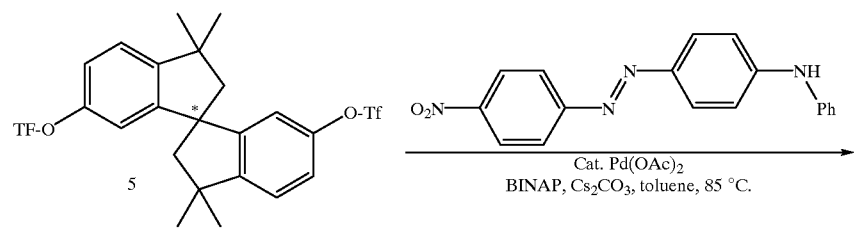

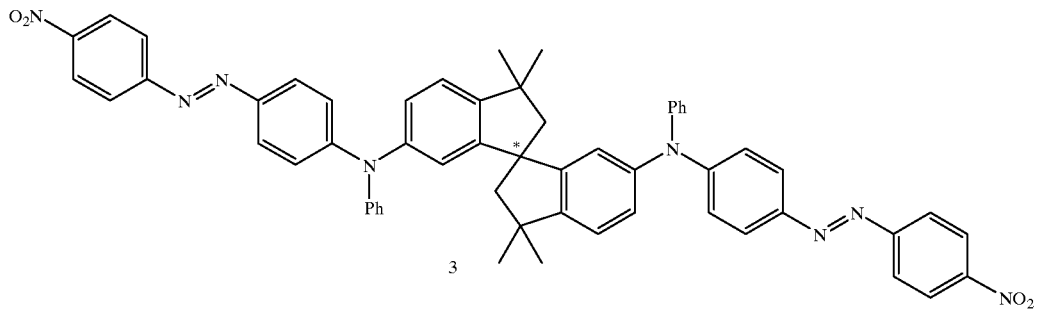

A 100 mL reaction flask is charged with chiral SBI bis-trifluoromethanesulfonate 5 (2 g, 3.5 mmoles), disperse orange 1[4-(4-nitrophenylazo)diphenylamine]38 (2.3 g, 7.3 is an example of structure (NL17), wherein each R$^4$ is butyl, x is 0, and Ch is a residue of an enantiomer of SBI.

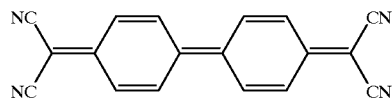

37

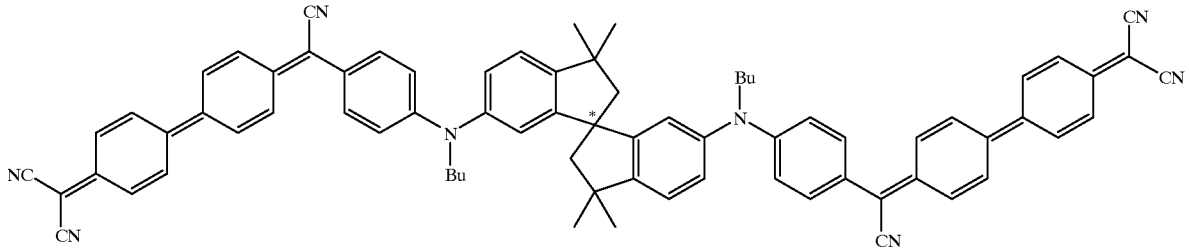

39

As stated above, to exhibit second-order nonlinear optical properties, the polymeric material must have a noncentrosymmetric structure, and the technique of electric-poling the polymeric material in a softened and fluid state is typically employed for polar orientation of the dye chromophores. This poling procedure imposes noncentrosymmetry on the chiral polymer material.

The most commonly used electric-poling techniques include electrode and corona poling. During conventional electrode poling, a DC voltage is applied to the polymer with electrodes. Typically, the dye and chiral polymer or dye-appended chiral polymer is first dissolved in a solvent, then spin-coated onto a glass slide to form a thin film. Usually the slide has been coated with a conductive material, such as indium tin oxide, for use as an electrode. Suitable solvents for dissolution of the dye/chiral polymer include 1,1,2,2-tetrachloroethane, methylene chloride, chloroform, chlorobenzene, chlorotoluene, tetrahydrofuran, 1-methyl-2-pyrrolidinone, or anisole. The solvent is then baked off after the thin film has been formed on the slide. A second electrode, such as gold, is then vapor deposited (100–300 nm) onto the dye/chiral polymer, and the voltage is applied to pole the sample. The polymeric material is then hardened by either cooling or thermosetting the material under an applied electric field.

In corona poling, electric charges are obtained from a corona discharge, and the material is hardened during charging. Electrode poling has the advantage of well-controllable field strengths, whereas corona poling allows higher fields because of the absence of electrical breakdown due to imperfections in the film.

Alternatively, optical poling, or polar bleaching, using lasers may be employed to pole the sample. In this technique, the nonlinear optical chromophores undergo a net light-induced rotation resulting from reversible isomerization cycles. The sample is cooled while being irradiated by the optical light source.

After poling, EO relaxation times and EO and NLO coefficients can then be measured using a conventional ellipsometric technique, as described below in Examples 13–14.

It should be noted that the present invention is not limited to dye-containing chiral materials which have been poled. The nonlinear optical chiral polymer compositions according to the present invention may also be employed as third-order nonlinear optical materials. In this case, it is not necessary to subject the chiral polymer material to the poling treatment described above.

The weight average molecular weight (Mw, kg/mole) of the nonlinear optical dye/chiral polymer materials preferably ranges from about 15 kg/mole to about 500 kg/mole. A high molecular weight ($\geq 15$ kg/mole) is desirable to ensure that the integrity of the material is maintained when exposed to high temperatures (>150° C.), an important property in high temperature processing and optoelectronics applications. The high molecular weight NLO/chiral polymers of the present invention exhibit excellent thermal properties, such as high glass transition temperatures ($T_g$) generally of 151° C. or more. Alternatively, the polymers have high melting points, generally of at least 250° C. Thus, the present optically active polymers, both doped and appended, remain thermally stable at high temperatures making them particularly useful in high temperature processing and optoelectronics applications.

The weight average molecular weights, Mw, of the polymers were measured by gel permeation chromatography (GPC) and calibrated against polystyrene standards. Thermal analyses were performed in a nitrogen atmosphere (40 mL/min.) at a heating rate of 20° C./min. using a Perkin Elmer Differential Scanning Calorimeter (DSC) 7 equipped with Pyris software. The DSC measured the change in heat capacity (Cp) between the glassy and equilibrium states of the polymer with respect to temperature; glass transition temperature ($T_g$) is reported herein as the temperature (° C.) at $0.5\Delta Cp$.

NLO Dye-Doped Chiral Polymer Compositions

The following examples illustrate novel NLO dye-doped chiral polymer compositions in which a nonlinear optical component, such as chromophore dye (NL1)–(NL17), is mixed as a dopant with a chiral polymer host. The chiral polymer and dye dopant are typically dissolved in a solvent, such as one of those previously listed. It should be noted that a high concentration (up to about 40 wt. %) of the dye can be doped in the chiral polymer without crystallization of the dye. The dye/polymer solution is then spin-coated onto a slide, and the solvent removed. Preferably, the concentration of dye in the final film will range from about 1 wt. % to about 40 wt. %, and more preferably, from about 5 wt. % to about 35 wt. %. The dye/polymer film is then poled, and the electro-optical coefficient measured, as described below. Typically, the second order NLO and EO coefficients increase as the amount of the dye molecules in the chiral polymer increases.

Preferably, the chiral polymer host is a chiral polycarbonate, chiral polyester, chiral polyurethane, or a chiral poly(aryl)ether having structural units which include chiral moieties selected from structures (IA) through (VIIB) above. Examples and methods of preparing these chiral polymer hosts are disclosed in detail for chiral moieties derived from chiral spirobiindanols (structures (IA) and (IB) and chiral indanols (structures (IIA) and (IIB)) in commonly assigned U.S. Pat. Nos. 5,777,063 and 5,883,218 to Gordon et al. and in commonly assigned U.S. Pat. No. 5,856,422 to Chan et al. The same methods of preparation may be applied to the syntheses of chiral polymers containing chiral moieties (IIIA)–(VIIB) derived from their corresponding chiral bisphenols.

(I) Chiral Polycarbonates, Polyesters, and Polyurethanes

Suitable chiral polymer hosts include chiral polycarbonates, polyesters, and polyurethanes wherein the chiral polymer backbone comprises structural units having formulae (1) and (2)

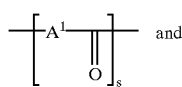 and (1)

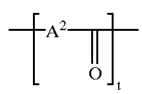 (2)

and structural units selected from formulae (10), (10'), or (10")

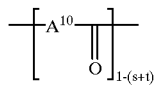 (10)

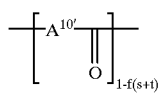 or (10')

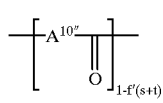 (10")

In structural units (1) and (2), respectively, $A^1$ and $A^2$ are each independently chiral moieties having structural formula (IA), (IB), (IIA), (IIB), (IIIA), (IIIB), (IVA), (IVB), (VA), (VB), (VIA), (VIB), (VIIA), or (VIIB), and moeities $A^{10}$, $A^{10'}$, and $A^{10''}$ are defined below.

The relative amounts of chiral structural units (1) and (2), and of units (10), (10'), or (10") in the chiral polymers may be represented as mole fractions, where the mole fraction of (1) is given by "s", and the mole fraction of (2) is given by "t". The mole fraction of structural units (10), when selected, is 1–(s+t). In structure (10'), the mole fraction is given by 1–f (s+t), and in structure (10"), the mole fraction is represented as 1–f'(s+t), where f and f' each multiply the quantity (s+t) and are each 1 except if the sum of "s" and "t" is 0.5. Then, as discussed below, f and f' may each be 1 or may each independently have a value greater than 1 but less than 2. When f and f' are each greater than 1, both formulas (10') and (10") are selected as structural units contained in the polymer.

The numerical values of "s" and "t" are each independently from 0 to 1.0, but the sum of "s" and "t" is greater than zero and less than or equal to 1.0. Thus, the chiral polymers include optically active homopolycarbonates comprising only optically active structural units (1) or (2) derived from the enantiomers of corresponding chiral bisphenols. In the chiral homopolycarbonates, one of "s" or "t" is 1.0, and the other is 0. Other chiral polymers useful as hosts include optically active random and alternating copolycarbonates comprising both structural units (1) and (2), wherein the sum of "s" and "t" is 1.0.

However, to ensure that the polymer is optically active, i.e. chiral, when $A^1$ in structure (1) is (IA), (IIA), (IIIA), (IVA), (VA), (VIA), or (VIIA), and $A^2$ in structure (2) is respectively (IB), (IIB), (IIIB), (IVB), (VB), (VIB), or (VIIB), or when $A^1$ (IB), (IIB), (IIIB), (IVB), (VB), (VIB), or (VIIB), and $A^2$ is respectively (IA), (IIA), (IIIA), (IVA), (VA), (VIA), or (VIIA), then the numerical value of "s" must differ from the numerical value of "t". Otherwise, in polymers containing both enantiomeric moieties, such as, in polymers containing both structures (1) and (2), wherein $A^1$ is (IA) and $A^2$ is (IB), for example, the optical rotations of structural units (1) and (2) would be exactly equal in magnitude but opposite in direction, and the overall rotation would have a value of 0. In effect, although the polymer would comprise optically active monomeric units, (1) and (2), the overall optical activity would be canceled after polymerization.

In the alternating copolycarbonates containing both units (1) and (2), which alternate throughout the chain, "s" and "t" are each about 0.5. However, for the reasons set forth above, when units (1) and (2) alternate, $A^1$ cannot be the enantiomer of $A^2$. In addition, the invention includes as polymer hosts optically active random copolycarbonates comprising only structural units (1) and (2) randomly dispersed throughout the polymer, wherein the sum of "s" and "t" is 1.0, and "s" and "t" each have numerical values greater than 0. However, in these random copolycarbonates, the mole fractions of (1) and (2), "s" and "t", respectively, cannot be equal in value when $A^1$ and $A^2$ are enantiomers.

As used herein, the term "random" refers to chiral polymers wherein at least two differing structural units or monomers are randomly dispersed or distributed along the polymeric chain backbone. A "monomer" is a low molecular weight compound capable of being polymerized with itself or other similar compounds and refers also herein to the corresponding structural moiety, such as to each of structures (1), (2), (10), (10'), and (10"), etc., that is contained in the polymeric chain.

Alternating linear chiral copolycarbonates, copolyesters, and copolyurethanes containing structural units (1) and/or (2) which alternate with structural units chosen from formulas (10), (10') or (10") may also serve as chiral polymer hosts for doping with nonlinear optical dyes. When only one of structural units (1) or (2) alternates with units (10), (10') or (10"), then one of the mole fractions, "s" or "t" is about 0.5, and the other is 0. Alternatively, the alternating copolymers may contain both units (1) and (2), wherein each selected structural unit (10), (10') or (10") alternates with a structural unit of (1) or (2), but otherwise, the placement of each (1) and (2) structure in the chain is completely random. In this second type of alternating copolymer, the mole fraction of each of the chiral monomers (1) and (2) is other than 0, but the sum thereof, (s+t), is about 0.5.

When structural units (10) are included with units (1) and/or (2), the chiral polymer may be an alternating or random copolycarbonate, wherein moiety $A^{10}$ in units (1) is a racemic residue having structural formula (VIII), (IX), (X), (XI), (XII), or (XIII), or a moiety having formula (XV), (XVI), or (XX). Alternatively, the polymer may be a chiral polyurethane, wherein moiety $A^{10}$ has formula (XVII). When the chiral polymer is a polyester containing structural units (10), then $A^{10}$ has formula (XXII). Structural moieties (VIII)–(XIII), (XV)–(XVII), (XX), and (XXII) are depicted as (VIII)
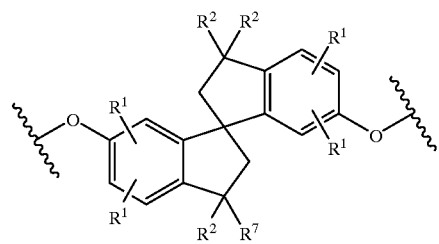

(IX)
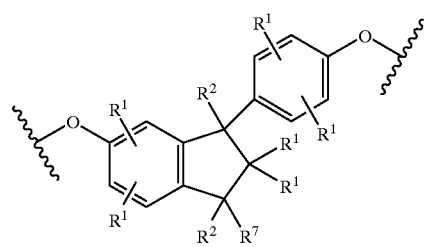

(X)
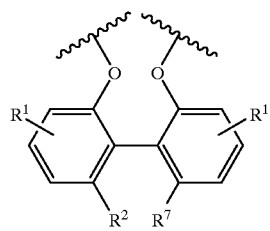

(XI)
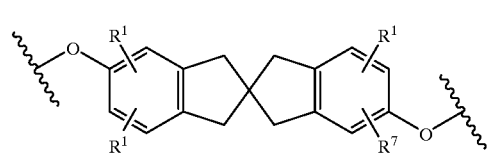

(XII)
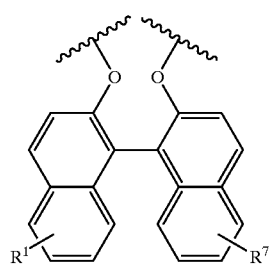

(XIII)
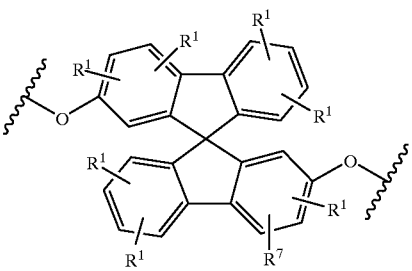

(XV)
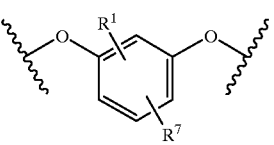

(XVI)
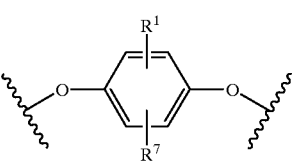

(XX)
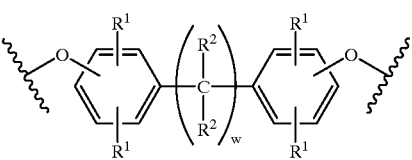

(XVII)
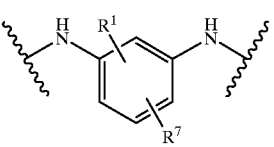

(XXII)
$$\left\{\left(\begin{array}{c}R^1\\|\\-C-\\|\\R^1\end{array}\right)_y\right\}$$

$R^1$, $R^2$, and $R^7$ and the wavy lines are as previously defined; "w" in structure (XX) is 0 or 1; and "y" in moiety (XXII) is an integer from 1 to 20.

In the chiral polycarbonates, structural moiety (XV) is preferably derived from hydroquinone, and moiety (XVI) is a derivative of resorcinol, wherein $R^1$ and $R^7$ are both hydrogen. In structural moiety (XX), the value of "w" is 0 when (XX) is a moiety derived from a substituted or unsubstituted biphenol. Preferably, $R^1$ is hydrogen. Alternatively, "w" is 1 when (XX) is derived from a substituted or unsubstituted bisphenol, wherein a bridging carbon connects the phenol moieties. When "w" is 1, formula (XX) is preferably a derivative of bisphenol A (BPA), wherein each $R^2$ is methyl, or of hexafluorobisphenol A, wherein each $R^2$ is trifluoromethyl, and wherein each $R^1$ is hydrogen.

In addition to alternating polymers, chiral structural units (1) and/or (2) may be randomly dispersed with structural units (10) throughout the polymeric chain. In these copolymers, wherein the quantity (1−(s+t)) is the mole fraction of structural units (10), the sum of "s" and "t" is less than 1.0. Typically, the value of one of "s" or "t" is 0. In the chiral polyurethanes and polyesters, each structural unit (10) (and as described below, each unit of (10') or (10")) is separated by at least one structural unit having formula (1) or (2).

In the chiral polyurethanes, formula (XVII) is a derivative of a diisocyanate compound, wherein $R^2$ is preferably methyl, and $R^1$ is preferably hydrogen. An exemplary diisocyanate compound is toluene-2,4-diisocyanate or 2,4-diisocyanato-1-methyl benzene, which is commercially available from Aldrich as tolylene 2,4-diisocyanate. The resulting chiral polyurethane polymer includes structural units (XVII), wherein $R^2$ is methyl and is located on the carbon at position 4 of the phenylene ring. Amide groups are located at the 1 and 3 carbons, and the remaining positions contain hydrogen. Another example is toluene-2,6-diisocyanate or 1,3-diisocyanato-2-methyl benzene, which is commercially available from Aldrich as tolylene 2,6-diisocyanate, resulting in a polyurethane wherein a methyl group is located on the carbon at the 2 position of the phenylene ring of structure (XVII); the amide groups are located at carbons 1 and 3; and the remaining carbons are bonded to hydrogen.

Polyesters having structural formula (XXII) are derived from alkyl dicarboxylic acid halides containing up to 20 carbon atoms, but most often containing 4–8 carbons. Examples include adipoyl chloride, succinyl chloride, glutaryl dichloride, or pimeloyl chloride. In structure (XXII), "y" is the number of carbons in the alkyl group.

Alternatively, the chiral polyesters may include structural units (10') and/or (10"), wherein $A^{10'}$ is a structural moiety having formula (XVIII); and $A^{10"}$ is a structural moiety having formula (XIX)

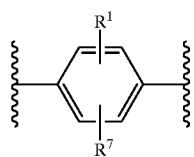

(XVIII)

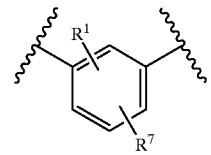

(XIX)

As previously stated, the quantity (1−f (s+t)) represents the mole fraction of structural units (10'); and the quantity (1−f'(s+t)) is the mole fraction of structural units (10"), where f and f' each multiply the quantity (s+t). When either structure (XVIII) or structure (XIX) is included in the chiral polyester, then f or f', respectively, is 1.

When the sum of "s" and "t" is about 0.5, both formulae (XVIII) and (XIX) may be included in the polymer. When both structures are included, the values of f and f' are each independently greater than 1 but less than 2. In one embodiment, one of the mole fractions, "s" or "t", of the structural units (1) and (2) is about 0.5, and the other of "s" and "t" is 0. Alternatively, mole fractions, "s" and "t", are both other than 0 (but are not equal in value if $A^1$ and $A^2$ are enantiomers). In this case, the sum of "s" and "t" is about 0.5, and both monomers (1) and (2) are included in the chiral polyester.

Structural moieties (XVIII) and (XIX) are derived respectively from substituted or unsubstituted teraphthaloyl chlorides and isophthaloyl chlorides. The resulting structural moieties are para- or meta- linked in the chiral polyesters (polyarylates).

The following example is illustrative.

EXAMPLE 4

Alternating Copolycarbonate

In a two-neck round bottomed flask equipped with a stirrer, a reflux condenser, and an addition funnel, chiral (S)(−)-5-hydroxy-3-(4-hydroxyphenyl)-1, 1,3-trimethylindane (IBP) (13.42 g, 0.0500 mole), 4-N,N-dimethylaminopyridine (DMAP)(12.40 g, 0.1015 mole), and 300 mL of methylene chloride was stirred under ambient conditions for 10–20 minutes. The addition funnel contained a solution of BPA bischloroformate (17.84 g, 0.0505 mole) in 125 mL $CH_2Cl_2$. The system was sealed, purged with argon, and kept under an atmosphere of argon for the remainder of the reaction. At this time the heat was turned on, and addition of the chloroformate solution was initiated. The reaction was maintained at reflux (~50° C.) while the chloroformate solution was added over 30 minutes. The reaction was then stirred for two additional hours. 4-Cumylphenol (1.063 g, 5.00 mmoles) was added, and the solution was stirred for an additional hour.

The methylene chloride solution containing the polymer was washed with a 1.0 M aqueous solution of hydrochloric acid, then twice with water and once with brine. The phases were separated, and methanol was added to the washed methylene chloride solution at a ratio of about 2 to 1. The polymer formed a gummy lump, and the remaining liquid was decanted off. The polymer was taken up in 175 mL of methylene chloride. The polymer was isolated by pouring this solution into a vigorously stirred volume of absolute methanol (600 mL). The polymer was collected by filtration and dried in vacuo for 22 hours (17.76 g, 62.0% yield, Mw=116 kg/mole).

The resulting chiral polycarbonate polymer host comprised alternating structural units (1) and (10). In structural units (1), $A^1$ had structure (IIA) derived from (S)(−)-IBP, and in (10), $A^{10}$ had structure (XX) derived from BPA, wherein the mole fractions of (1) and (10) were each about 0.50, and wherein each $R^1$ was hydrogen, each $R^2$ and $R^7$ was methyl, and "w" was 1.

As stated above, a chiral polymer material exhibiting nonlinear optical properties in accordance with the present invention may contain nonlinear optical component (NL1)−(NL17) in admixture with the chiral polymer host. The following examples illustrate novel nonlinear optical materials in which a dicyanomethylenepyran dye was mixed as a dopant with a chiral polycarbonate host.

EXAMPLE 5

The alternating chiral [(S)(−)-IBP/BPA] polycarbonate (also referred to herein as "PC") from Example 4, which comprised alternating structural units (1) derived from (s)(−)-IBP and (10) derived from BPA, served as the host chiral polymer. In structure (1), $A^1$ was chiral indane bisphenol moiety (IIA), wherein each $R^1$ was hydrogen, and each $R^2$ and $R^7$ was methyl. In structural units (10), $A^{10}$ was a bisphenol moiety having formula (XX), wherein each $R^1$ was hydrogen, each $R^2$ was methyl, and "w" was 1. The mole fraction "s" of structural units (1), and that of (10), i.e. (1−(s+t)), were both about 0.50. The molecular weight (Mw) of the undoped chiral polymer was 116 kg/mole, and the $T_g$ was 184° C. [2,6-Bis[2-[4-(diphenylamino)phenyl]ethenyl]-4H-pyran-4-ylidene]-propanedinitrile having structure (NL12), wherein each $R^4$ and $R^3$ was phenyl, and "x" was 0, was selected as the guest. The dye/polymer ratio in weight was 11 wt./100 wt., giving a concentration of 10 wt. % dye in polymer. The $T_g$ of chiral [(S)(−)-IBP/BPA] PC doped with 10 wt. % dye was 165° C.

EXAMPLE 6

Example 5 was followed substituting alternating chiral [(R)(+)-SBI/BPA] PC for [(S)(−)-IBP/BPA] polycarbonate, wherein [(R)(+)-SBI/BPA] PC comprised structural units (1) derived from (R)(+)-SBI and (10) derived from BPA. In structure (1), $A^1$ was chiral spirobiindane bisphenol moiety (IA), wherein each $R^1$ was hydrogen, and each $R^2$ and $R^7$ was methyl. Structural units (10) were as previously described in Example 5. The mole fraction "s" of structural units (1), and that of (10), i.e. (1−(s+t)), were both about 0.50. The molecular weight of the undoped chiral polymer was 39 kg/mole, and the $T_g$ was 193° C. The $T_g$ of chiral [(R)(+)-SBI/BPA] PC doped with 10 wt. % dye was 180° C.

EXAMPLE 7

The procedure of Example 5 was followed except that a chiral homopolycarbonate comprising structural units (1) derived from (R)(+)-IBP was substituted as the host chiral polymer. In structure (1), $A^1$ was chiral indane bisphenol moiety (IIB), wherein each $R^1$ was hydrogen, and each $R^2$ and $R^7$ was methyl. The mole fraction "s" of structural units (1) was 1.0. The molecular weight (Mw) of the undoped chiral homopolycarbonate was 94 kg/mole, and the $T_g$ was 201° C. The $T_g$ of chiral (R)(+)-IBP homopolycarbonate doped with 10 wt. % dye was 189° C.

EXAMPLE 8

The procedure of Example 7 was followed substituting (S)(−)-IBP for (R)(+)-IBP in the host chiral homopolycarbonate. $A^1$ was chiral indane bisphenol moiety (IIA), wherein each $R^1$ was hydrogen, and each $R^2$ and $R^7$ was methyl. The molecular weight (Mw) of the undoped chiral (S)(−)-IBP homopolycarbonate was 113 kg/mole, and the $T_g$ was 201° C. The $T_g$ of the doped chiral homopolycarbonate was 188° C.

To compare the improvement in electro-optical relaxation times observed for doped chiral polymers over those of doped racemic polymers (described below), doped racemic polycarbonates comparable to those of Examples 5–8 were prepared, substituting racemic moieties for the chiral monomers. The racemic polymers are illustrated in the following Examples 9–11. As used herein, the symbol "(+/−)" refers to racemic.

EXAMPLE 9

The procedure of Example 5 was followed substituting (+/−)-IBP for (S)(−)-IBP. The molecular weight (Mw) of the undoped alternating racemic [IBP/BPA] polycarbonate was 76 kg/mole. The $T_g$ was 186° C., which was about the same as that (within experimental uncertainty) of the undoped chiral [(S)(−)-IBP/BPA] PC. However, the $T_g$ of the doped racemic polycarbonate was 174° C., which was about 9° C. higher than that of the doped chiral polymer.

EXAMPLE 10

The procedure of Example 6 was followed substituting (+/−)-SBI for (R)(+)-SBI. The molecular weight (Mw) of the undoped alternating racemic [SBI/BPA] polycarbonate was 69 kg/mole, and the $T_g$ was 199° C., which was about 6° C. higher than that of the undoped chiral [(R)(+)-SBI/BPA] polycarbonate. The $T_g$ of the doped racemic polycarbonate was 174° C., which was about 6° C. lower than that of the chiral doped PC.

EXAMPLE 11

The procedure of Example 7 was followed substituting (+/−)-IBP homopolycarbonate for the chiral (R)(+)-IBP homopolycarbonate host. The molecular weight (Mw) of the undoped racemic homopolycarbonate was 73 kg/mole, and the $T_g$ was 199° C., which was similar to those of both chiral (R)(+)-IBP and (S)(−)-IBP homopolycarbonates. The $T_g$ of the doped (+/−)-IBP homopolycarbonate was 186° C., which was also about the same as those of the doped chiral homopolycarbonates.

EXAMPLE 12

Electrode Poling

Each of the doped polymers from Examples 5–11 was dissolved separately in 1,1,2,2-tetrachloroethane (TCE), and the solutions were filtered twice (0.45 $\mu$, then 0.2 $\mu$). The filtered dye/polymer solutions were used to prepare thin-film samples for subsequent poling. Each dye/polymer solution was spin-coated onto a clean glass slide coated with indium tin oxide (ITO), such that the dye/polymer solution resided atop the ITO coating. Each slide/sample was then baked at 120–150° C. to eliminate all solvent in the doped polymer. The quality of the samples was checked by microscopy, and high quality regions were identified. A layer of gold (Au) was then vapor-deposited under high vacuum on a high quality region of each doped polymer. A single layer of gold about 100–300 nm thick was necessary for durability during poling.

The dye-doped polymers were then poled using a conventional electrode contact poling technique, wherein ITO served as the bottom electrode, and the gold layer overlying the doped polymer served as the top electrode. Both the metal and ITO electrodes were linked with a voltage supply and current monitor, and voltage up to 200V was added to check the conductivity of each sample at room temperature (a reading of zero on the current monitor indicated no conductivity). Each sample was placed on a hot plate to increase its temperature to about 8±1° C. below the $T_g$ of the corresponding doped polymer (as listed above in Examples 5–11). Voltage vs. current measurements were taken, and the voltage was increased step by step to 200–400V. The optimum temperature at which a high ratio of current/voltage could be maintained was identified for each sample. The high voltage of 200–400V (providing an electric field of 100–250V/$\mu$m depending on film thickness) was maintained at the optimum temperature for 30–50 min. to pole the doped polymer. Keeping the same high voltage and electric field, each sample was then cooled for about an hour at 1.5° C./min. until a temperature of approximately 50° C. was reached. The applied voltage was then removed, and the samples were prepared for optical testing.

EXAMPLE 13

Electro-Optical Measurements

The electro-optical coefficient of each poled polymer from Example 12 was measured using an ellipsometric technique commonly applied to polymeric thin films, as described by Teng et al., *Appl. Phys. Lett.*, 56, 1734–36 (1990). In the ellipsometric configuration, the input laser beam was polarized 45° with respect to the plane of incidence, and a He—Ne laser at wavelength 632.8 nm was used for the EO measurement. The measured EO coefficients, $r_{33}$, for the doped polymers are listed in the Table below.

To determine the reliability of the ellipsometric technique, a Z-cut sample of $LiNbO_3$ crystal was tested. The measured $r_{33}$ of $LiNbO_3$ was about 28 pm/V, which is quite close to the reported data $r_{33}$=30 pm/V. Hence the technique is reliable for investigating EO properties of unpoled and poled polymer samples.

EXAMPLE 14

EO Relaxation Measurements

The EO relaxation of the poled dye-doped polymers from Example 12 were investigated. The stretched exponential or Kohlrausch-Williams-Watt (KWW) function, as shown in the following Eq. 1, is widely used for describing a variety of relaxation mechanisms in polymers, as discussed by Kaatz et al., *Macromol.* 29, 1666–78 (1996).

$$\phi(t) = r_{33}(t)/r_{33}(0) = \exp[-(t/\tau_T)^b] \quad \text{(Eq. 1)}$$

$\tau_T$ represents the relaxation time, or the time it takes the system to decay to 1/e of its initial value $r_{33}(t=0)$; b, the stretched exponential, is the breadth of the distribution in relaxation times. The relaxation time, $\tau_T$, is a function of temperature (T) of relaxation and the difference between T and $T_g$: $\tau_T$ $f$(T, $T_g$–T). Experimental EO relaxation data for the poled samples were measured and simulated with the KWW model using Eq. 1 to obtain relaxation times, $\tau_T$ and stretched exponential values, b. The results are shown in the following Table.

decay time for the doped polymer having the lower glass transition temperature and would predict a longer decay time for the one having the higher glass transition temperature. Instead, as shown in Table I, the dye-doped chiral polymers consistently exhibited much longer relaxation times than their racemic counterparts, irrespective of whether the doped chiral polymer had a corresponding $T_g$ greater than, less than, or equal to that of the corresponding doped racemic polymer. For example, at 125° C., the relaxation time of the doped alternating chiral [(s)(–)-(IBP/BPA)] polycarbonate was 23 times longer than that of the doped racemic polymer even though the $T_g$ of the dye-doped chiral polymer was about 9° C. lower than that of the dye-doped racemic polycarbonate (165° C. and 174° C., respectively). This result is in direct contrast with what one would expect.

It is therefore clear that EO polymer compositions comprising chiral polymer hosts show surprisingly long-term stability making them useful materials for long-term electro-optical applications.

EXAMPLE 15

Example 5 was followed except that alternating chiral [(R)(+)-IBP/BPA] polycarbonate was substituted as the host, and the concentration of the dicyanomethylenepyran dye in the chiral polycarbonate was 32 wt. % dye. In structure (1), $A^1$ was indane bisphenol moiety (IIB) derived from (R)(+)-IBP, wherein each $R^1$ was hydrogen, and each $R^2$ and $R^7$ was methyl. Structural units (10) were as previously described in Example 5. The mole fraction "s" of structural units (1), and that of (10), i.e. (1–(s+t)), were both about 0.50. The procedures of Examples 12–13 for poling and measuring the EO coefficient were followed. The poling temperature was 146° C.; the electric field was 220 V/$\mu$m; and the current was 7 $\mu$A. The EO coefficient $r_{33}$ was 26±3 pm/V, which is comparable to that of the $LiNbO_3$ crystal, within the measurement uncertainty. The refractive index, $\eta$, of the 32 wt. % dye-doped chiral polymer was about 1.86 at 633 nm, as measured by the method of transmitted interference set forth in R. Swanepoel, *J. Phys, Instrum.*, 16, 1214 (1983). The second order NLO coefficient $d_{333}$ was then estimated to be about 75 pm/V at a wavelength of 1.3 $\mu$m based on the EO coefficient $r_{33}$ and the refractive index using the following equation:

TABLE

| Polymer | | Ex. No. | Undoped Polymer Tg (° C.) | Dye-Doped Polymer (10 wt. % dye in polymer) | | | | | |
|---------|---|---------|------|------|------|------|------|------|------|
| | | | | Tg (° C.) | $r_{33}$ (pM/V) | Relax Temp (° C.) | $\tau_T$ (sec) | b | $\tau_{chir}/\tau_{rac}$ |
| IBP/BPA-PC Altern. | (S)(–) | 5 | 184 | 165 | 6.1 | 125 | $1.6 \times 10^7$ | 0.26 | 23 |
| | (+/–) | 9 | 186 | 174 | 5–6 | 125 | $6.9 \times 10^5$ | 0.26 | |
| SBI/BPA-PC Altern. | (R)(+) | 6 | 193 | 180 | 5–6 | 135 | $5.2 \times 10^6$ | 0.41 | 2.3 |
| | (+/–) | 10 | 199 | 174 | 5–6 | 135 | $2.3 \times 10^6$ | 0.44 | |
| (IBP)PC | (R)(+) | 7 | 201 | 189 | 5.7 | 135 | $1.4 \times 10^6$ | 0.24 | 4.1 |
| | (S)(–) | 8 | 201 | 188 | 6.7 | 135 | $2.7 \times 10^6$ | 0.28 | 7.9 |
| | (+/–) | 11 | 199 | 186 | 5.1 | 135 | $3.4 \times 10^5$ | 0.34 | |

As shown in the Table, the observed EO relaxation times ($\tau_T$) for the poled dye-doped chiral polymers were impressively and unexpectedly longer than those of the poled dye-doped racemic polymers. This result is surprising because one would expect the relaxation times to depend directly upon the relative magnitude of the $T_g$'s. That is, between two doped polymers, one would predict a shorter $$r_{33} = -4/\eta_3^4 \cdot d_{333} \quad \text{(Eq. 2)}$$

EXAMPLE 16

Example 15 was repeated except that the poling temperature was 154° C.; the electric field was 150 V/$\mu$m; and the current was 8 $\mu$A. The measured EO coefficient $r_{33}$ was 20±2 pm/V, and $d_{333}$ was estimated to be about 60 pm/V.

As set forth in Examples 15 and 16, unexpectedly high NLO effects were observed for poled 32 wt. % dye-doped chiral polymers making them particularly useful in applications such as wavelength conversion, optical parametric processes, and optical amplification at 1.3 μm wavelength, which are of interest in optical communication.

(II) Chiral Poly(aryl)ethers

The chiral poly(aryl)ether polymers useful as hosts in the present invention include polyetherimides, polyethersulfones, and polyetherketones. The polymers comprise structural units (11), (12), and/or (13)

(11)

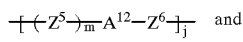 and
(12)

(13)

The relative amounts of structural units (11), (12), and (13) in the chiral polymeric polyethers may be represented as mole fractions, where the mole fraction of (11) is given by (1−(j+k)), the mole fraction of (12) is given by "j", and the mole fraction of structural unit (13) is "k". The values of "j" and "k" are each independently from 0 to about 0.99, and the sum of "j" and "k" is from 0 to about 0.99. Thus, optically active linear polyether homopolymers containing only structural units (11), wherein "j" and "k" are 0, are included as chiral polymer hosts in the present invention, as well as optically active linear copolyethers containing the additional structure (12), wherein "j" is greater than 0, and optionally (13), wherein "k" is also greater than 0. In the chiral copolyether polymers, the structural units (11) and (12), and (13), when (13) is included, are randomly dispersed along the polymeric chain backbone to form a "random chiral copolymer". The value of "m" is either 0 or 1, as discussed below.

The chiral moiety $A^1$ of structure (11) has one of formulae (IA), (IB), (IIA), (IIB), (IIIA), (IIIB), (IVA), (IVB), (VA), (VB), (VIA), (VIB), (VIIA), and (VIIB). Structural units (12) and/or (13) may also include an enantiomeric moiety, wherein $A^{12}$ or $A^{13}$ is also one of the chiral moieties listed above, i.e. (IA)–(VIIB). However, because the polymers useful in the present invention are optically active, when $A^1$ is one of (IA), (IIA), (IIIA), (IVA), (VA), (VIA), or (VIIA), and $A^{12}$ or $A^{13}$ is respectively (IB), (IIB), (IIIB), (IVB), (VB), (VIB), or (VIIB), or when $A^1$ is one of (IB), (IIB), (IIIB), (IVB), (VB), (VIB), or (VIIB), and $A^{12}$ or $A^{13}$ is respectively (IA), (IIA), (IIIA), (IVA), (VA), (VIA), or (VIIA), then the mole fraction "j" or "k" of structural units (12) or (13) corresponding to $A^{12}$ or $A^{13}$ differs from the mole fraction (1(j+k)) of structural units (11) corresponding to $A^1$. Otherwise, as stated above with respect to the chiral polycarbonates, polyesters, and polyurethanes, the overall optical activity would be canceled after polymerization.

Alternatively, structure (12) or (13) may include as $A^{12}$ or $A^{13}$, respectively, a racemic moiety having formula (VIII), (IX), (X), (XI), (XII), or (XIII), or a moiety having structural formula (XV), (XVI), or (XX), as previously depicted and discussed. Usually, $A^1$ differs from each of $A^{12}$ and $A^{13}$, and $A^{12}$ differs from $A^{13}$.

In the chiral polyetherimides, "m" is 1, and $A^{12}$ or $A^{13}$ in structural units (12) or (13) may instead be a moiety having formula (XXI), which is derived from ethylene glycol bis (anhydrotrimellitate).

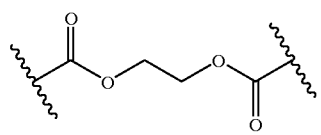
(XXI)

Alternatively, in the optically active polyetherimides, $A^{12}$ or $A^{13}$ in structural units (12) or (13) may be a single bond, or a bridging radical which separates $Z^5$ from $Z^6$. Examples of bridging radicals include —O—, —S—, —SO$_2$—, —CO—, —C(CH$_3$)$_2$—, —C(CD$_3$)$_2$—, and —C(CF$_3$)$_2$—.

In the optically active polyethersulfone and polyetherketone polymers, "m" is 0 in structures (11), (12), and (13), and the $Z^6$ radical may be any aromatic radical which contains at least one carbonyl or sulfone group. Illustrative radicals of this kind are moieties of bis(4-phenylene)sulfone, represented as formula (Z10), the corresponding radical derived from benzophenone (formula (Z12)), and radicals containing two carbonyls such as those represented in formulas (Z 13) and (Z11).

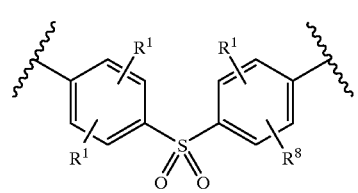
(Z10)

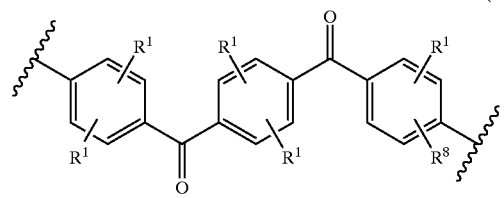
(Z11)

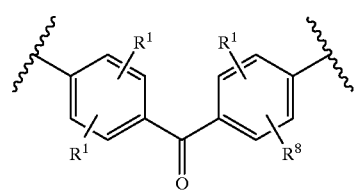
(Z12)

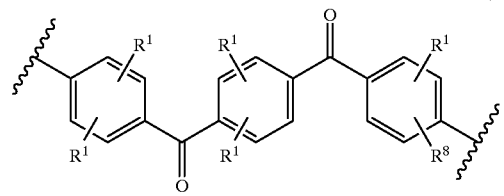
(Z13)

$R^8$ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof.

In the chiral polyetherimides, where "m" is 1, $Z^6$ has structural formula (Z16) or (Z17).

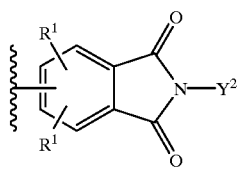
(Z16)

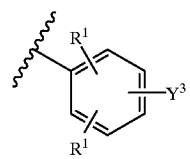
(Z17)

When $Z^6$ is a phthalimide moiety having formula (Z16), then $Z^5$ is also a phthalimide moiety having structural formula (Z16'), and when $Z^6$ is a phenylene residue having formula (Z17), then $Z^5$ is also a phenylene moiety having formula (Z17')

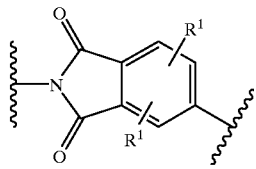
(Z16')

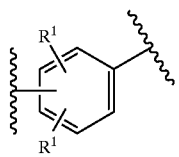
(Z17')

The phthalimide moieties are typically derived from N-alkyl-4-nitrophthalimides, wherein the alkyl group may have from 1 to 10 carbons. Because of its commercial availability from GE, N-methyl-4-nitrophthalimide is often used.

It should be noted that the structure of $Z^6$ may be, but need not be, the same in all (11), (12), and (13). For example, $Z^6$ may have formula (Z16) in structural unit (11) but may have formula (Z17) in structural unit (12).

In structural formula (Z16), $Y^2$ is selected from the group of structural moieties having formulae (Z16a), (Z16b), (Z16c), (Z16d), and (Z16e), which are typically derived from substituted or unsubstituted diamines.

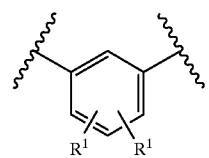
(Z16a)

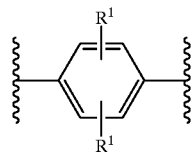
(Z16b)

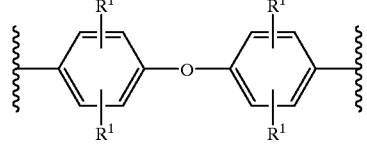
(Z16c)

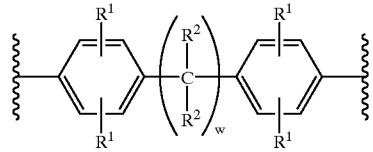
(Z16d)

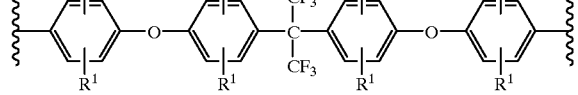
(Z16e)

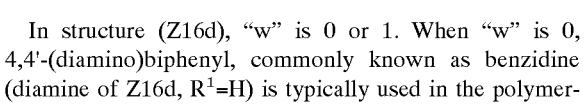

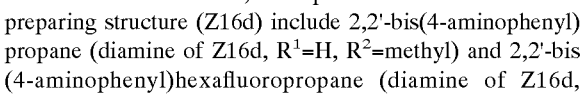

In structure (Z16d), "w" is 0 or 1. When "w" is 0, 4,4'-(diamino)biphenyl, commonly known as benzidine (diamine of Z16d, $R^1$=H) is typically used in the polymerization. When "w" is 1, examples of diamines useful in preparing structure (Z16d) include 2,2'-bis(4-aminophenyl)propane (diamine of Z16d, $R^1$=H, $R^2$=methyl) and 2,2'-bis(4-aminophenyl)hexafluoropropane (diamine of Z16d, $R^1$=H, $R^2$=$CF_3$). Structures (Z16a) and (Z16b) are usually derived from m- and p-phenylenediamine ($R^1$=H). Other useful diamines include 4,4'-oxydianiline (diamine of Z16c, $R^1$=H); and 2,2'-bis[4(4-aminophenoxy)phenyl] hexafluoropropane (diamine of Z16e, $R^1$=H).

In structural formula (Z17), $Y^3$ is selected from the group of structural moieties having formulas (Z17a), (Z17b), and (Z17c)

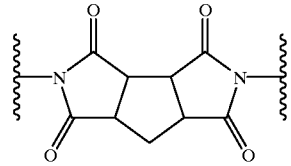
(Z17a)

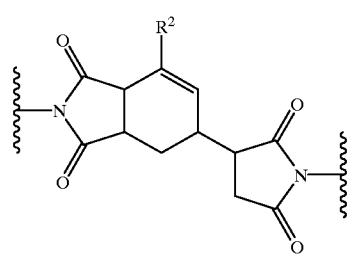
(Z17b)

-continued

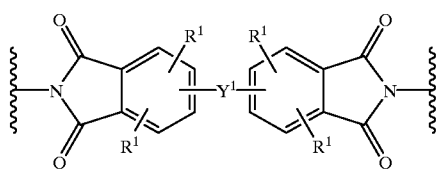
(Z17c)

$Y^1$ is a single bond or is selected from the group of —O—, —S—, —SO$_2$—, —CO—, —C(CH$_3$)$_2$—, —C(CD$_3$)$_2$—, or —C(CF$_3$)$_2$—, or from the group of structural moieties having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), (XX), and (XXI). However, to ensure overall optical activity in the chiral polymer, when "j" and "k" are both 0, then $Y^1$ is other than formula (IA), (IIA), (IIIA), (IVA), (VA), (VIA), or (VIIA) when $A^1$ is respectively formula (IB), (IIB), (IIIB), (IVB), (VB), (VIB), or (VIIB); and $Y^1$ is other than formula (IB), (IIB), (IIIB), (IVB), (VB), (VIB), or (VIIB) when $A^1$ is respectively formula (IA), (IIA), (IIIA), (IVA), (VA), (VIA), or (VIIA). Each $R^1$ and $R^2$ and the wavy lines in the above structures are as previously defined.

Structural moiety (Z17a) is typically derived from 1,2,3,4-cyclopentanetetracarboxylic dianhydride; and moiety (Z17b), from 5-(2,5-dioxotetrahydrol)-3-methyl-3-cyclohexene-1,2-dicarboxylic anhydride. Similarly, depending on the selection of $Y^1$, moiety (Z17c) is prepared from the corresponding dianhydride. For example, when $Y^1$ is structure (XX), wherein "w" is 1, each $R^1$ is H, and each $R^2$ is methyl, then BPA dianhydride is the precursor of moiety $Y^1$ in (Z17c).

NLO Dye-Appended Chiral Polymer Compositions

The dye-appended chiral polymer materials of the present invention are preferably the chiral polycarbonates, chiral polyesters, chiral polyurethanes, and chiral poly(aryl)ethers described above in connection with doped chiral polymer hosts. However, unlike the doped chiral polymers, the appended chiral polymers incorporate the nonlinear optical dye chromophores (NL1)–(NL12) or (NL18)–(NL28) as sidechains on the polymeric backbone or main chain.

In general, poled dyes chemically attached to a polymer matrix as sidechains have slower NLO and EO decay than guest-host NLO polymers. In addition, the EO and NLO effects increase as the amount of dye added as sidechains along the chiral polymer backbone is increased. The chiral polymer generally contains from about 1% by mole to about 100% by mole dye-appended monomers. Preferably, from about 10% by mole to about 50% by mole of the monomers included in the chiral polymer will be dye-appended. Because the dye does not precipitate from the polymer backbone, crystallization is not a concern.

The nonlinear optical dyes (NL1)–(NL12) and (NL18)–(NL24) may be covalently attached to the chiral polymer either before or after polymerization using a conventional Mitsunobu condensation reaction. In this process diethylazodicarboxylate (DEAD) and triphenylphosphine are added to a solution containing a hydroxy or dihydroxy alkyl amino-dye and the carboxylic acid of the bisphenol corresponding to the moiety to which the dye is to be attached. Alternatively, the dye will combine with a hydroxy substituent on the polymer backbone if there is no carbonyl. Imidazole dyes having formulae (NL25)–(NL28) can be combined with benzil-containing monomers, as illustrated below.

Preparation of a dihydroxy-amino dye 21 (7-[(4-dihydroxyethylamino)phenyl]-7,8,8-tricyanoquinodimethane), which can then attach to the polymeric chain as sidechain (NL19)(x=0), is illustrated in the following example. Similarly, the alkyl alcohols and diols of sidechains (NL1)–(NL12), (NL18), and (NL20)–(NL24) can be prepared using a hydroxy or dihydroxy alkyl amino starting material.

Example 71

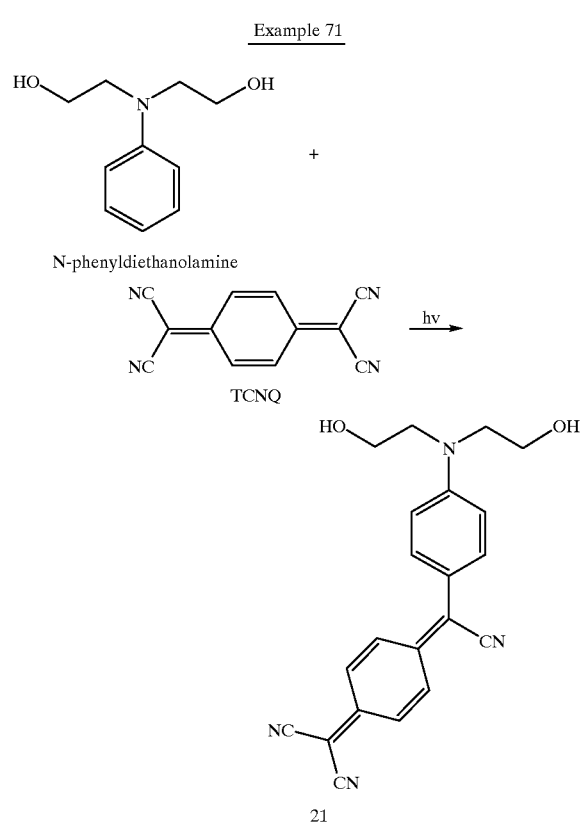

A 1 L reaction flask was charged with N-phenylethanolamine (1.41 g, 7.8 mmoles), TCNQ (7,7,8,8-tetracyanoquinodimethane)(1.6 g, 7.8 mmoles), and DMSO (200 mL). The solution was mechanically stirred and irradiated with a high intensity UV lamp (21 mW/cm$^2$ at 365 nm) for 24 hours. The solvent (150 mL) was removed under vacuum, and the desired tricyanoquinodimethane 21 (75% yield) was collected as dark green crystals by filtration. N-phenylethanolamine is commercially available from Monomer-Polymer & Dajac Labs, Inc.

Polymerization to form appended chiral polymers in accordance with the present invention can be performed using the methods and examples disclosed in the aforementioned commonly assigned U.S. Pat. Nos. 5,777,063, 5,883,218, and 5,856,422 for preparing chiral polymers from dihydroxyaromatic compounds. The examples found below illustrate these synthetic processes.

(I) Dye-Appended Chiral Polycarbonates and Polyurethanes

The dye-appended chiral polycarbonates and polyurethanes are comprised of structural units having formulae (1), (22), and (23)

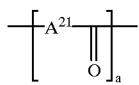

(21)

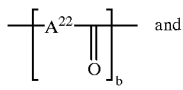
and (22)

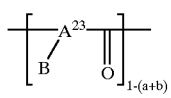

(23)

B is the pendent nonlinear optical sidegroup having one of structures (NL1)–(NL12) above. B is covalently bonded to the chiral polymer backbone at $A^{23}$ of structural unit (23) and is chemically attached through $R^3$ of the selected sidegroup (NL1)–(NL2). $R^3$ is an amino alkoxy, alkyl, alkoxyalkyl, or alkyl ester radical having from 1 to 6 carbons.

In structural units (21), (22), and (23), respectively, $A^{21}$, $A^{22}$, and $A^{23}$ are each independently a structural moiety selected from chiral moieties (IA), (IB), (IIA), (IIB), (IIIA), (IIIB), (IVA), (IVB), (VA), (VB), (VIA), (VIB), (VIIA), or (VIIB) above, or alternatively, selected from structural moieties (VIII), (IX), (X), (XI), (XII), (XIII), (XV), (XVI), and (XVII) depicted above or from the following moiety having formula (XIV)

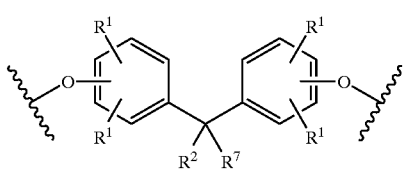

(XIV)

Structural moiety (XIV) is derived from a substituted or unsubstituted bisphenol, such as bisphenol A (BPA), wherein each $R^1$ is hydrogen, and $R^2$ and $R^7$ are methyl groups; or from 4,4'-(hexafluoroisopropylidene)diphenol, commonly known as hexafluorobisphenol A, wherein $R^1$ is hydrogen and $R^2$ and $R^7$ are each trifluoromethyl. However, when the nonlinear optical sidegroup B is bonded to (XIV), then $R^7$ is a radical through which the sidegroup is bonded.

In the aforementioned, each $R^1$, $R^2$, $R^6$ and $R^7$ is as previously defined. In the moiety selected as $A^{23}$, $R^7$ is a radical through which the polymer backbone is bonded to the pendent sidegroup B. Because the polymer is optically active, at least one of $A^{21}$, $A^{22}$, and $A^{23}$ must be a chiral moiety having formula (IA), (IB), (IIA), (IIB), (IIIA), (IIIB), (IVA), (IVB), (VA), (VB), (VIA), (VIB), (VIIA), or (VIIB).

The relative amount, i.e. mole fraction, of structural units (21) is represented as "a", and that of structural units (22) is given as "b". Mole fractions "a" and "b" each independently have a numerical value from 0 to about 0.99. The mole fraction of units (23) is represented by the quantity (1−(a+b)), and the sum of "a" and "b" is from 0 to about 0.99. Thus, the mole fraction of dye-appended structural units (23) is always greater than zero and has a numerical value from about 0.01 to about 1. Preferably, the mole fraction (1−(a+b)) is from about 0.10 to about 0.50. When only structural units (23) are included in the chiral polymer, then both "a" and "b" are 0, and the mole fraction of (23) is 1. In this embodiment, $A^{23}$ must therefore be one of the enantiomeric moieties (IA) through (VIIB), and the dye-appended chiral polymer is a chiral homopolycarbonate. In addition, when the polycarbonate contains only structural units (21) and (23) (b=0), and the formula of $A^{21}$ and $A^{23}$ are the same enantiomeric moiety selected from (IA) through (VIIB), then the appended polycarbonate may also be considered to be a dye-appended chiral homopolycarbonate.

The appended chiral polycarbonates, which include at least one monomer containing chiral moiety (IA), (IB), (IIA), (IIB), (IIIA), (IIIB), (IVA), (IVB), (VA), (VB), (VIA), (VIB), (VIIA), or (VIIB), may also include one or more structural moieties selected from (VIII), (IX), (X), (XI), (XII), (XIII), (XIV), (XV), or (XVI). These polycarbonates may be random and may contain all three structural units ("a" and "b" are other than 0); or may include only two units (a≠0; b=0) randomly dispersed throughout the polymer. In another embodiment, oligomers or trimers comprising all three structural units (21), (22), and (23) may be polymerized to form the chiral polycarbonates, wherein the mole fraction of each structural unit is about 0.33. As used herein, "oligomer" refers to two, three, four, five, or six monomer units (ie. dimer, trimer, tetramer, pentamer, hexamer).

Alternatively, when only two structural units (21) and (23) are included (a≠0; b=0), the copolycarbonates may be alternating, wherein (21) alternates in the polymeric chain with monomers (23). In this embodiment, the mole fractions "a" and and (1−(a+b)) are each about 0.50. When all three monomers (21), (22), and (23) are included, two of the monomers (for example, (21) and (22)) may alternate with the third structural units (in this example, monomers (23)), but otherwise placement of each of the first two monomers ((21) and (22)) in the chain is completely random. In this example, the mole fraction of units (23) would be about 0.50, and the mole fractions of each of monomers (21) and (22) would be other than 0, but the sum thereof, (a+b) would be about 0.50.

To ensure that the appended chiral polymer exhibits optical activity, the overall mole fraction of each selected chiral moiety (IA), (IIA), (IIIA), (IVA), (VA), (VIA), or (VIIA) included in the polymeric chain as monomers (21), (22) and/or (23), must differ from the overall mole fraction of a corresponding selected enantiomer (IB), (IIB), (IIIB), (IVB), (VB), (VIB), or (VIIB) included in the polymer. For example, if $A^{21}$ and $A^{23}$ in structural units (21) and (23) are both chiral indanol moieties having formula (IIA), and $A^{22}$ is the enantiomer (IIB), then the overall mole fraction of structural units (21) and (23) containing (IA), i.e. (a +(1−(a+b)), must differ from the overall mole fraction of (22) containing (IB) or "b". Thus, in this example, "b" and the quantity (a+(1−(a+b)) cannot both equal 0.5. As another example, if only structural units (21) and (23) are included in the polymer (b=0), and $A^{21}$ has formula (IIA) and $A^{23}$ is its enantiomer (IIB), then "a" and (1−(a+b)) cannot both be 0.5. Otherwise, the optical rotations of (IA) and (IB) in both examples would be exactly equal in magnitude but opposite in direction, and the overall optical activity would be canceled after polymerization. Stated another way, for the polymer to be chiral, the sum of the mole fractions of structural units (21), (22) or (23) containing a selected chiral moiety of formula (IA)–(VIIA) must differ from the sum of the mole fractions of the monomers containing the corresponding enantiomer (IB)–(VIIB).

When the chiral polymer is a chiral polyurethane, then one of $A^{21}$, $A^{22}$, or $A^{23}$ is a structural moiety having formula (XVII) above. When $A^{23}$ is moiety (XVII), then the nonlinear optical component, B, is appended to the $R^1$ radical of (XVII). The discussion presented above with respect to random and alternating copolymers is equally applicable to the chiral polyurethanes. In addition, each structural unit (21), (22) or (23) which contains (XVII) as $A^{21}$, $A^{22}$, or $A^{23}$, respectively, is separated by at least one structural unit (21), (22) or (23) in which $A^1$, $A^{22}$, or $A^{23}$, respectively, is other than structural moiety (XVII). More specifically, monomers containing moiety (XVII) cannot be adjacent to one another.

The following examples illustrate the preparation of dye-appended chiral polycarbonates. As would be obvious to one of skill, the examples can be repeated substituting different chiral bisphenols and different NLO dyes listed above.

EXAMPLE 18

Synthesis of Dye-Appended Bisphenol 8

The synthesis is shown in the following scheme where "a" indicates the addition of DEAD, triphenylphosphine and THF.

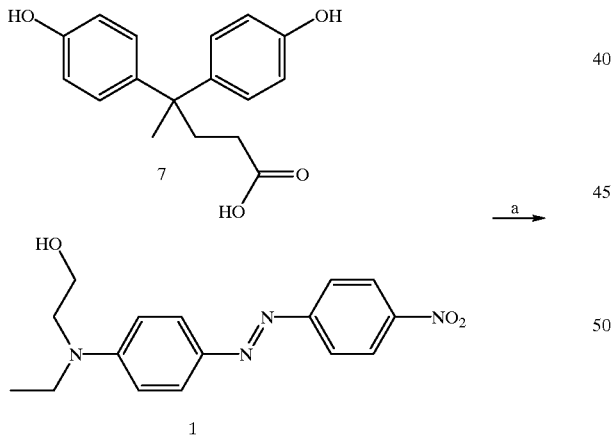

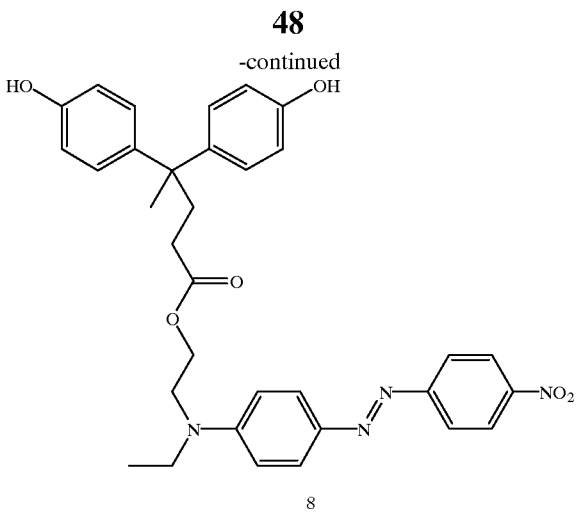

Dye-appended bisphenol 8 was prepared by using Mitsunobu condensation between diphenolic acid 7 and dye 1, N-ethyl-N-hydroxyethyl-4-(4-nitrophenylazo)aniline, which is commercially available from Aldrich Chemical Co. To a magnetically stirred solution of diphenolic acid 7 (5 g, 17.5 mmoles), dye 1 (5.49 g, 17.45 mmoles), and triphenyl phosphine (5.49 g, 21 mmoles) in tetrahydrofuran (THF) (100 mL), was added diethylazodicarboxylate (DEAD) (3.65 g, 21 mmoles) at 0° C. After 15 minutes, the cool bath was removed, and the resulting solution was stirred at room temperature for 2 hours. The solvent was removed and the residue was purified by flash chromatography using ethyl acetate/chloroform (1:3 V/V) as solvent to give the desired dye-containing bisphenol 8 (6 g, 60% yield).

EXAMPLE 19

Synthesis of Alternating Dye-Appended Chiral Polycarbonate 9

The reaction scheme is depicted as follows where "b" indicates the addition of (R)(+)-IBP, BPA-bischloroformate, DMAP, and $CH_2Cl_2$.

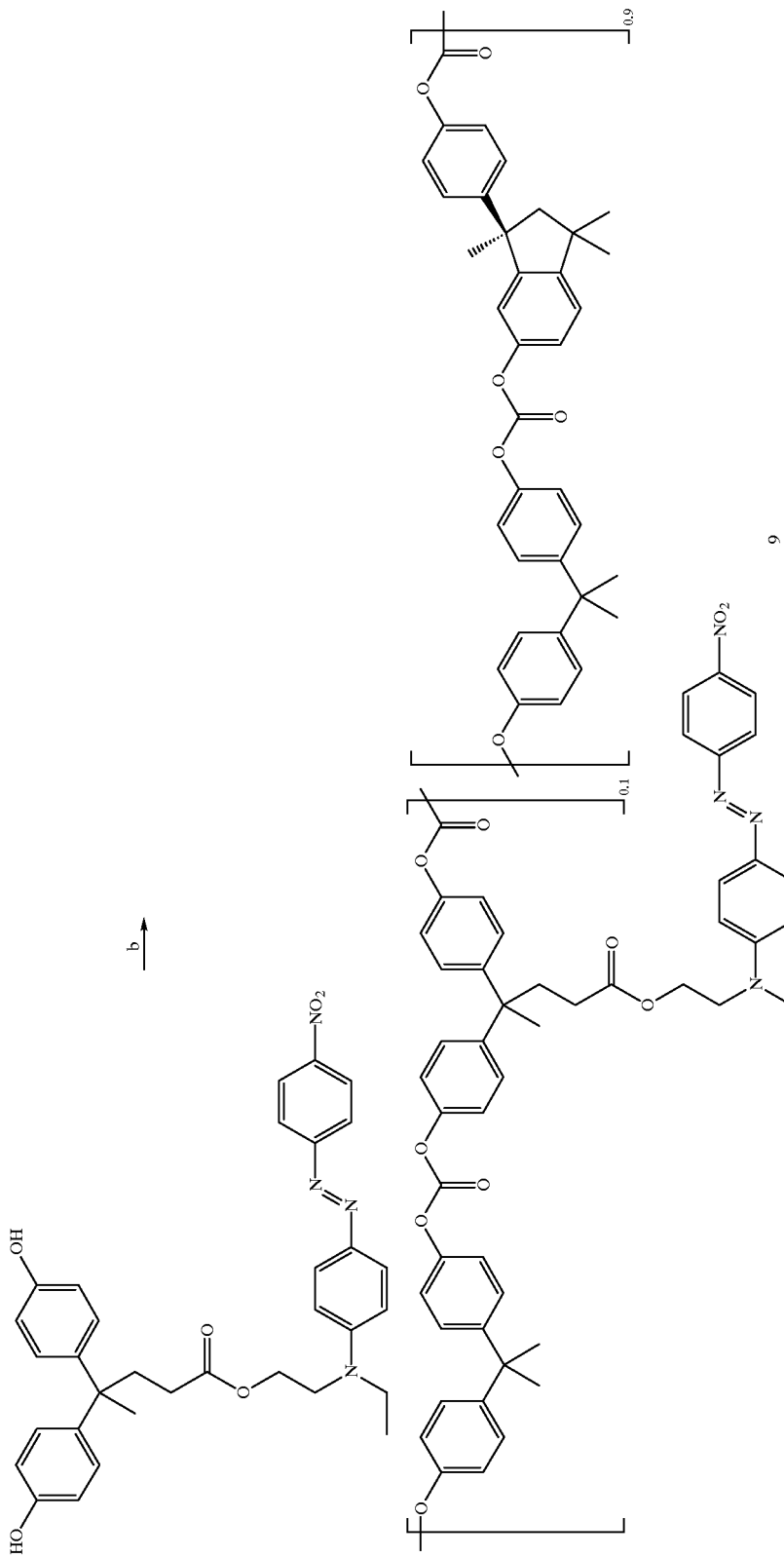

In a two-neck round bottomed flask equipped with a stirrer, a reflux condenser, and an addition funnel, dye-appended bisphenol 8 (1.56 g, 2.7 mmoles) from Example 18 was stirred with chiral indane bisphenol (R)(+)-IBP (6.63 g, 24.7 mmoles), 4-dimethylaminopyridine (DMAP) (7.36 g, 60.2 mmoles) and 112 mL methylene chloride ($CH_2Cl_2$) for 10 minutes under ambient conditions. The addition funnel contained a solution of BPA bischloroformate (9.74 g, 27.6 mmoles) in 60 mL $CH_2Cl_2$. The reaction was maintained under an inert atmosphere. The solution in the flask was then heated, and the addition of the BPA bischloroformate solution began. The reaction refluxed (~50° C.) while the chloroformate solution was added over three hours. The reaction was then stirred for one additional hour. 4-Cumylphenol (636.9 mg, 3 mmoles) was added, and the solution was stirred one additional hour. The chiral polymer solution was washed with a 1.0 M aqueous solution of hydrochloric acid, then water and brine. The organic phase (polymer solution in $CH_2Cl_2$) was dried over $MgSO_4$ then concentrated to approximately 80 mL on a rotary evaporator. The polymer was isolated by pouring this solution into methanol (750 mL). The polymer was collected by filtration and dried in vacuo for 72 hours to give the desired dye-appended chiral polycarbonate 9, which was an orange granular powder (14 g, 80% yield, Mw=31.6 kg/mole).

The dye-appended chiral polycarbonate 9 comprised structural units (21), (22), and (23) above, wherein $A^{21}$ was chiral indane moiety (IIB) derived from (R)(+)-IBP. $A^{22}$ and $A^{23}$ were both BPA moiety (XIV). Each $R^1$ was hydrogen; each $R^2$ was methyl; $R^7$ was methyl in structure (IIB), and $R^7$ was a radical in structure (XIV) through which the chiral polymer was covalently bonded from $A^{23}$ to NLO sidegroup B. B was (NL3), wherein "x" was 0, $R^4$ was ethyl, and $R^3$ was an amino ethyl propionate radical. The mole fraction "a" of structural units (21) was 0.45; "b" of structural units (22) was 0.50; and the mole fraction (1−(a+b)) of structural units (23) was 0.05. The appended chiral polycarbonate was an alternating copolymer, wherein each BPA structural unit (22) alternated in the polymer chain with a structural unit of (21) or (23), but otherwise, the placement of each (21) and (23) structure in the chain was completely random.

EXAMPLE 20

Synthesis of Random Dye-Appended Chiral Polycarbonate

Dye-appended bisphenol 8 is prepared according to Example 18. Dye-appended bisphenol 8 (1.444 g, 2.5 mmoles), (R)(+)-IBP (0.671 g, 2.5 mmoles), and o-nitrophenyl carbonate (1.52 g, 5.00 mmoles) are stirred in methylene chloride (10 mL) for 10 minutes in a two-neck round bottomed flask equipped with a stirrer and a reflux condenser. DMAP (250 μL of a 0.10 M solution in toluene) is added, then the solution is stirred at reflux (~50° C.) for 5 hours. The heat is then removed, and the solution continues stirring under ambient conditions for 20 hours longer. The polymer solution is precipitated in methanol (250 mL), and the polymer is collected on a Buichner funnel. Last traces of o-nitrophenol by-product are removed from the polymer by preparing a methylene chloride (10 mL) solution containing the polymer and precipitating the polymer from methanol (100 mL) twice more. This results in a powder.

The dye-appended chiral polycarbonate comprises structural units (21) and (23) above, wherein $A^{21}$ is chiral indane moiety (IIB) derived from (R)(+)-IBP. $A^{23}$ is BPA moiety (XIV). Each $R^1$ is hydrogen; each $R^2$ is methyl; $R^7$ is methyl in structure (IIB), and $R^7$ is a radical in structure (XIV) through which the chiral polymer is covalently bonded from $A^{23}$ to NLO sidegroup B. B is (NL3), wherein "x" is 0, $R^4$ is ethyl, and $R^3$ is an amino ethyl propionate radical. The mole fraction "a" of structural units (21) is 0.50; "b" of structural units (22) is 0; and the mole fraction (1−(a+b)) of structural units (23) is 0.50. Chiral structural units (21) are randomly dispersed in the polymeric chain with dye-appended BPA units (23).

(II) Dye-Appended Chiral Polyesters

The chiral polyesters appended with the nonlinear optical component dye are comprised of (i) structural units having formulae (31) and (32)

(31)

(32)

and (ii) structural units selected from the group having formulae (3), (3'), or (3")

(3)

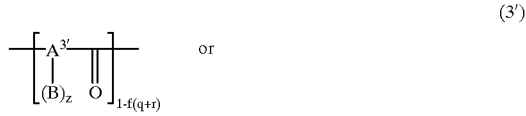

(3')

(3")

B is the pendent nonlinear optical sidegroup selected from the group of (NL1)–(NL12) which is chemically bonded through $R^3$ to structural units (32), (3), (3'), or (3") of the chiral polyester backbone. $R^3$ is as previously defined.

In structural units (31) and (32), respectively, $A^{31}$ and $A^{32}$ are each independently a chiral moiety selected from (IA), (IB), (IIA), (IIB), (IIIA), (IIIB), (IVA), (IVB), (VA), (VB), (VIA), (VIB), (VIIA), or (VIIB) above, or instead may be a structural moiety selected from formulae (VIII), (IX), (X), (XI), (XII), (XIII), (XIV), (XV), and (XVI), as previously depicted. However, because the polyester is optically active, at least one of $A^{31}$ and $A^{32}$ must be a chiral moiety having formula (IA), (IB), (IIA), (IIB), (IIIA), (IIIB), (IVA), (IVB), (VA), (VB), (VIA), (VIB), (VIIA), or (VIIB).

In the structural units of part (ii), $A^3$ is a structural moiety having formula (XXIII) below; $A^{3'}$ is a structural moiety having formula (XVIII), and $A^{3"}$ is a structural moiety having formula (XIX). Formulae (XVIII) and (XIX) are shown and discussed above in connection with the doped chiral polyesters.

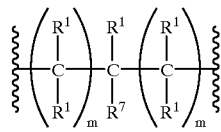

(XXIII)

In formula (XXIII), each "m" is independently 0 or is an integer from 1 to 10. $R^1$ and $R^7$ are previously defined. Like polyester structural units (XXII) previously discussed in connection with the doped chiral polyesters, structural moieties (XXIII) are derived from alkyl dicarboxylic acid halides containing up to 20 carbon atoms, but most often containing 4–8 carbons. Examples include adipoyl chloride, succinyl chloride, glutaryl dichloride, or pimeloyl chloride. In structure (XXIII), the sum of each "m" when added together plus 1 (for the central carbon) is the number of carbons in the alkyl group.

In structural units (32), (3), (3'), and (3"), "z" is 0 or 1. When "z" is 0, the NLO pendent sidegroup B is chemically bonded to $A^{32}$; and when "z" is 1, B is covalently bonded to $A^3$, $A^{3'}$ or $A^{3"}$.

The mole fraction of structural units (31) is "q", and the mole fraction of structural units (32) is represented as "r".

The quantity $(1-(q+r))$ is the mole fraction of structural units (3); the quantity $(1-f(q+r))$ is the mole fraction of structural units (3'); and the quantity $(1-f'(q+r))$ is the mole fraction of structural units (3") in the chiral polyester. The numerical values of "q" and "r" are each independently 0 to about 0.99, but the sum of "q" and "r" is greater than zero and less than or equal to about 0.99. When "z" is 0, then "r" is greater than zero but less than or equal to about 0.99.

With respect to polyester structures (3') and (3"), f and f' each multiply the quantity (q+r) and are each 1 except if the sum of "q" and "r" is about 0.5. Then f and f' may each independently have a value greater than 1 but less than 2, and both formulas (3') and (3") are selected as structural units of part (ii) in the appended chiral polyester.

To ensure optical activity in the chiral polyesters, when $A^{31}$ is (IA), (IIA), (IIIA), (IVA), (VA), (VIA), or (VIIA), and $A^{32}$ is respectively (IB), (IIB), (IIIB), (IVB), (VB), (VIB), or (VIIB), or when $A^{31}$ is (IB), (IIB), (IIIB), (IVB), (VB), (VIB), or (VIIB), and $A^{32}$ is respectively (IA), (IIA), (IIIA), (IVA), (VA), (VIA), or (VIIA), then the mole fraction "r" of structural units (32) corresponding to $A^{32}$ must differ from the mole fraction "q" of structural units (3 1) corresponding to $A^{31}$.

The discussion presented above concerning "random" and "alternating" polymers is equally applicable to the appended chiral polyesters. However, each structural unit of part (ii) must be separated by at least one structural unit of part (i).

EXAMPLE 21

Synthesis of Dye-Appended Chiral Polyester

The synthesis is depicted in the following scheme.

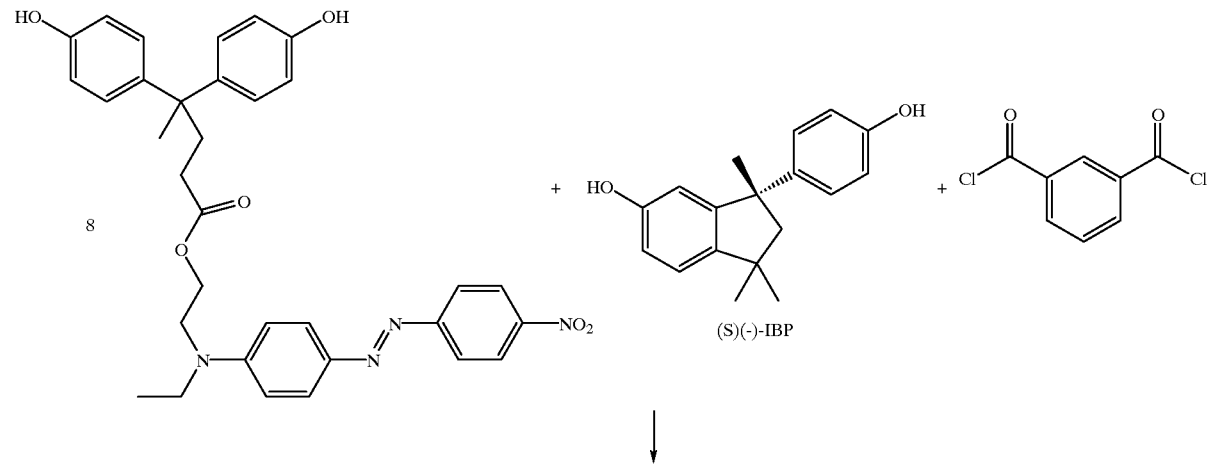

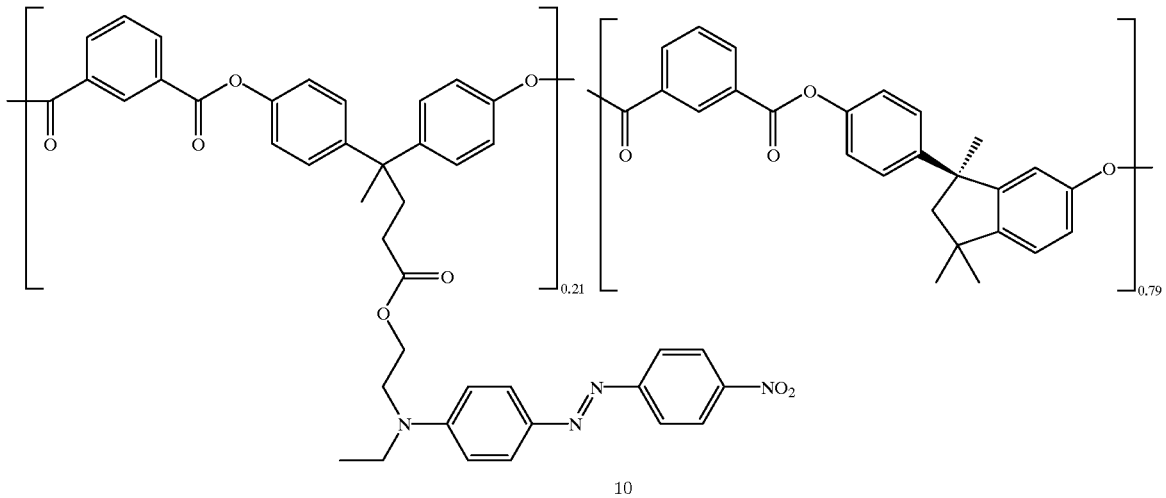

10

Dye-appended bisphenol 8 (1.56 g, 2.7 mmoles), which is prepared according to the procedure of Example 18, (S)(–)-IBP( 2.68 g, 10 mmoles), and dimethylaminopyridine (DMAP)(3.2 g, 25.4 mmoles) in 42 mL methylene chloride are stirred for 10 minutes in a two-neck flask equipped with a condenser, nitrogen atmosphere and an addition funnel filled with a solution of isophthaloyl chloride (2.62 g, 12.7 mmoles) in 25 mL methylene chloride. The solution of acid chloride in the addition funnel is added over 60 minutes, during which time the reaction is slightly exothermic. After the monomer addition is complete, the reaction is stirred an additional 3 hours at room temperature. The dye-appended chiral polyester 10 is isolated by reprecipitating it in 300 mL acetone and collecting the solid by filtration. The solid is taken up in 40 mL chloroform and reprecipitated a second time in 300 mL methanol to give a solid that is then dried 18 hours at 60° C.

The dye-appended chiral polyester 10 comprises structural units (31), (32), and (3) above, wherein "z" is 0, and NLO sidegroup B is bonded to units (32). In structural units (31), $A^{31}$ is chiral indane moiety (IIA) derived from (S)(–)-IBP; in (32), $A^{32}$ is BPA moiety (XIV); and in (3), $A^3$ is structural moiety (XIX). Each $R^1$ is hydrogen, and each $R^2$ is methyl. In structural moieties (IIA) and (XIX), $R^7$ is methyl. In structure (XIV) of $A^{32}$, $R^7$ is a radical through which the chiral polymer is covalently bonded to NLO sidegroup B. B is (NL3), wherein "x" is 0, $R^4$ is ethyl, and $R^3$ is an amino ethyl propionate radical. The mole fraction "q" of structural units (31) is about 0.4; "r" of structural units (32) is about 0. 1; and the mole fraction (1–(a+b)) of structural units (3) is about 0.50. The appended chiral polyester is an alternating copolymer, wherein each structural unit (3) alternates in the polymer chain with a structural unit of (31) or (32), but otherwise, the placement of each (31) and (32) structure in the chain is completely random.

(III) Dye-Appended Chiral Poly(aryl)ethers

Similar to the doped chiral polymers, the appended chiral poly(aryl)ether polymers according to the present invention include chiral polyetherimides, polyethersulfones, and polyetherketones.

Dye-Appended Chiral Polyetherimides

The dye-appended chiral polyetherimides comprise structural units (4), (5), and (6)

 (4)

 and (5)

 (6)

B is the pendent sidegroup selected from the group of (NL1)–(NL12) which is chemically bonded to the chiral polymer backbone through $R^3$. $R^3$ is as previously defined (an alkylene, alkoxyalkylene, or alkylester radical).

The mole fraction of structural units (4) is given by "c", and that of structural units (5) is represented as "d". The values of "c" and "d" each independently have a value from 0 to about 0.99, and the sum of "c" and "d" is from 0 to about 0.99. The quantity (1–(c+d)), which is from about 0.01 to 1.0, is the mole fraction of structural units (6) containing the nonlinear optical chromophore B. In the dye-appended chiral copolyetherimides, structural units (4), (5), and (6) are randomly dispersed along the polymeric chain backbone.

In structural units (6), "e" is 0 or 1. When "e" is 1, the pendent sidegroup B is chemically bonded to $A^6$; and when "e" is 0, the NLO sidegroup B is chemically bonded to $Z^2$ of structural units (6).

$A^4$, $A^5$, and $A^6$ in structural units (4), (5), and (6), respectively, are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), (XX), or (XXI), as shown above, or are each independently a single bond, —O—, —S—, —SO$_2$—, —CO—, —C(CH$_3$)$_2$—, —C(CD$_3$)$_2$—, or —C(CF$_3$)$_2$—.

When $A^6$ is the same chiral moiety as $A^4$, and the mole fraction "d" of structural units (5) is 0, then the appended chiral polyethermide is a dye-appended chiral homopolyetherimide.

Because the polyetherimide is optically active, at least one of $A^4$, $A^5$, and $A^6$ must be a chiral moiety having formula (IA), (IB), (IIA), (IIB), (IIIA), (IIIB), (IVA), (IVB), (VA), (VB), (VIA), (VIB), (VIIA), or (VIIB). In addition, when a chiral moiety (IA)–(VIIB) is included in more than one of the structural units, the sum of the mole fractions of structural units (4), (5) and/or (6) containing a selected chiral moiety having formula (IA), (IIA), (IIIA), (IVA), (VA), (VIA), or (VIIA) must differ from the sum of the mole fractions of structural units (4), (5), and/or (6) containing a selected corresponding enantiomer (IB), (IIB), (IIIB), (IVB), (VB), (VIB), or (VIIB).

In the appended chiral polyetherimides, $Z^2$ is a structural moiety selected from formulae (Z1), (Z2), (Z3), (Z4), (Z5), (Z6), (Z7), and (Z8)

(IIIB), (IVB), (VB), (VIB), or (VIIB) when $A^6$ is respectively formula (IA), (IIA), (IIIA), (IVA), (VA), (VIA), or (VIIA). Furthermore, when "c" is 0, and "d" is greater than 0, and $A^5$ and $A^6$ are each the same selected chiral moiety, and $Z^2$ is formula (Z8), then $Y^1$ is other than (IA), (IIA), (IIIA), (IVA), (VA), (VIA), or (VIIA) when $A^5$ and $A^6$ each have respective formula (IB), (IIB), (IIIB), (IVB), (VB), (VIB), or (VIIB), and $Y^1$ is other than (IB), (IIB), (IIIB), (IVB), (VB), (VIB), or (VIIB) when $A^5$ and $A^6$ each have respective formula (IA), (IIA), (IIIA), (IVA), (VA), (VIA),

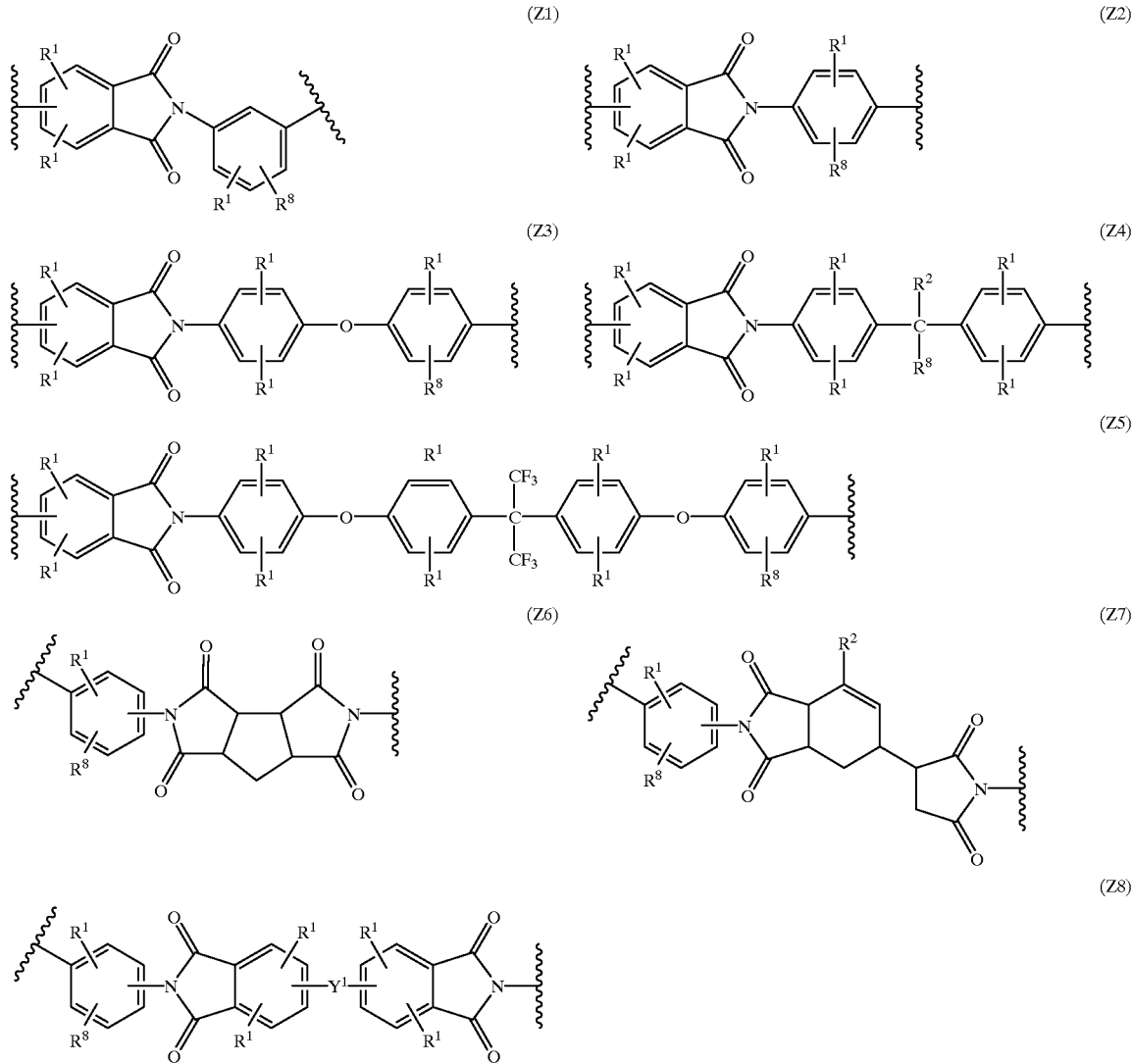

In structures (Z1) through (Z8), $R^8$ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, except in structural units (6) when the NLO chromophore B is chemically bonded to $Z^2$; then $R^8$ is a radical through which the polymer backbone is bonded to B.

In formula (Z8), $Y^1$ is as previously defined. However, when "c" and "d" are both 0, and $A^6$ is one of chiral moieties (IB), (IIB), (IIIB), (IVB), (VB), (VIB), or (VIIB), then $Y^1$ is respectively other than (IA), (IIA), (IIIA), (IVA), (VA), (VIA), or (VIIA). Likewise, $Y^1$ is other than (IB), (IIB), or (VIIA). Otherwise, the optical activity of the chiral monomers would cancel each other upon polymerization. Thus, to ensure that the polymer is optically active, the amount of one selected chiral moiety (IA) through (VIIA) included in the chiral polyetherimide cannot equal the amount of its corresponding enantiomer (IB) through (VIIB).

Phthalimide structures (Z1)–(Z5) can be prepared by reacting dianhydrides prepared from N-alkyl-4-nitrophthalimides with the diamines corresponding to structures (Z16a), (Z16b), (Z16c), (Z16d), and (Z16e) above, as described in the aforementioned commonly assigned U.S. Pat. No. 5,856,422. Phenylene structures (Z6)–(Z8) can be prepared by reacting the dianhydrides of the moieties (Z17a), (Z17b), and (Z17c) with a diphenoxyamine, which is also described in the aforementioned patent.

In the dye-attached chiral polyetherimides, $Z^1$ is a phthalimide moiety having structural formula (Z16') when $Z^2$ has formula (Z1), (Z2), (Z3), (Z4), or (Z5), and $Z^1$ is a phenylene residue of formula (Z17') when $Z^2$ has formula (Z6), (Z7), or (Z8). Structures (Z16') and (Z17') are depicted and discussed above in connection with the doped chiral polyetherimides. Like the doped chiral polyetherimides, it should be noted that the structure of $Z^2$ may be, but need not be, the same in all (4), (5), and (6).

Each $R^1$, $R^2$, $R^6$, and $R^7$ in the above structures is as previously defined. However, when the pendent sidegroup B is chemically bonded to $A^6$, then $R^7$ in $A^6$ is a radical through which the polymer backbone is bonded to the pendent sidegroup B.

The following example is illustrative.

EXAMPLE 22

Synthesis of Dye-Appended Chiral Polyetherimide

The following scheme illustrates the synthesis.

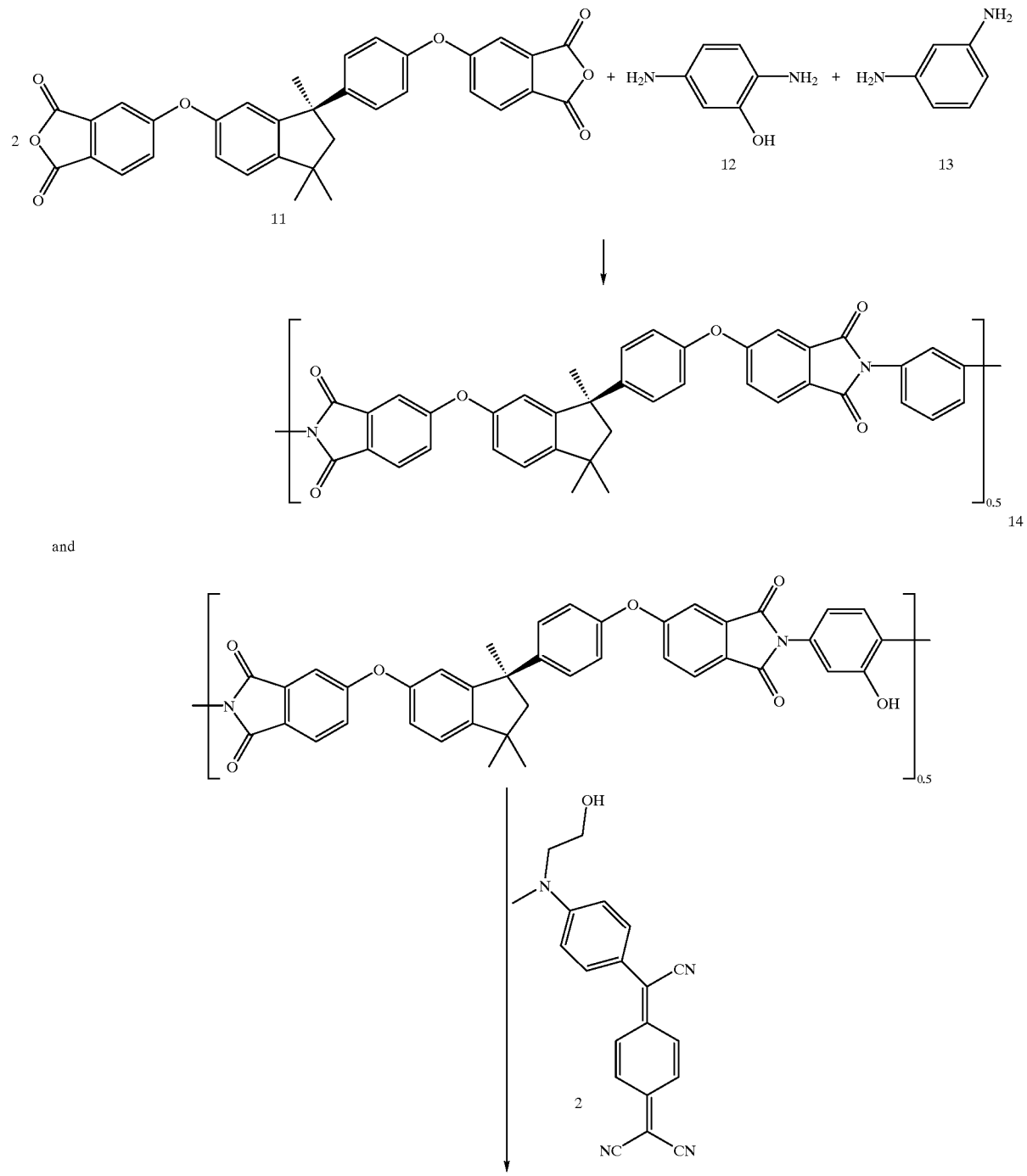

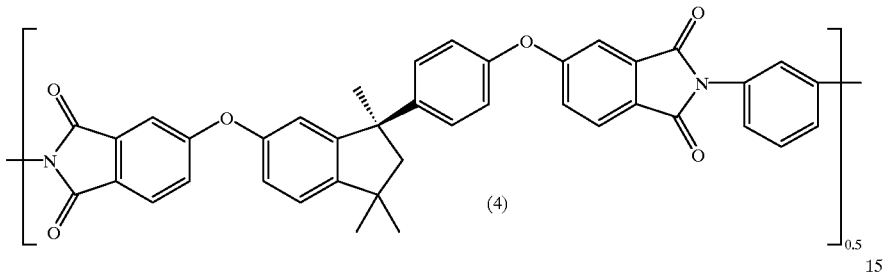

(4)

and

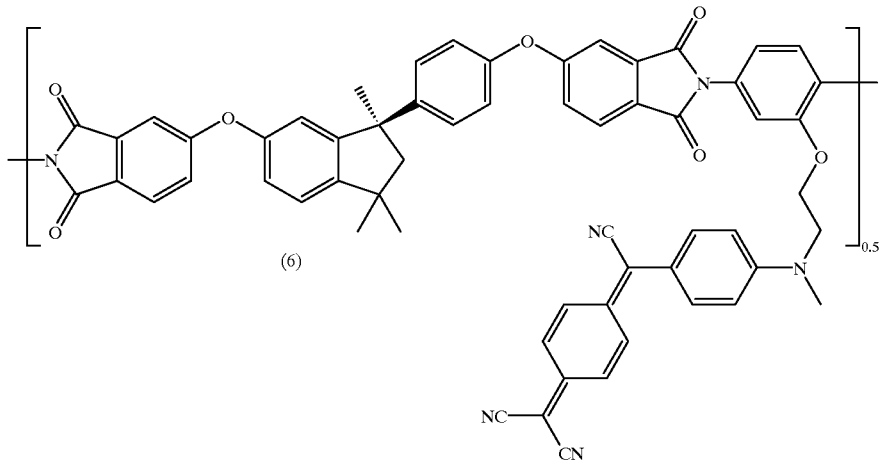

(6)

The reaction is conducted in an argon-filled glove box. A 100 mL flask is charged with (R)(+)-IBP-dianhydride 11 (3.33 g, 5.94 mmoles), diamine 12 (0.368 g, 2.97 mmoles), diamine 13 (0.321 g, 2.97 mmoles), and N-methyl-2-pyrrolidinone (NMP) (20 g), and the solution is stirred under ambient conditions for 24 hours. The solution is removed from the glove box and toluene (5 mL) is added. The polyamic acid solution is thermally imidized by azeotropic distillation at 175° C. for 6 hours. The solution is poured into 500 mL of water with stirring, and the chiral polymer precipitates, is collected by filtration, and is dried at 180° C. for 12 hours. The desired hydroxyl-containing polyimide 14 is obtained as a solid.

A 250 mL 3 neck flask is charged with triphenylphosphine (0.78 g, 2.97 mmoles), hydroxyl-containing polyimide 14 (4 g), and THF (60 mL), and the mixture is stirred until all the chiral polymer is dissolved (about 30 min). NLO dye 2, 7-[(4-methyl-4-hydroxylethylamino)phenyl]-7,8,8-tricyanoquinodimethane (0.975 g, 2.97 mmoles) is added. The solution is cooled to −60° C., and diethylazodicarboxylate (DEAD) (0.467 mL, 2.97 mmoles) is added via syringe. The temperature of the solution is slowly brought up to 20° C. over 8 hours and stirred at room temperature for another 4 hours. The solvent is evaporated, and the polymer is removed from the flask with the aid of methanol. The crude polymer is then subjected to soxhlet extraction with methanol for 24 hours, and dried at 120° C. under vacuum overnight to give the dye-appended chiral polyimide 15.

The dye-appended chiral polyimide comprises structural units (4) and (6) above, wherein both $A^4$ and $A^6$ are chiral indane moiety (IIB) derived from (R)(+)-IBP. In structure (6), "e" is 0, and thus, the NLO sidegroup is chemically attached to $Z^2$ of structural units (6). $Z^1$ is moiety (Z16'). In structural units (4), $Z^2$ is moiety (Z1), and in units (6), $Z^2$ is (Z2). Each $R^1$ is hydrogen; each $R^2$ is methyl; $R^7$ is methyl in structure (IIB). In moiety (Z2) of units (6), $R^8$ is a radical through which the chiral polymer is covalently bonded to NLO sidegroup B. B is (NL2), wherein "x" is 0, $R^4$ is methyl, and $R^3$ is an amino ethoxy radical. The mole fraction "c" of structural units (4) is 0.50; "d" of structural units (5) is 0; and the mole fraction (1−(c+d)) of structural units (6) is 0.50. Chiral structural units (4) are randomly dispersed in the polymeric chain with dye-appended chiral units (6).

Dye-Appended Chiral Polyelhersvzfones and Polyetherketones

In one embodiment, dye-appended chiral polyethersulfones and polyetherketones of the present invention include structural units having formulae (17), (18), and (19)

 (17)

 and (18)

 (19)

B is the pendent sidegroup selected from the group of (NL1)–(NL12) which is chemically bonded to said chiral polymer backbone through $R^3$, as previously defined.

Variable "u" is the mole fraction of structural units (17); "v" is the mole fraction of structural units (18): and the quantity (1−(u+v)) is the mole fraction of structural units (19), wherein "u" and "v" each independently have a value from about 0 to about 0.99, and the sum of "u" and "v" is from about 0 to about 0.99. The quantity (1−(u+v)) is from about 0.01 to 1.0. In the dye-appended chiral copolyethersulfones and copolyetherketones, structural units (17), (18), and (19) are randomly dispersed along the polymeric chain backbone.

In structural units (19), "e" is 0 or 1. When "e" is 1, the pendent sidegroup B is chemically bonded to $A^{19}$, and when "e" is 0, the NLO sidegroup B is chemically bonded to $Z^4$ of structural units (19).

$A^{17}$, $A^{18}$, and $A^{19}$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), and (XX) above.

To ensure optical activity, at least one of $A^{17}$, $A^{18}$, and $A^{19}$ is a chiral moiety having formula (IA), (IB), (IIA), (IIB), (IIIA), (IIIB), (IVA), (IVB), (VA), (VB), (VIA), (VIB), (VIIA), or (VIIB). Furthermore, when a chiral moiety (IA) through (VIIB) is included as $A^{17}$, $A^{18}$, and/or $A^{19}$ in more than one of the structural units, the sum of the mole fractions of structural units (17), (18) and (19) containing a selected chiral moiety having formula (IA), (IIA), (IIIA), (IVA), (VA), (VIA), or (VIIA) must differ from the sum of the mole fractions of structural units (17), (18), and (19) containing a selected corresponding enantiomer (IB), (IIB), (IIIB), (IVB), (VB), (VIB), or (VIIB).

In the appended chiral polyethersulfones and polyetherketones, $Z^3$ is a structural moiety selected from the group having formulae (Z10), (Z11), (Z12), and (Z13), which are previously described. $R^8$ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof except in structural units (19) when the pendent sidegroup B is chemically bonded to $Z^3$. Then $R^8$ in formulae (Z10)–(Z13) of structural units (19) is a radical through which the polymer backbone is bonded to B.

Furthermore, each $R^1$, $R^2$, and $R^7$ is as previously defined. However, when the pendent sidegroup B is chemically bonded to $A^{19}$, then $R^7$ in the structural moiety selected as $A^{19}$ is a radical through which the polymer backbone is bonded to NLO sidegroup B. The following example is illustrative.

EXAMPLE 23

Synthesis of Dye-Appended Chiral Polyethersulfone

The reaction is depicted in the following scheme:

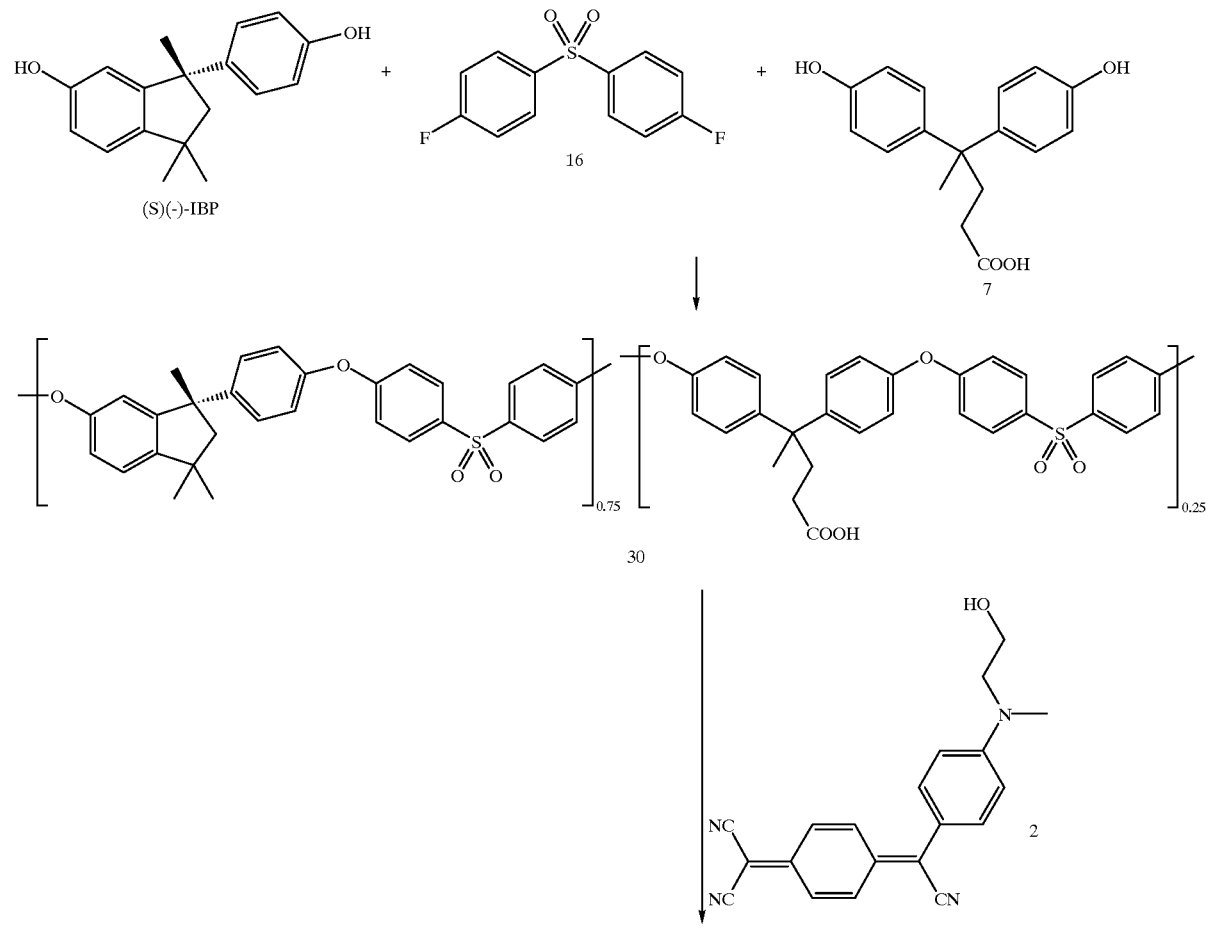

-continued

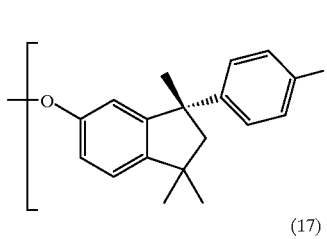

(17)

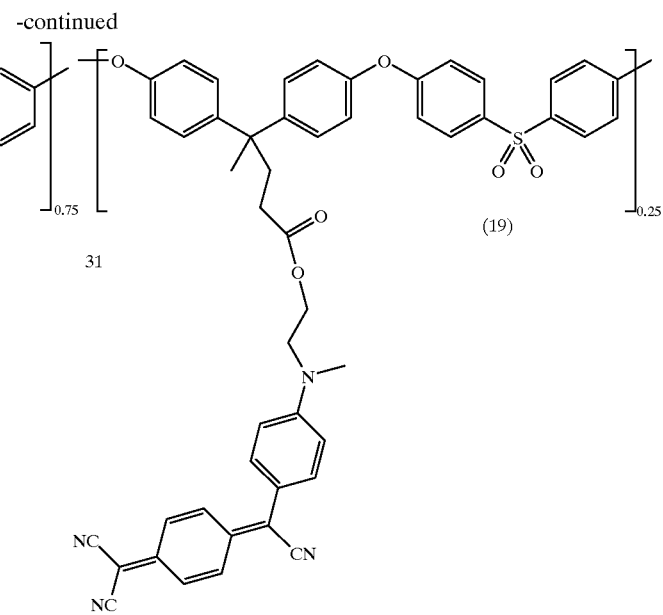

31

Synthesis of Chiral Polyethersulfone 30

The polymerization reaction is conducted in a 100 mL three-neck round bottomed flask which is equipped with a nitrogen inlet, thermometer, Dean-Stark trap and condenser. The reaction vessel is charged with chiral diol (S)(−)-IBP (4.36 g, 16.24 mmoles), diphenolic acid 7 (1.55 g, 5.41 mmoles), 4-fluorophenylsulfone 16 (5.5 g, 21.66 mmoles), potassium carbonate (6 g), N,N-dimethylacetamide (DMAC) (45 g) and toluene (10 mL). The resulting mixture is refluxed for 1 hour at 140° C., and the temperature is raised to 155° C. by removing toluene. The reaction mixture is kept at 155° C. for 1 hour while the solution viscosity of the polymer increases. The reaction mixture is cooled and precipitated into MeOH (100 mL). The crude product is collected and dried and redissolved in chloroform (50 mL), then filtered through a layer of CELITE®. The solvent of the filtrate is removed and dried in a vacuum oven at 120° C. for 8 hours to yield polymer 30.

Synthesis of Dye-Appended Chiral Polyethersulfone 31

A 250 mL, three neck round bottomed flask is charged with triphenylphosphine (0.84 g, 3.08 mmoles), polymer 30 (6 g), and THF (100 mL). The mixture is stirred until all the polymer is dissolved (about 30 min). NLO dye 2 (1.01 g, 3.08 mmoles) is added, and the solution is cooled to −60° C. Diethylazodicarboxylate (0.484 mL, 3.08 mmoles) is then added via syringe. The temperature of the solution is slowly brought up to 20° C. over an 8 hour period, then stirred at room temp for another 4 hours. The solvent is evaporated, and the polymer is removed from the flask with the aid of methanol. The crude polymer is then subjected to soxhlet extraction with methanol for 24 hours, and dried at 120° C. under vacuum overnight to give chiral polyethersulfone 31.

The dye-appended chiral polyethersulfone 31 comprises structural units (17) and (19) above, wherein "e" is 1, and NLO sidegroup B is bonded to units (19). $Z^3$ is sulfone moiety Z10, wherein each $R^1$ and $R^8$ is hydrogen. In structural units (17), $A^{17}$ is chiral indane moiety (IIA) derived from (S)(−)-IBP, and in (19), $A^{19}$ is BPA moiety (XIV). Each $R^1$ is hydrogen, and each $R^2$ is methyl. In structural moiety (IIA), $R^7$ is methyl. In structure (XIV) of $A^{19}$, $R^7$ is a radical through which the chiral polymer is covalently bonded to NLO sidegroup B. B is (NL2), wherein "x" is 0, $R^4$ is methyl, and $R^3$ is an amino ethyl propionate radical. The mole fraction "u" of structural units (17) is about 0.75, "v" is 0, and the mole fraction (1−(u+v)) of structural units (19) is about 0.25. Structural units (17) are randomly dispersed in the polymeric chain with dye-appended units (19).

EXAMPLE 24

Synthesis of Dye-Appended Chiral Polyetherketone

The procedure of Example 23 is repeated substituting 4,4'-difluorobenzophenone instead of 4-fluorophenylsulfone 16 as starting material. The resulting dye-appended polymer is the same as structure 31 except that $Z^3$ in structural units (17) and (19) is ketone moiety Z12, wherein each $R^1$ and $R^8$ is hydrogen.

Dye-Appended Chiral Poly(aryl)ethers

In another embodiment of the present invention, the dye-appended chiral poly(aryl)ethers comprise structural units (7), (8), and (9)

  (7)

  (8)

and

  (9)

The relative amounts of structural units (7), (8), and (9) in the chiral polyethers are represented as mole fractions, where "g" is the mole fraction of structure (7), "h" is the mole fraction of structure (8), and the quantity (1−(g+h)) is the mole fraction of structure (9). The values of "g" and "h" are each independently from 0 to about 0.99, and the sum of "g" and "h" is from 0 to about 0.99. Structural units (7), (8), and (9) are randomly dispersed in the polymer chain. In structures (7) and (8), "n" is 0 or 1.

B' is the pendent sidegroup bonded to monomer (9) and is one of nonlinear optical residues (NL18)–(NL28). As previously defined, each $R^9$ of the pendent sidegroup (NL18)–(NL28) is independently a radical or an alkyl radical having from 1 to 6 carbon atoms or a deuterated equivalent thereof Covalent bonding to units (9) occurs through each radical $R^9$ of the selected dye. In structural units (9), "p" is 0 when B' has formula (NL18), (NL19), (NL20), (NL21), (NL22), (NL23), or (NL24), and "p" is 1 when B' has formula (NL25), (NL26), (NL27), or (NL28).

Each $A^7$, $A^8$ and $A^9$ of structural units (7), (8), and (9) is independently a structural moiety, such as one of chiral moieties (IA), (IB), (IIA), (IIB), (IIIA), (IIIB), (IVA), (IVB), (VA), (VB), (VIA), (VIB), (VIIA), and (VIIB), or may instead be one of structural moieties (VIII), (IX), (X), (XI), (XII), (XIII), (XV), (XVI), or (XX) above.

Because the polymers are chiral, at least one of $A^7$, $A^8$, and $A^9$ is a chiral moiety selected from formulae (IA), (IB), (IIA), (IIB), (IIIA), (IIIB), (IVA), (IVB), (VA), (VB), (VIA), (VIB), (VIIA), and (VIIB). In addition, to maintain overall optical activity in the chiral polyether, the sum of the mole fractions of any structural units (7), (8) and (9) containing a selected chiral moiety having formula (IA), (IIA), (IIIA), (IVA), (VA), (VIA), or (VIIA) must differ from the sum of the mole fractions of structural units (7), (8), and (9) containing a selected corresponding enantiomer (IB), (IIB), (IIIB), (IVB), (VB), (VIB), or (VIIB).

When "n" is 1, and the appended polymer is a chiral polyethersulfone, then $Z^3$ in structures (7) and (8) is a structural moiety having formula (Z10) above. In the dye-appended chiral polyetherketones when "n" is 1, $Z^3$ is a structural moiety having structural formula (Z11), (Z12), or (Z13), also described and depicted earlier. In this embodiment, $R^8$ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof In appended monomeric units (9), each $Z^4$ is a phenylene moiety having structure (Z14) or (Z15)

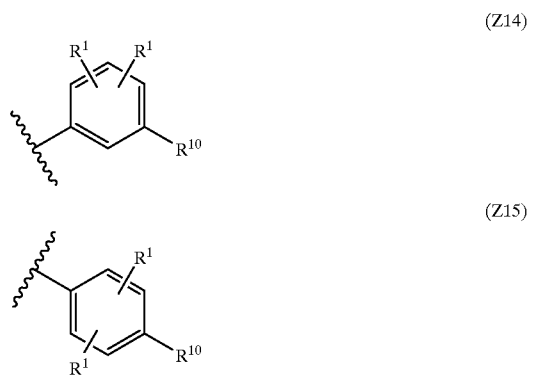

Each $R^1$, $R^2$, $R^6$, and $R^7$ and the wavy lines are as previously defined, and $R^{10}$ is a radical through which the chiral polymer backbone is covalently bonded to NLO sidegroup B'.

The following examples are illustrative.

EXAMPLE 25

Synthesis of Dye-Appended Chiral Polyethersulfone

The reaction is depicted in the following scheme.

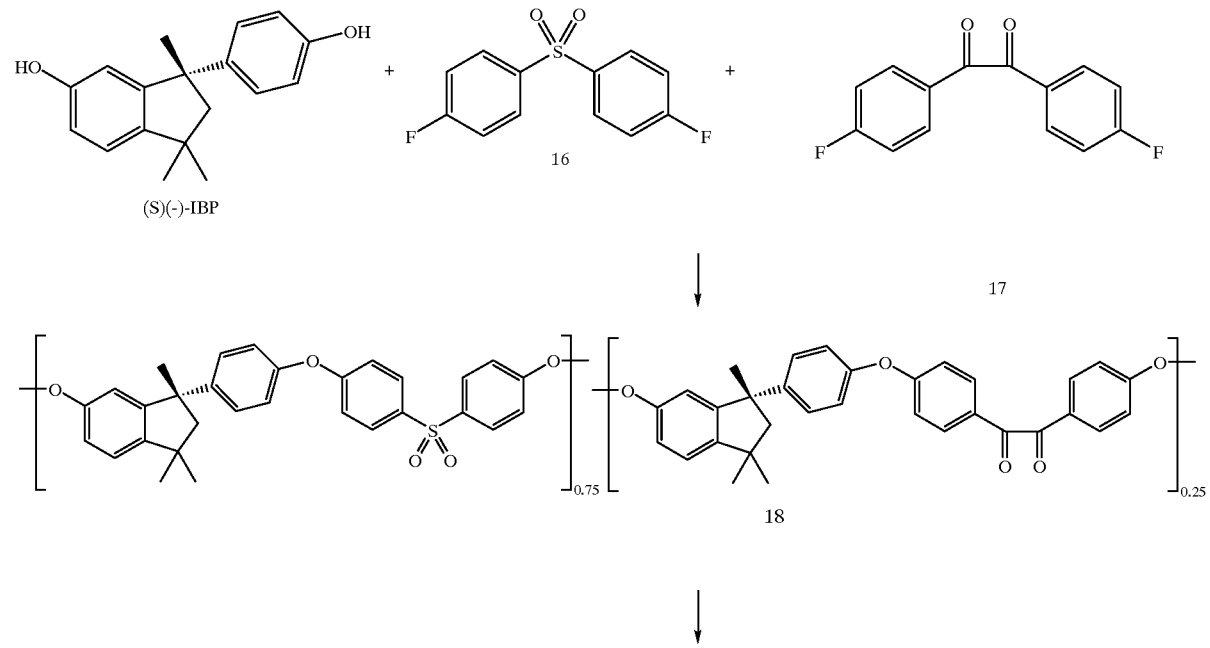

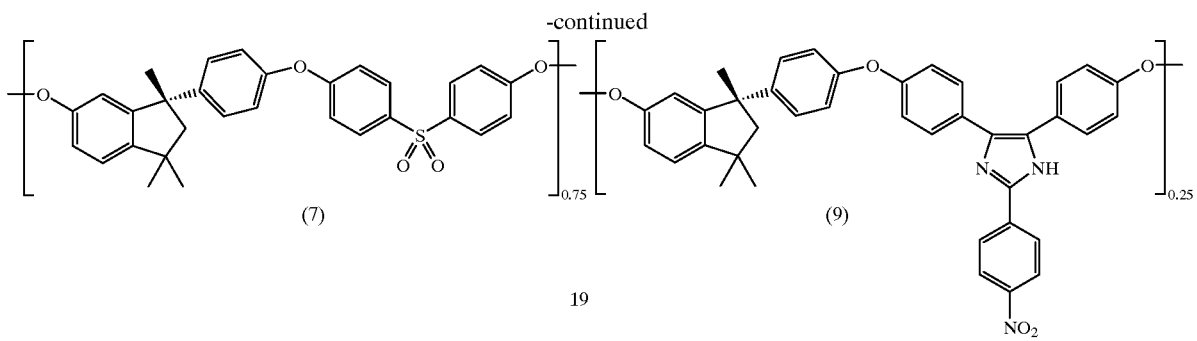

Synthesis of Benzil Containing Chiral Polyethersulfone 18

The polymerization reaction was conducted in a 100 mL three-neck round bottomed flask which was equipped with a nitrogen inlet, thermometer, Dean-Stark trap and condenser. The reaction vessel was charged with chiral diol (S)(–)-IBP (4.36 g, 16.24 mmoles), 4,4'-difluorofluorobenzil 17 (1 g, 4.1 mmoles), 4-fluorophenylsulfone 16 (3.1 g, 12.2 mmoles), potassium carbonate (4.5 g), N,N-dimethylacetamide (DMAC) (32 g) and toluene (8 mL). The resulting mixture was refluxed for 1 hour at 140° C., and the temperature was raised to 155° C. by removing toluene. The reaction mixture was kept at 155° C. for 1 hour whereupon the solution viscosity of the polymer increased dramatically. The reaction mixture was cooled and precipitated into MeOH (100 mL). The crude product was collected, dried, and redissolved in chloroform (50 mL), then filtered through a layer of CELITE®. The solvent of the filtrate was removed and dried in a vacuum oven at 120° C. for 8 hours to yield the desired benzil containing polymer 18 (6.5 g, 80% yield, Mw≈62 kg/mole).

Synthesis of Dye-appended Chiral Polyethersulfone 19

The reaction vessel was charged with the benzil containing polymer 18 (6 g), 4-nitrobenzaldehyde (0.91 g), ammonium acetate (3.5 g), acetic acid (18 mL), chlorobenzene (36 mL). The resulting mixture was refluxed for 4 hours. The reaction mixture was cooled and precipitated into MeOH (100 mL). The crude product was collected by filtration and further purified by soxhlet extraction using ethanol, then dried in a vacuum oven at 120° C. for 8 hours to yield the desired dye-appended polyethersulfone 19 (6 g, Mw=71 kg/mole).

The dye-appended chiral polyethersulfone 19 comprised structural units (7) and (9) above, wherein both $A^7$ and $A^9$ were chiral indane moiety (IIA) derived from (S)(–)-IBP. In structural units (7), "n" was 1, and $Z^3$ was sulfone moiety (Z10). In structural units (9), "p" was 1, and $Z^4$ was phenylene moiety (Z15). In moieties (IIA), (Z10), and (Z15), each $R^1$ was hydrogen. In (IIA), each $R^2$ and $R^7$ were methyl. In sulfone moiety (Z10), $R^8$ was hydrogen. In (Z15), $R^{10}$ was a radical through which the chiral polymer was covalently bonded from $Z^4$ to NLO sidegroup B'. B' was (NL25), wherein "x" was 0, and each $R^9$ was a radical. The mole fraction "g" of structural units (7) was 0.75; "h" of structural units (8) was 0; and the mole fraction (1–(g+h)) of structural units (9) was 0.25. Structural units (7) were randomly dispersed in the polymeric chain with dye-appended units (9).

EXAMPLE 26

Synthesis of Dye-Appended Chiral Polyether

The reaction is depicted in the following scheme.

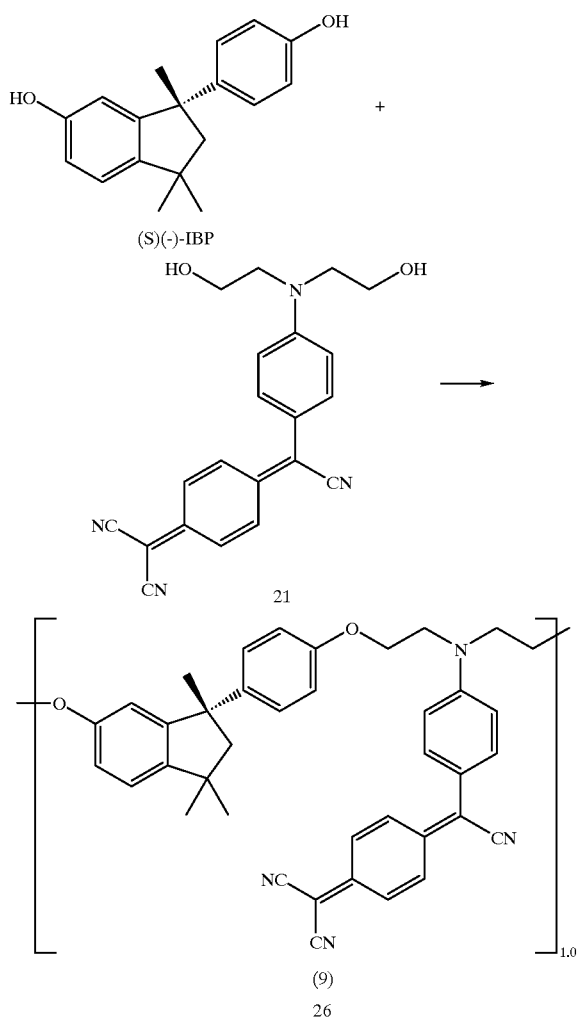

A 100 mL three-neck round bottomed flask is charged with triphenylphosphine (1.56 g, 5.94 mmoles), chiral (S) (–)-IBP (0.797 g, 2.97 mmoles), and TEF (15 mL). The mixture is stirred until all the polymer is dissolved (about 30 min). NLO dye 21 (7-[(4-dihydroxyethylamino)phenyl]-7, 8,8-tricyanoquinodimethane) is prepared according to the procedure described in Example 17. NLO dye 21 (1.064 g, 2.97 mmoles) is added to the solution, which is then cooled to −60° C. Diethylazodicarboxylate (DEAD)(0.934 mL, 5.94 mmoles) is added via syringe. The temperature of the solution is slowly brought up to 20° C. over 8 hours, then stirred at room temperature for another 4 hours. The solvent is evaporated, and the polymer is removed from the flask with the aid of methanol. The crude polymer is then subjected to soxhlet extraction with methanol for 24 hours, and dried at 120° C. under vacuum overnight to give aniline containing chiral polyether 26.

Dye-appended chiral homopolyether 26 comprises structural units (9) above, wherein $A^9$ is chiral indane moiety (IIA) derived from (S)(−)-IBP. In structural units (9), "p" is 0. In moiety (IIA), each $R^1$ is hydrogen, and each $R^2$ and $R^7$ are methyl. Sidegroup B' is aniline-containing (NL19), wherein "x" is 0, and each $R^9$ is an ethyl radical through which (NL19) attaches to the polymer backbone. The mole fractions "g" and "h" of structural units (7) and (8), respectively are 0; and the mole fraction (1−(g+h)) of structural units (9) is 1.0.

All of the patents, pending patent applications, articles, and texts mentioned above are incorporated herein by reference.

While the invention has been particularly shown and described with reference to preferred embodiment(s) thereof, it will be understood by those skilled in the art that various changes in form and details may be made therein without departing from the spirit and scope of the invention.

We claim:

1. A chiral polymer material exhibiting nonlinear optical properties, said chiral polymer material comprising
    (A) a chiral polymer comprising a chiral moiety in the backbone of said chiral polymer; and
    (B) a nonlinear optical component in admixture with said chiral polymer, wherein said nonlinear optical component includes a chiral residue chemically bridging an electron donating group with a second electron donating group, wherein said electron donating group is chemically connected to an electron accepting group by a continuous π electron chain, and wherein said second electron donating group is chemically connected to a second electron accepting group by a continuous π electron chain.

2. The material of claim 1, wherein said material exhibits an electro-optical coefficient of at least 5 pm/V.

3. The material of claim 1, wherein said chiral polymer comprises structural units containing a chiral moiety derived from a chiral diol compound.

4. The material of claim 1, wherein said electron donating group and said second electron donating group are each independently selected from the group of —SH, —SR$_q$, —OH, —OR$_r$, —NH$_2$, —NR$_s$R$_t$, and deuterated equivalents thereof, wherein R$_q$, R$_r$, R$_s$, and R$_t$ each independently represent an alkyl group, an aryl group, —(CH$_2$)$_{n'}$OH, —(CH$_2$)$_{n''}$NH$_2$, or —(CH$_2$)$_{n'''}$SH, wherein n', n", and n"' each represent an integer independently, and wherein said electron accepting group and said second electron accepting group are each independently selected from the group of —CN, —NO$_2$, —COOH, —COCH$_3$, —CHO, —CONH$_2$, —CHC(CN)$_2$, and deuterated equivalents thereof or from —C(CN)C(CN)$_2$, and halogen.

5. The material of claim 4, wherein said electron donating group and said second electron donating group are each amines independently selected from the group of aliphatic amines, aromatic amines, or combination aliphatic/aromatic amines having formula —NR$_s$R$_t$, wherein R$_s$ and R$_t$ each represent independently an alkyl group or an aryl group, and said electron accepting group and said second electron accepting group are each independently a cyano group (—CN) or a nitro group (—NO$_2$).

6. A chiral polymer material exhibiting nonlinear optical properties, said chiral polymer material comprising
    (A) a chiral polymer comprising structural units containing a chiral moiety derived from a chiral bisphenol compound, wherein said chiral moiety is in the backbone of said chiral polymer; and
    (B) a nonlinear optical component in admixture with said chiral polymer, wherein said nonlinear optical component comprises an electron donating group and an electron accepting group chemically connected by a continuous π electron chain.

7. A chiral polymer material exhibiting nonlinear optical properties, said chiral polymer material comprising
    (A) a chiral polymer comprising structural units containing a chiral moiety derived from a chiral bisphenol compound, wherein said chiral moiety is in the backbone of said chiral polymer; and
    (B) a nonlinear optical component chemically bonded to said backbone of said chiral polymer as a pendent sidegroup, wherein said nonlinear optical component comprises an electron donating group and an electron accepting group chemically connected by a continuous π electron chain.

8. The material of claim 7, wherein said chiral moiety is selected from the group having structures (IA), (IB), (IIA), (IIB), (IIIA), (IIIB), (IVA), (IVB), (VA), (VB), (VIA), (VIB), (VIIA), and (VIIB)

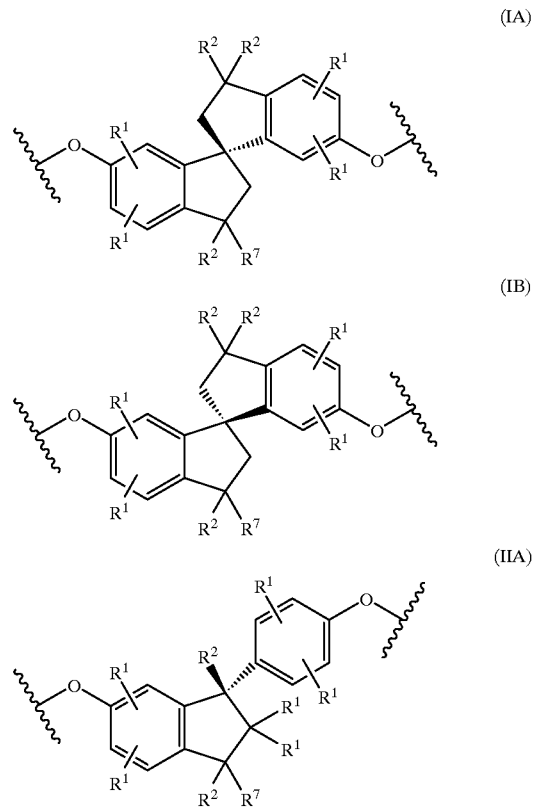

(IIB)
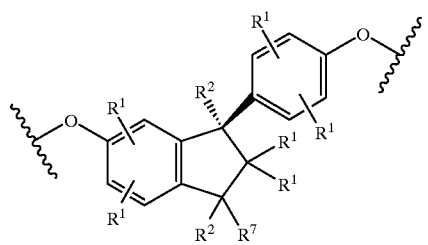

(IIIA)
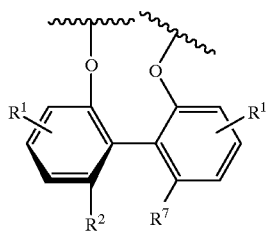

(IIIB)
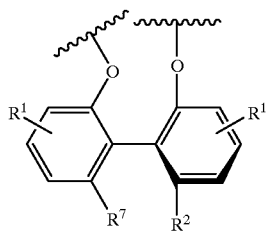

(IVA)
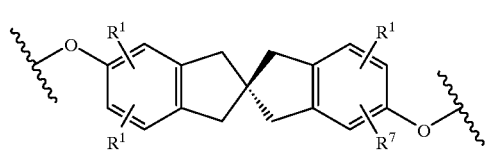

(IVB)
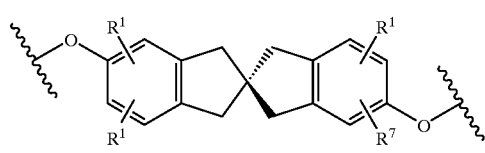

(VA)
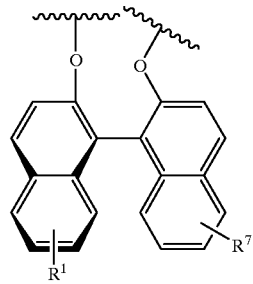

(VB)
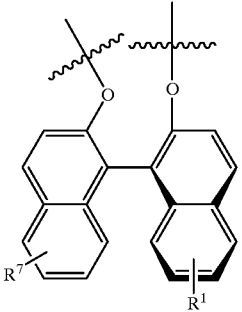

(VIA)
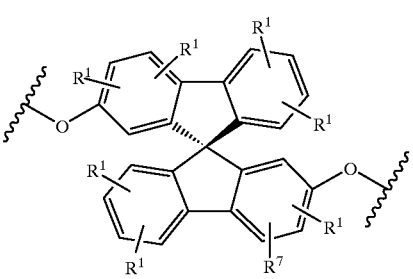

(VIB)
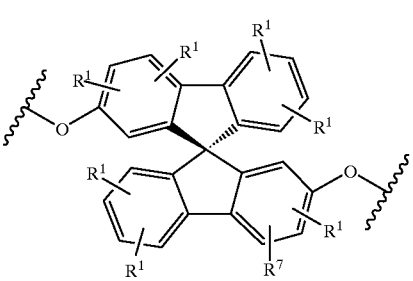

(VIIA)
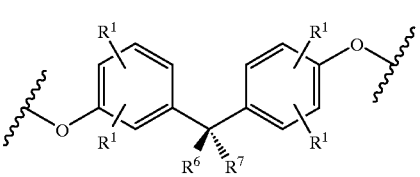

(VIIB)
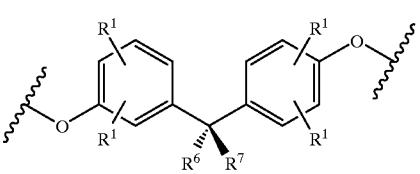

wherein each wavy line indicates a point of attachment to said chiral polymer backbone, each $R^1$, $R^2$, and $R^6$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, and $R^7$ is a radical through which said pendent side-group is chemically bonded to said chiral moiety.

9. The material of claim 8, wherein said nonlinear optical component is selected from the group having formulae (NL1) through (NL12)

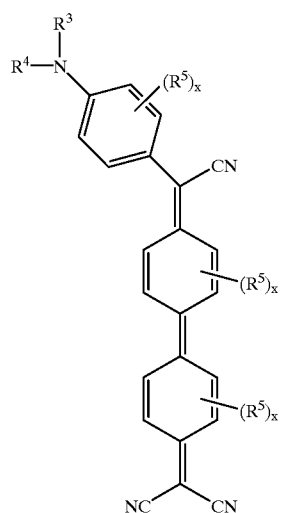
(NL1)
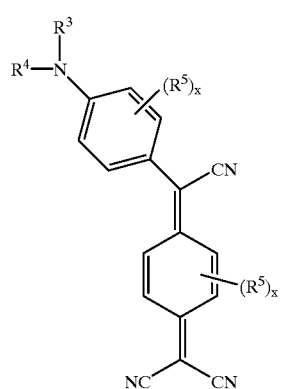
(NL2)
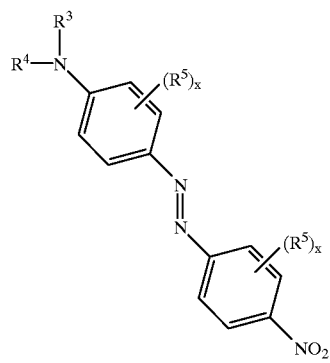
(NL3)
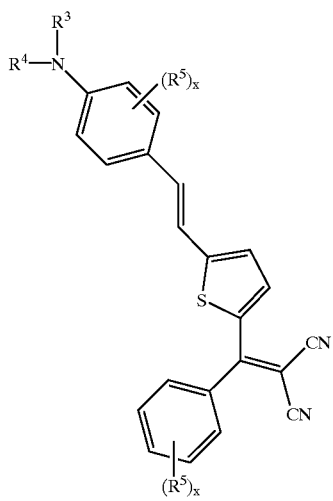
(NL4)
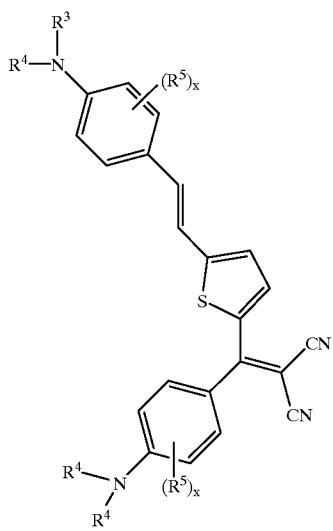
(NL5)
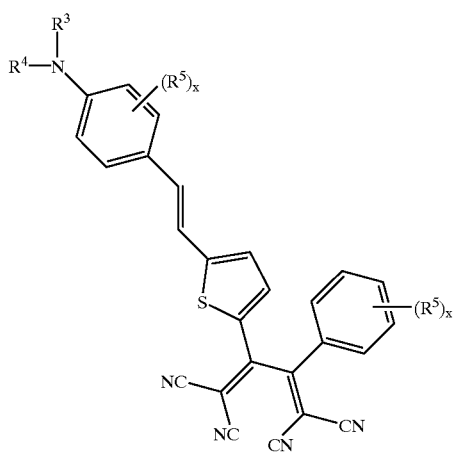
(NL6)

(NL7)

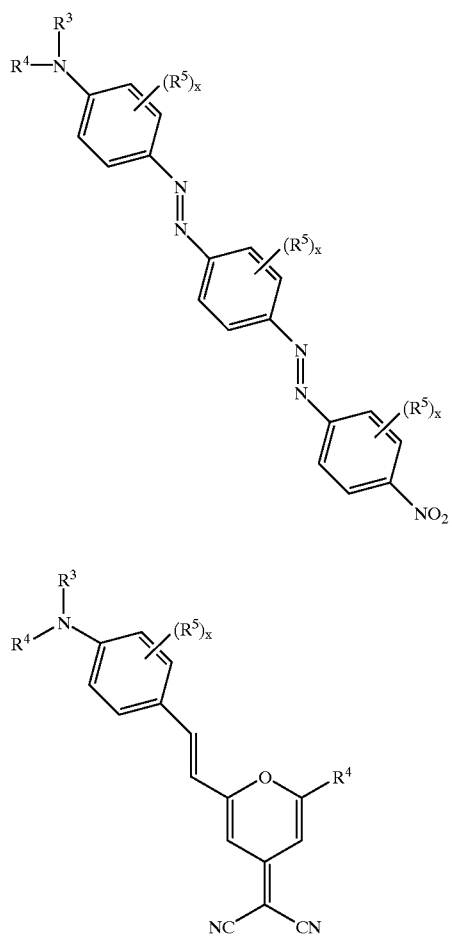

(NL8)

(NL9)

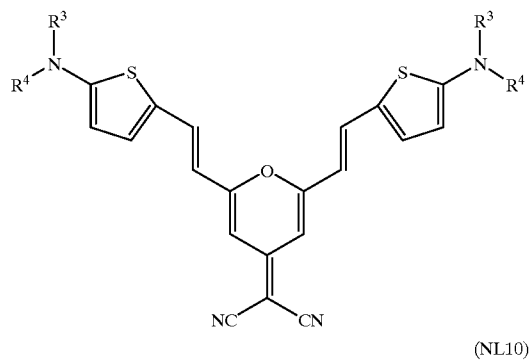

(NL10)

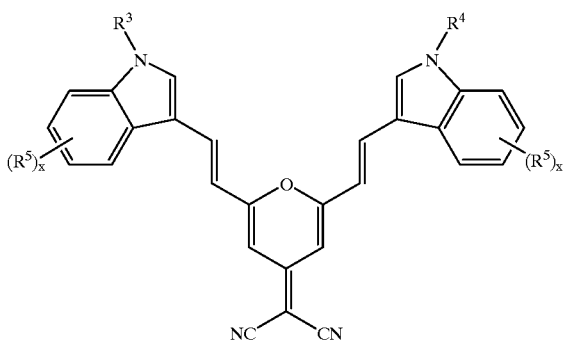

(NL11)

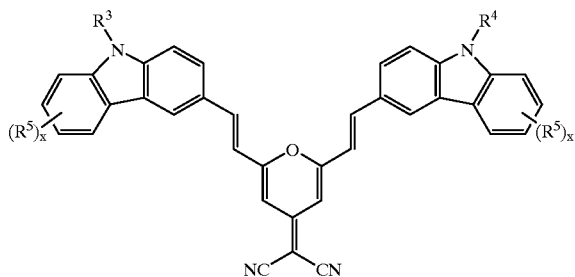

(NL12)

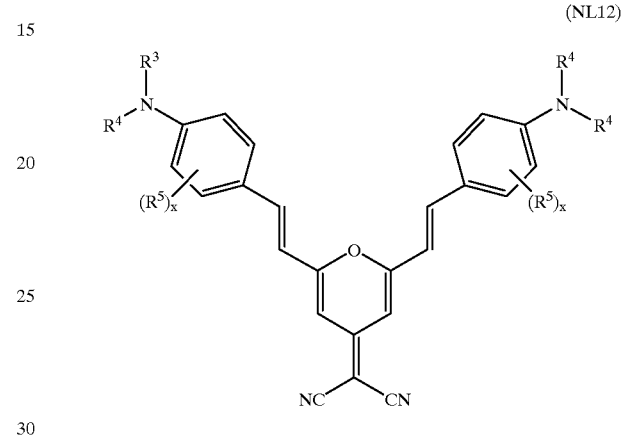

wherein each $R^4$ is independently hydrogen, deuterium, alkyl, cycloalkyl, alkenyl, cycloalkenyl, aryl, alkylaryl, arylalkyl, or a deuterated equivalent thereof, $R^3$ is an alkoxy, alkyl, alkoxyalkyl, or alkyl ester radical having from 1 to 6 carbon atoms or a deuterated equivalent thereof;

each $R^5$ is independently deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof; and each x is independently 0 or an integer from 1 to 4.

10. The material of claim 6 or 7, wherein said material exhibits an electro-optical coefficient of at least 5 pm/V.

11. The material of claim 6, wherein said nonlinear optical component is in admixture with said chiral polymer at a concentration ranging from about 1 wt. % to about 40 wt. %.

12. The material of claim 11, wherein said concentration of said nonlinear optical component ranges from about 5 wt. % to about 35 wt. %.

13. The material of claim 7, wherein from about 1% by mole to about 100% by mole of said structural units of said chiral polymer are chemically bonded with said nonlinear optical component as said pendent sidegroup.

14. The material of claim 13, wherein from about 10% by mole to about 50% by mole of said structural units of said chiral polymer are chemically bonded with said nonlinear optical component as said pendent sidegroup.

15. The material of claim 6, wherein said chiral moiety is selected from the group having structures (IA), (IB), (IIA), (IIB), (IIIA), (IIIB), (IVA), (IVB), (VA), (VB), (VIA), (VIB), (VIIA), and (VIIB)

(IA)
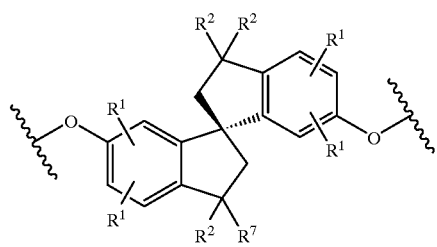
(IB)
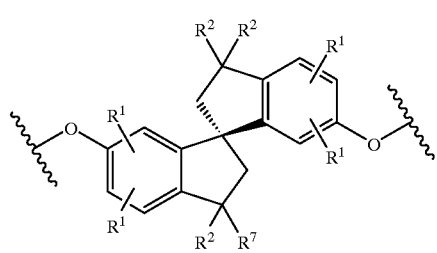
(IIA)
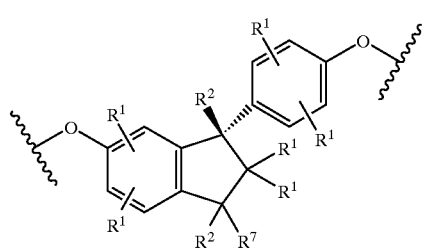
(IIB)
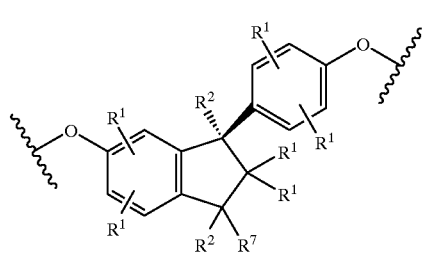
(IIIA)
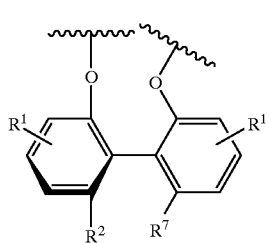
(IIIB)
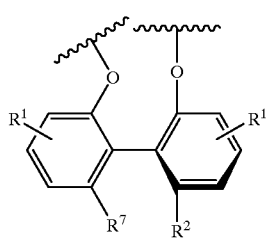
(IVA)
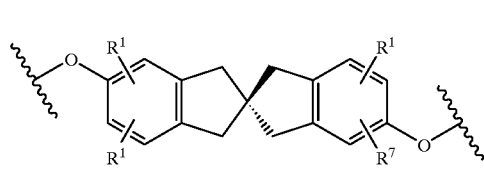
(IVB)
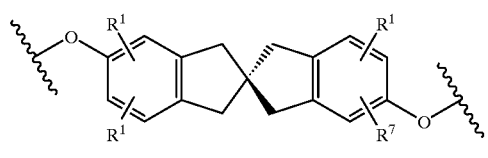
(VA)
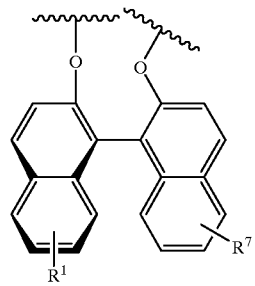
(VB)
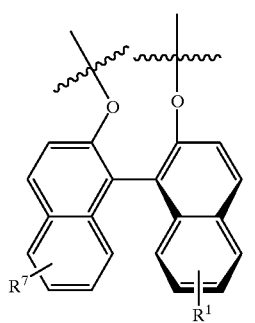

-continued

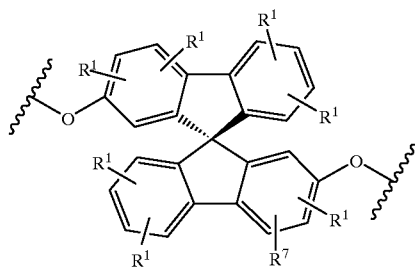
(VIA)

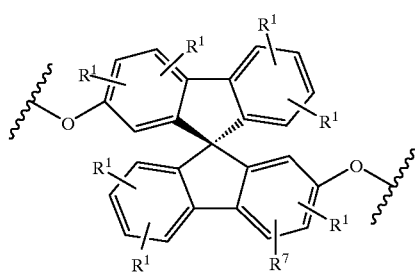
(VIB)

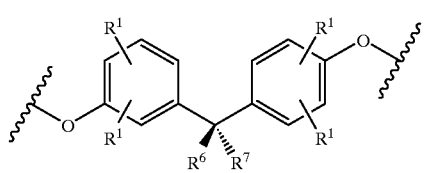
(VIIA)

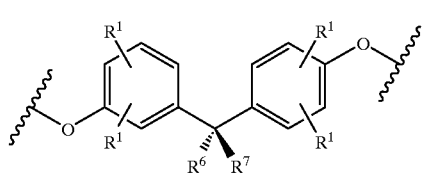
(VIIB)

wherein each wavy line indicates a point of attachment to said chiral polymer backbone, each $R^1$, $R^2$, $R^6$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, and wherein $R^6$ differs from $R^7$.

16. The material of claim 15 or 8, wherein said electro-optical coefficient is at least 5 pm/V.

17. The material of claim 14, wherein said nonlinear optical component is in admixture with said chiral polymer at a concentration ranging from about 1 wt. % to about 40 wt. %.

18. The material of claim 16, wherein said concentration of said nonlinear optical component ranges from about 5 wt. % to about 35 wt. %.

19. The material of claim 15 or 8, wherein said electron donating group is an amine selected from the group of aliphatic amines, aromatic amines, or combination aliphatic/aromatic amines having formula —$NR_sR_t$, wherein $R_s$ and $R_t$ each represent independently an alkyl group or an aryl group, and said electron accepting group is a cyano group (—CN) or a nitro group (—$NO_2$).

20. The material of claim 15, wherein said nonlinear optical component is in admixture with said chiral polymer and includes a chiral residue chemically bridging said electron donating group with a second electron donating group, wherein said second electron donating group is chemically connected to a second electron accepting group by a continuous π electron chain.

21. The material of claim 20, wherein said electron donating group and said second electron donating group are each amines independently selected from the group of aliphatic amines, aromatic amines, or combination aliphatic/aromatic amines having formula —$NR_sR_t$, wherein $R_s$ and $R_t$ each represent independently an alkyl group or an aryl group, and said electron accepting group and said second electron accepting group are each independently a cyano group (—CN) or a nitro group (—$NO_2$).

22. The material of claim 15, wherein said nonlinear optical component is selected from the group having formulae (NL1) through (NL12)

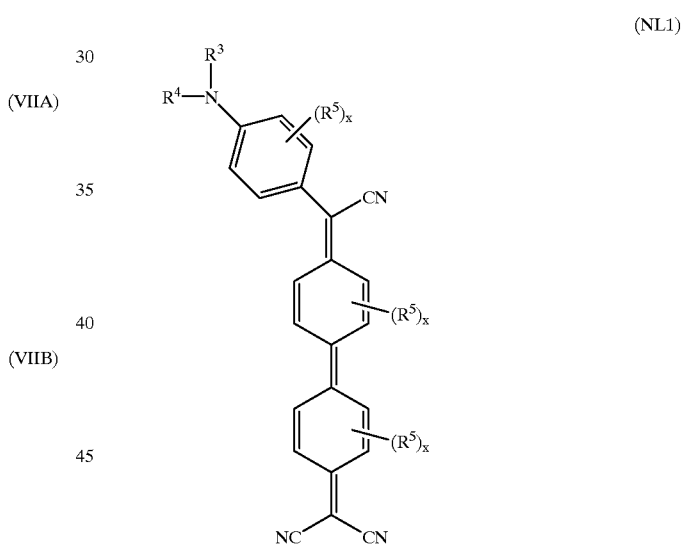
(NL1)

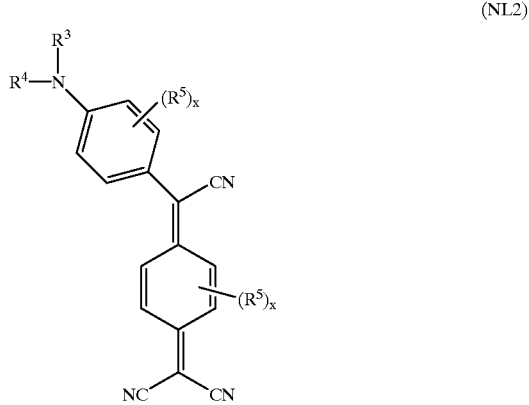
(NL2)

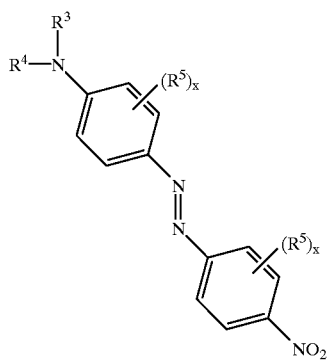
(NL3)
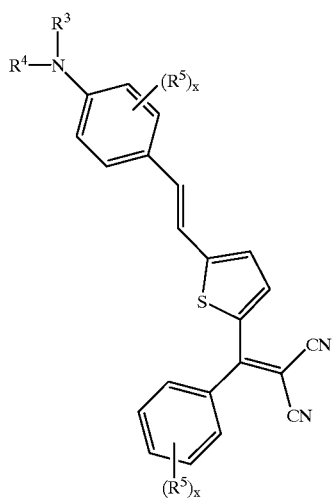
(NL4)
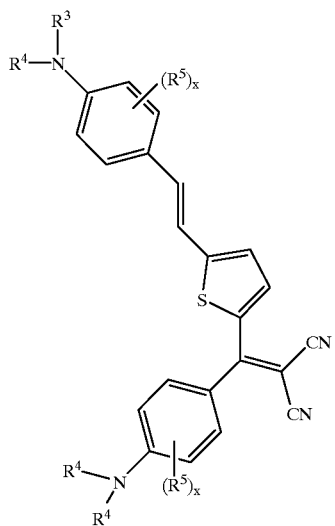
(NL5)
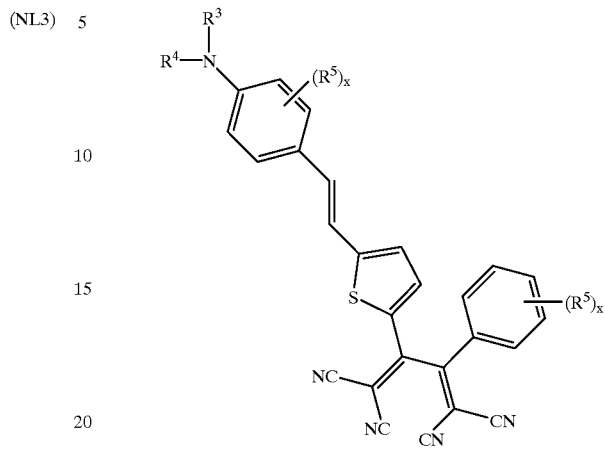
(NL6)
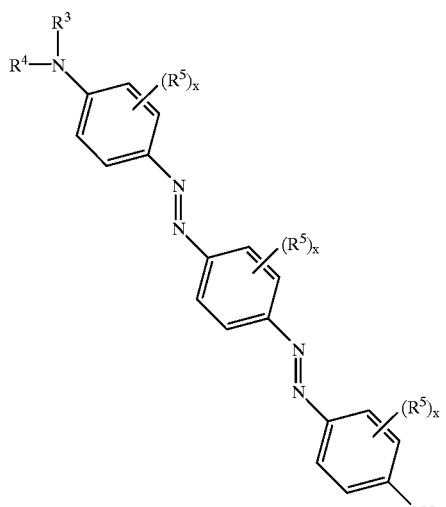
(NL7)
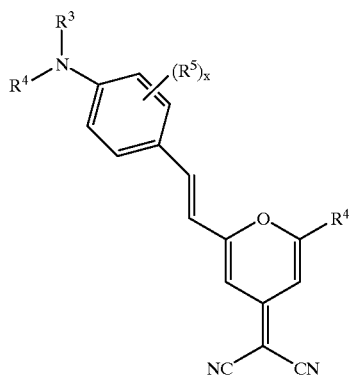
(NL8)

(NL9)

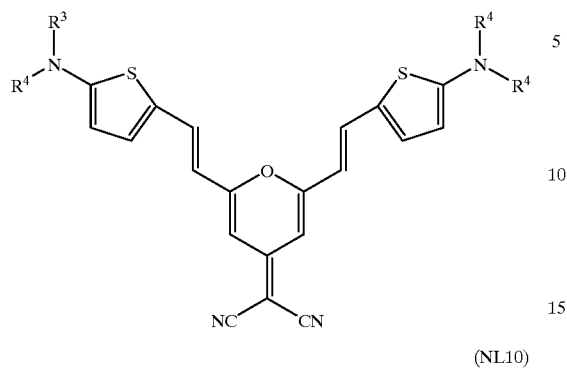

(NL10)

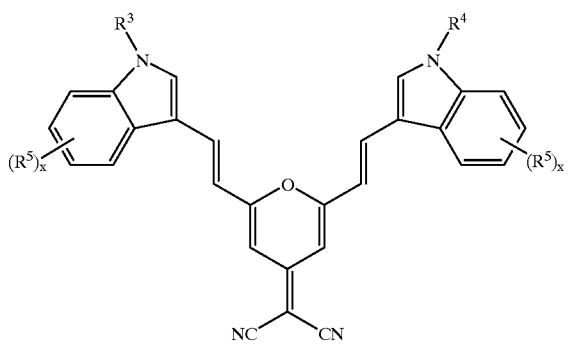

(NL11)

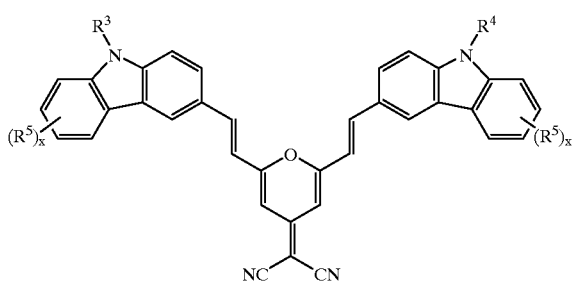

(NL12)

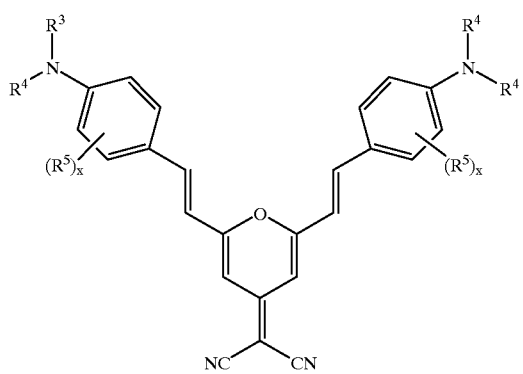

wherein $R^3$ and each $R^4$ is independently hydrogen, deuterium, alkyl, cycloalkyl, alkenyl, cycloalkenyl, aryl, alkylaryl, arylalkyl, or a deuterated equivalent thereof, each $R^5$ is independently deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof; and each x is independently 0 or an integer from 1 to 4.

23. The material of claim 22 or 9, wherein x is 0; each $R^4$ and $R^3$ are methyl groups in structures (NL1), (NL2), (NL3), (NL4), (NL5), (NL6), (NL7), and (NL8); each $R^4$ and $R^3$ are butyl groups in structure (NL9); each $R^4$ and $R^3$ are hexyl groups in structures (NL10) and (NL11); and each $R^4$ and $R^3$ are butyl or phenyl groups in structure (NL12).

24. The material of claim 22, wherein said nonlinear optical component is in admixture with said chiral polymer, and said nonlinear optical polymer is selected from the group having formulae (NL1) through (NL12) and further comprising formulae (NL13) through (NL17)

(NL13)

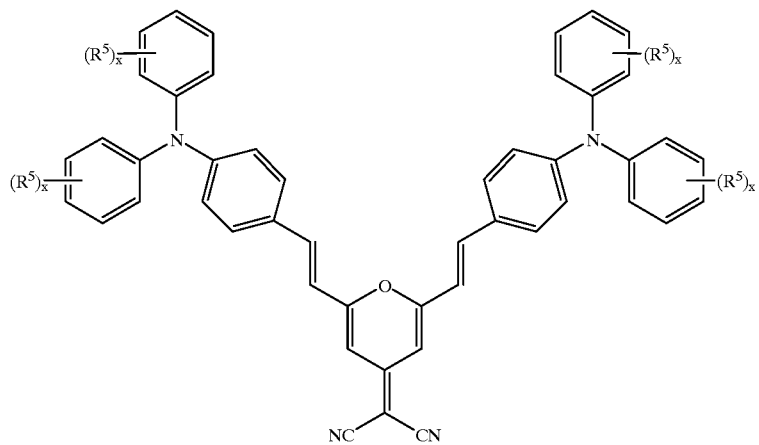

-continued

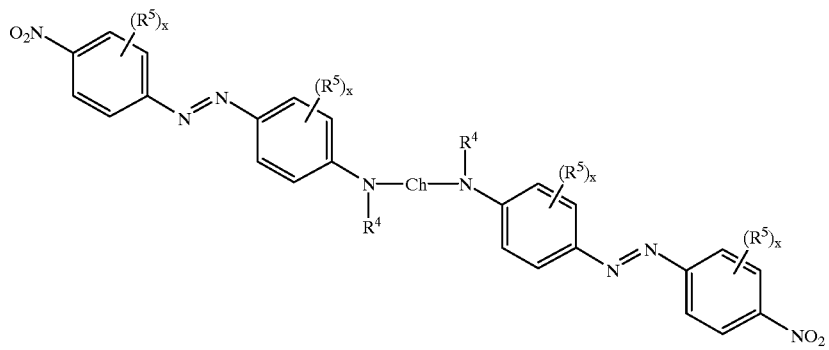
(NL14)

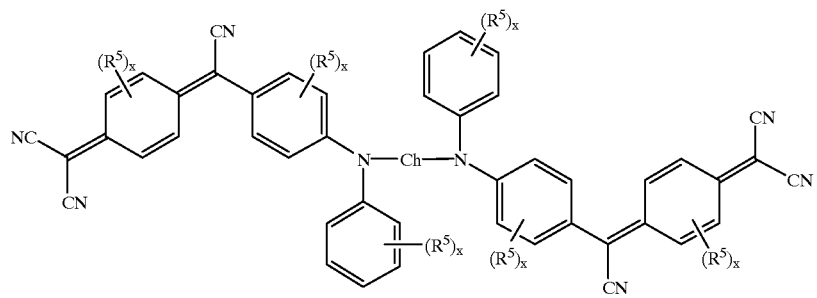
(NL15)

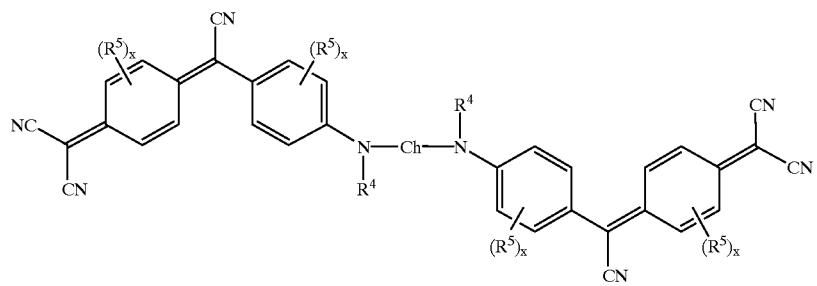
(NL16)

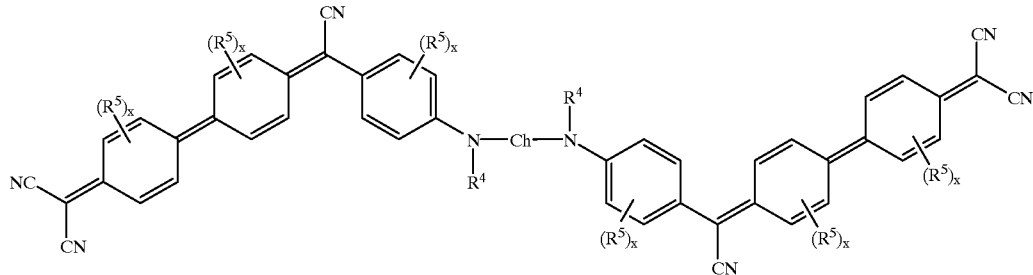
(NL17)

wherein Ch is a chiral residue;
wherein each R⁴ is independently hydrogen, deuterium, alkyl, cycloalkyl, alkenyl, cycloalkenyl, aryl, alkylaryl, arylalkyl, or a deuterated equivalent thereof, each R⁵ is independently deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, and each x is independently 0 or an integer from 1 to 4.

25. The material of claim 24, wherein said chiral residue Ch in formulae (NL14), (NL15), (NL16), and (NL17) is selected from the group having structures (IA), (IB), (IIA), (IIB), (IIIA), (IIIB), (IVA), (IVB), (VA), (VB), (VIA), (VIB), (VIIA), and (VIIB).

26. The material of claim 25, wherein said nonlinear optical component is in admixture with said chiral polymer, and wherein said chiral polymer comprises (i) structural units having formulae (1) and (2)

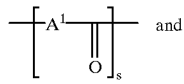
(1)

and

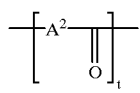
(2)

and (ii) structural units selected from the group having formulae (10), (10'), or (10")

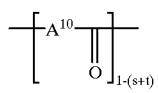
(10)

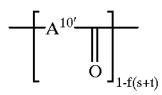
or
(10')

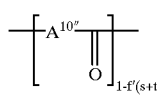
(10")

wherein $A^1$ and $A^2$ are each independently said chiral moiety selected from the group having structural formulae (IA), (IB), (IIA), (IIB), (IIIA), (IIIB), (IVA), (IVB), (VA), (VB), (VIA), (VIB), (VIIA), and (VIIB);

$A^{10}$ is a structural moiety selected from the group having formulae (VIII), (IX), (X), (XI), (XII), (XIII), (XV), (XVI), (XVII), (XX), and (XXII)

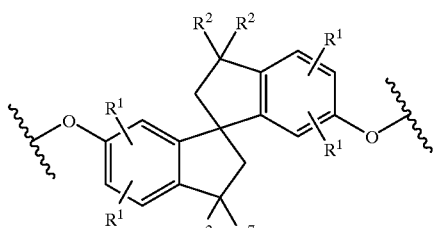
(VIII)

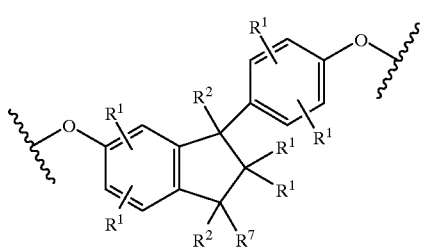
(IX)

-continued

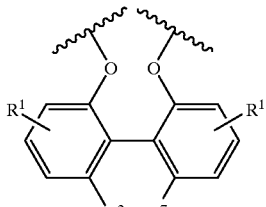
(X)

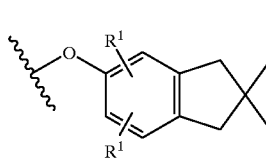
(XI)

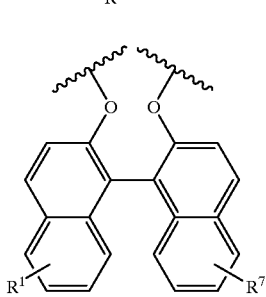
(XII)

(XIII)

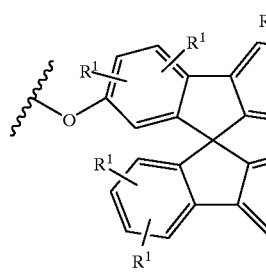
(XV)

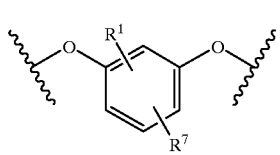
(XVI)

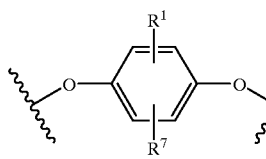
(XX)

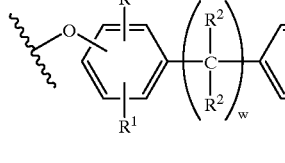
(XVII)

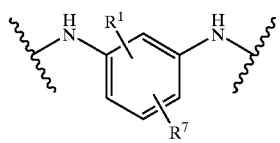

-continued

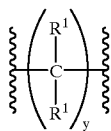

(XXII)

wherein w is 0 or 1; y is an integer from 1 to 20; $A^{10'}$ is a structural moiety having formula (XVIII); and $A^{10''}$ is a structural moiety having formula (XIX)

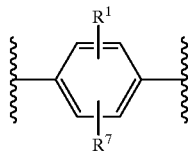

(XVIII)

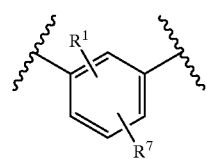

(XIX)

wherein s is the mole fraction of structural units (1); t is the mole fraction of structural units (2); the quantity (1−(s+t)) is the mole fraction of structural units (10); the quantity (1−f(s+t)) is the mole fraction of structural units (10'); and the quantity (1−f'(s+t)) is the mole fraction of structural units (10") in said chiral polymer, s and t each independently having a numerical value from 0 to 1.0, and wherein the sum of s and t is greater than zero and less than or equal to 1.0;

wherein when $A^1$ is (IA), (IIA), (IIIA), (IVA), (VA), (VIA), or (VIIA), and $A^2$ is respectively (IB), (IIB), (IIIB), (IVB), (VB), (VIB), or (VIIB), or when $A^1$ is (IB), (IIB), (IIIB), (IVB), (VB), (VIB), or (VIIB), and $A^2$ is respectively (IA), (IIA), (IIIA), (IVA), (VA), (VIA), or (VIIA), then the numerical value of s differs from the numerical value of t;

wherein f and f' are each 1 except if the sum of s and t is about 0.5, then f and f' may each independently have a value greater than 1 but less than 2, and both formulas (10') and (10") are selected as structural units of part (ii);

wherein when said structural units of part (ii) have formula (10), and $A^{10}$ is structure (XVII) or (XXII); when said structural units of part (ii) have formula (10'), and $A^{10'}$ is structure (XVIII); and when said structural units of part (ii) have formula (10"), and $A^{10''}$ is structure (XIX), then each said structural unit of part (ii) is separated by at least one structural unit of part (i); and wherein each wavy line indicates a point of attachment to said chiral polymer backbone, each $R^1$, $R^2$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, hydroxy, or a deuterated equivalent thereof.

27. The material of claim 26, wherein said nonlinear optical component is present in said material at a concentration ranging from about 1 wt. % to about 40 wt. %.

28. The material of claim 27, wherein said concentration of said nonlinear optical component ranges from about 5 wt.% to about 35 wt. %.

29. The material of claim 27, wherein said chiral polymer comprises structural units (1), $A^1$ is selected from the group having formulae (IA), (IB), (IIA), and (IIB), and each $R^1$ is hydrogen, each $R^2$ and $R^7$ is methyl, and wherein the mole fraction s of structural units (1) is about 1.0.

30. The material of claim 29, wherein said nonlinear optical component is present in said material at a concentration of about 10 wt. %.

31. The material of claim 30, wherein said material exhibits an electro-optical coefficient of at least 5 pm/V.

32. The material of claim 29, wherein said nonlinear optical component is [2,6-bis[2-[4-(diphenylamino)phenyl] ethenyl]-4H-pyran-4-ylidene]-propanedinitrile having structure (NL12), wherein $R^3$ and each $R^4$ are phenyl groups, and x is 0.

33. The material of claim 27, wherein said chiral polymer comprises structural units (1) and (10), wherein in structural units (1), $A^1$ is selected from the group having formulae (IA), (IB), (IIA), and (IIB), and in structural units (10), $A^{10}$ has formula (XX), wherein each $R^1$ is hydrogen, each $R^2$ and $R^7$ is methyl, and w is 1, and wherein the mole fraction s of structural units (1) and the mole fraction (1−(s+t)) of structural units (10) are each about 0.50.

34. The material of claim 33, wherein said nonlinear optical component is present in said material at a concentration of about 10 wt. %.

35. The material of claim 34, wherein said material exhibits an electro-optical coefficient of at least 5 pm/V.

36. The material of claim 33, wherein said nonlinear optical component is present in said material at a concentration of about 32 wt. %.

37. The material of claim 36, wherein said material exhibits an electro-optical coefficient of at least 18 pm/V.

38. The material of claim 33, wherein said nonlinear optical component is [2,6-bis[2-[4-(diphenylamino)phenyl] ethenyl]-4H-pyran-4-ylidene]-propanedinitrile having structure (NL12), wherein $R^3$ and each $R^4$ are phenyl groups, and x is 0.

39. The material of claim 25, wherein said nonlinear optical component is in admixture with said chiral polymer, and said chiral polymer comprises structural units having formulae (11), (12), and (13)

(11)

(12)

(13)

wherein j is the mole fraction of structure (12), k is the mole fraction of structure (13), and the quantity (1−(j+k)) is the mole fraction of structure (11); wherein j and k each independently have a value from 0 to about 0.99, and the sum of j and k is from 0 to about 0.99;

$A^1$ is said chiral moiety selected from the group having structural formulae (IA), (IB), (IIA), (IIB), (IIIA), (IIIB), (IVA), (IVB), (VA), (VB), (VIA), (VIB), (VIIA), and (VIIB);

$A^{12}$ and $A^{13}$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), and (XX)

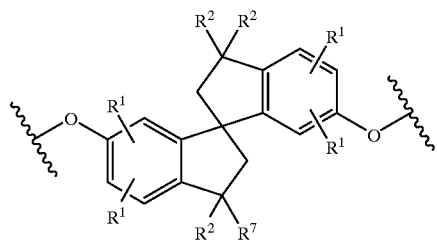
(VIII)

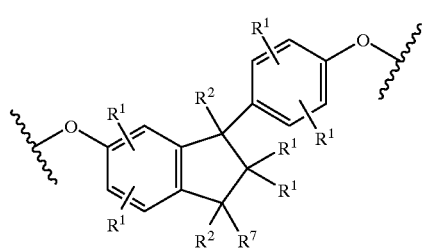
(IX)

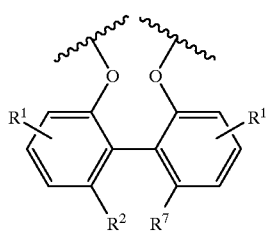
(X)

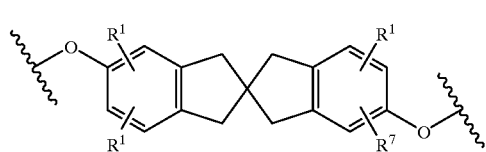
(XI)

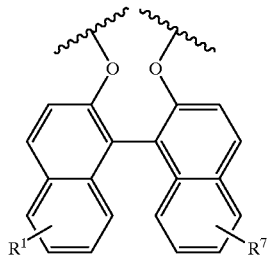
(XII)

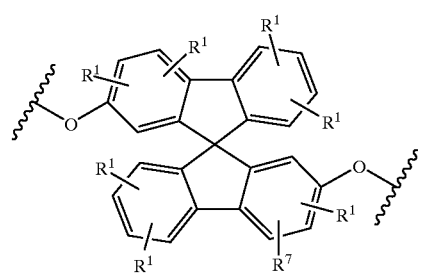
(XIII)

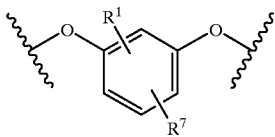
(XV)

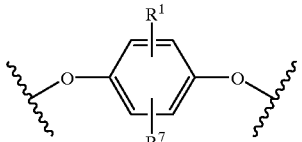
(XVI)

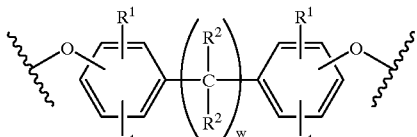
(XX)

wherein w is 0 or 1;

wherein when $A^1$ is (IA), (IIA), (IIIA), (IVA), (VA), (VIA), or (VIIA), and $A^{12}$ or $A^{13}$ is respectively (IB), (IIB), (IIIB), (IVB), (VB), (VIB), or (VIIB), or when $A^1$ is (IB), (IIB), (IIIB), (IVB), (VB), (VIB), or (VIIB), and $A^{12}$ or $A^{13}$ is respectively (IA), (IIA), (IIIA), (IVA), (VA), (VIA), or (VIIA), then the mole fraction j or k of said structural units (12) or (13) corresponding to said $A^{12}$ or $A^{13}$ differs from the mole fraction $(1-(j+k))$ of said structural units (11) corresponding to said $A^1$;

$Z^6$ is selected from the group of structural moieties having formulae (Z10), (Z11), (Z12), (Z13), (Z16), and (Z17)

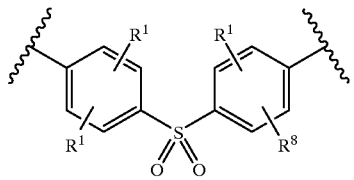
(Z10)

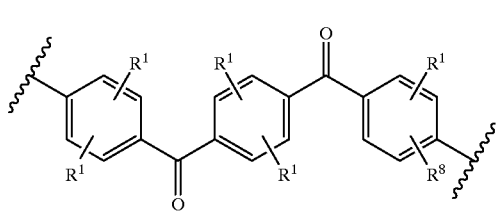
(Z11)

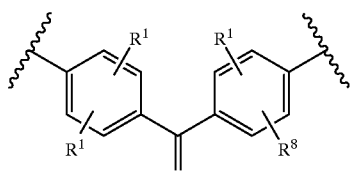
(Z12)

(Z13)

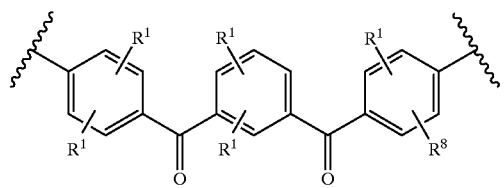

wherein R⁸ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof;

(Z16)

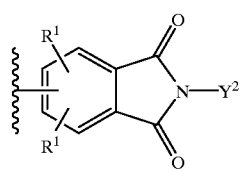

(Z17)

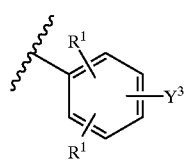

wherein when Z⁶ is a structural moiety having formula (Z16) or (Z17), then A¹² and A¹³ may also each independently be a single bond, —O—, —S—, —SO₂—, —CO—, —C(CH₃)₂—, —C(CD₃)₂—, —C(CF₃)₂—, or a structural moiety having formula (XXI)

(XXI)

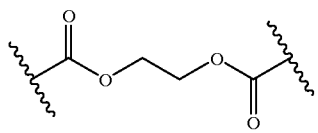

wherein Y² is selected from the group of structural moieties having formulae (Z16a), (Z16b), (Z16c), (Z16d), and (Z16e)

(Z16a)

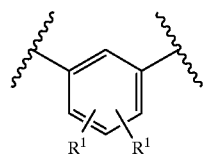

(Z16b)

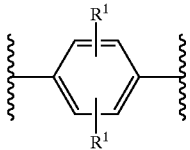

(Z16c)

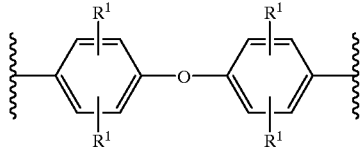

(Z16d)

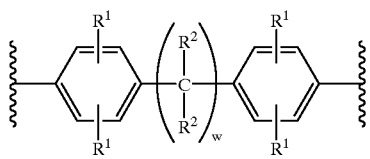

(Z16e)

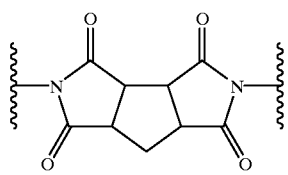

wherein w is 0 or 1;
wherein Y³ is selected from the group of structural moieties having formulas (Z17a), (Z17b), and (Z17c)

(Z17a)

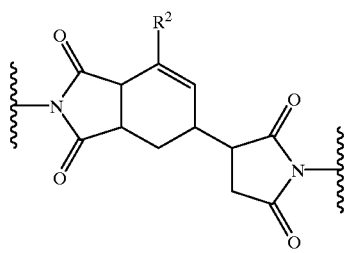

(Z17b)

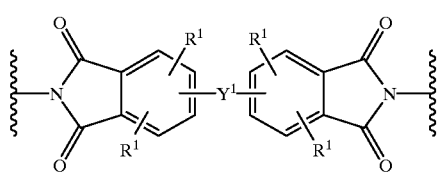

(Z17c)

wherein Y¹ is a single bond or is selected from the group of —O—, —S—, —SO₂—, —CO—, —C(CH₃)₂—, —C(CD₃)₂—, and —C(CF₃)₂—, or from the group of structural moieties having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), (XX), and (XII), except when j and k are both 0, then Y¹ is other than formula (IA), (IIA), (IIIA), (IVA), (VA), (VIA), or (VIIA) when A¹ is respectively formula (IB), (IIB), (IIIB), (IVB), (VB), (VIB), or (VIIB); and Y¹ is other than formula (IB), (IIB), (IIIB), (IVB), (VB), (VIB), or (VIIB) when A¹ is respectively formula (IA), (IIA), (IIIA), (IVA), (VA), (VIA), or (VIIA);

wherein m is 0 except when said selected structural moiety $Z^6$ has formula (Z16) or (Z17), then m is 1, and $Z^5$ has structural formula (Z16') when $Z^6$ has formula (Z16), and $Z^5$ has formula (Z17') when $Z^6$ has formula (Z17)

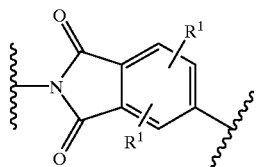
(Z16')

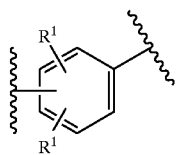
(Z17')

and wherein each wavy line indicates a point of attachment to said chiral polymer backbone, each $R^1$, $R^2$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof.

40. The material of claim 9, wherein said nonlinear optical component is chemically bonded to the backbone of said chiral polymer as said pendent sidegroup, and said chiral polymer comprises structural units having formulae (21), (22), and (23)

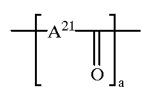
(21)

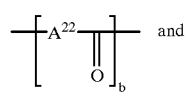
(22)

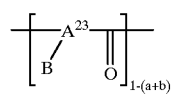
(23)

wherein B is said pendent sidegroup selected from the group of (NL1)–(NL12) which is chemically bonded to said chiral polymer backbone through $R^3$;

$A^{21}$, $A^{22}$, and $A^{23}$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XIV), (XV), (XVI), and (XVII)

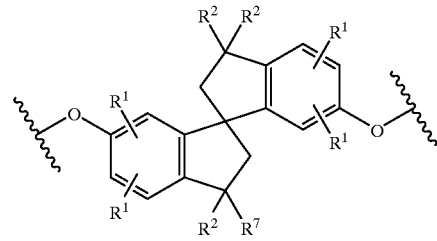
(VIII)

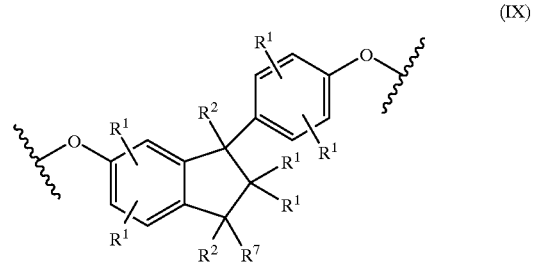
(IX)

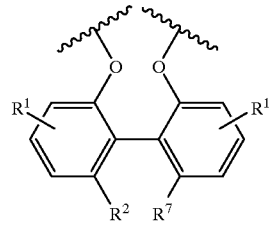
(X)

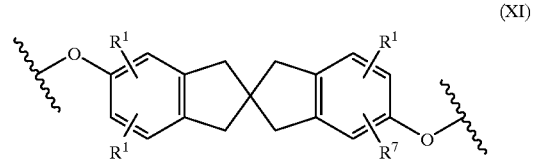
(XI)

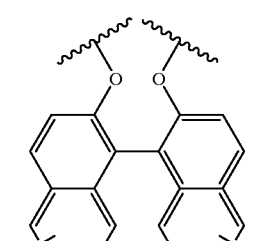
(XII)

-continued (XIII)
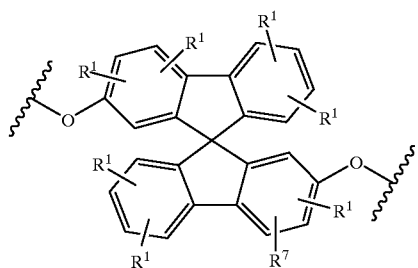

(XIV)
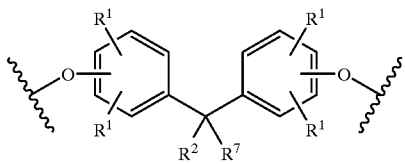

(XV)
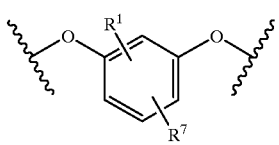

(XVI)
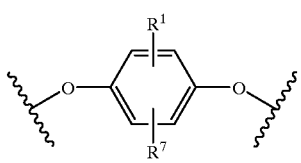

(XVII)
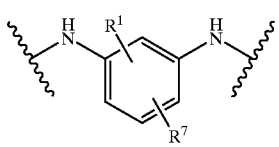

wherein at least one of $A^{21}$, $A^{22}$, and $A^{23}$ is said chiral moiety selected from the group having formulae (IA), (IB), (IIA), (IIB), (IIIA), (IIIB), (IVA), (IVB), (VA), (VB), (VIA), (VIB), (VIIA), and (VIIB);

wherein a is the mole fraction of structural units (21); b is the mole fraction of structural units (22); and the quantity (1−(a+b)) is the mole fraction of structural units (23); a and b each independently having a numerical value from 0 to about 0.99, and wherein the sum of a and b is from 0 to about 0.99;

wherein the sum of the mole fractions of said structural units (21), (22) and (23) containing said selected chiral moiety having formula (IA), (IIA), (IIIA), (IVA), (VA), (VIA), or (VIIA) differs from the sum of the mole fractions of said structural units (21), (22), and (23) containing a selected corresponding enantiomer (IB), (IIB), (IIIB), (IVB), (VB), (VIB), or (VIIB);

wherein when said structural moiety (XVII) is selected as $A^{21}$, $A^{22}$, or $A^{23}$, then each corresponding structural unit (21), (22) or (23) containing structural moiety (XVII) is separated by at least one structural unit (21), (22) or (23) wherein $A^{21}$, $A^{22}$, or $A^{23}$, respectively, is other than said structural moiety (XVII); and wherein each wavy line indicates a point of attachment to said chiral polymer backbone, each $R^1$, $R^2$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, except in said moiety selected as $A^{23}$, wherein $R^7$ is a radical through which said polymer backbone is chemically bonded to said sidegroup B.

41. The material of claim 9, wherein said nonlinear optical component is chemically bonded to the backbone of said chiral polymer as said pendent sidegroup, and said chiral polymer comprises (i) structural units having formulae (31) and (32)

(31)

and

(32)

and (ii) structural units selected from the group having formulae (3), (3'), or (3")

(3)

(3')

or (3")

wherein B is said pendent sidegroup selected from the group of (NL1) through (NL12) which is chemically bonded to said chiral polymer backbone through $R^3$;

z is 0 or 1; wherein when z is 0, then said pendent sidegroup B is chemically bonded to $A^{32}$; and when z is 1, then said pendent sidegroup B is chemically bonded to $A^3$, $A^{3'}$ or $A^{3''}$;

q is the mole fraction of structural units (31); r is the mole fraction of structural units (32); the quantity (1−(q+r)) is the mole fraction of structural units (3); the quantity (1−f (q+r)) is the mole fraction of structural units (3'); and the quantity (1−f'(q+r)) is the mole fraction of structural units (3") in said chiral polymer; q and r each independently having a numerical value from 0 to about 0.99, except when z is 0, then r is greater than zero; and wherein the sum of q and r is always greater than zero but less than or equal to about 0.99;

wherein f and f' are each 1 except if the sum of q and r is about 0.5, then f and f' may each independently have a value greater than 1 but less than 2, and both formulas (3') and (3") are selected as structural units of part (ii);

$A^{31}$ and $A^{32}$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XIV), (XV), and (XVI)

(VIII)
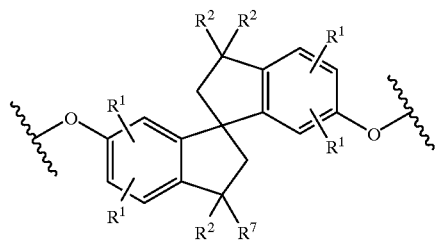

(IX)
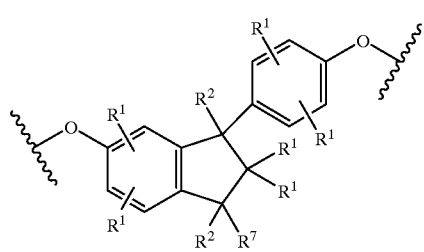

(X)
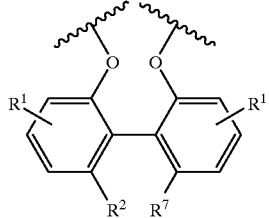

(XI)
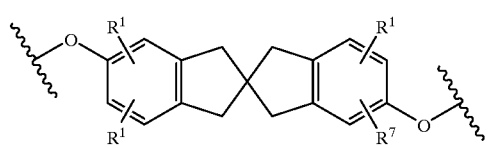

(XII)
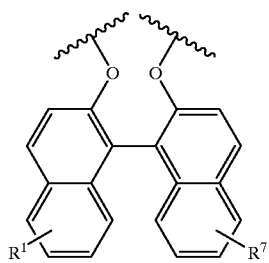

(XIII)
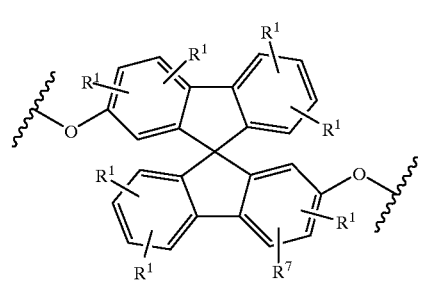

(XIV)
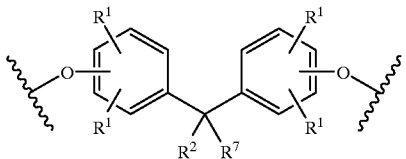

(XV)
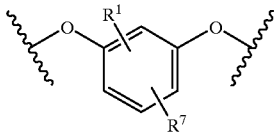

(XVI)
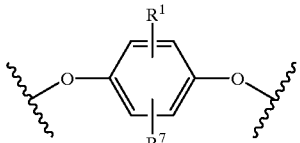

wherein at least one of $A^{31}$ and $A^{32}$ is said chiral moiety selected from formulae (IA), (IB), (IIA), (IIB), (IIIA), (IIIB), (IVA), (IVB), (VA), (VB), (VIA), (VIB), (VIIA), and (VIIB);

$A^3$ is a structural moiety having formula (XXIII); $A^{3'}$ is a structural moiety having, formula (XVIII), and $A^{3''}$ is a structural moiety having formula (XIX)

(XXIII)
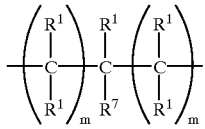

(XVIII)
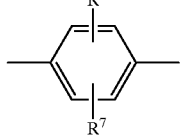

(XIX)
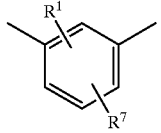

wherein each m in formula (XXIII) is independently 0 or an integer from 1 to 10;

wherein when $A^{31}$ is (IA), (IIA), (IIIA), (IVA), (VA), (VIA), or (VIIA), and $A^{32}$ is respectively (IB), (IIB), (IIIB), (IVB), (VB), (VIB), or (VIIB), or when $A^{31}$ is (IB), (IIB), (IIIB), (IVB), (VB), (VIB), or (VIIB), and $A^{23}$ is respectively (IA), (IIA), (IIIA), (IVA), (VA), (VIA), or (VIIA), then the mole fraction r of said structural units (32) corresponding to said $A^{32}$ differs from the mole fraction q of said structural units (31) corresponding to said $A^{31}$;

wherein each said structural unit of part (ii) is separated by at least one structural unit of part (i);

and wherein each wavy line indicates a point of attachment to said chiral polymer backbone, each $R^1$, $R^2$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, except in said selected moiety chemically bonded to said pendent sidegroup B, wherein $R^7$ is a radical through which said polymer backbone is chemically bonded.

42. The material of claim 9, wherein said nonlinear optical component is chemically bonded to the backbone of said chiral polymer as said pendent sidegroup, and said material comprises polymeric structural units having formulae (4), (5), and (6)

  (4)

  (5) and

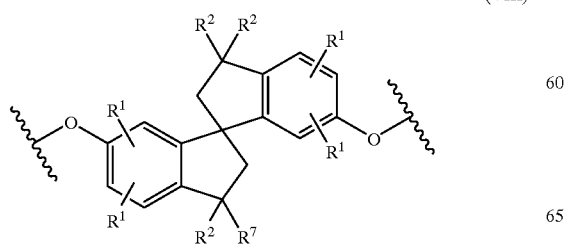  (6)

wherein B is said pendent sidegroup selected from the group of (NL1) through (NL12) which is chemically bonded to said chiral polymer backbone through $R^3$;

e is 0 or 1; wherein when e is 1, then said pendent sidegroup B is chemically bonded to $A^6$; and when e is 0, then said pendent sidegroup B is chemically bonded to $Z^2$ of said structural units (6);

c is the mole fraction of structural units (4), d is the mole fraction of structural units (5), and the quantity (1−(c+d)) is the mole fraction of structural units (6); wherein c and d each independently have a value from 0 to about 0.99, and the sum of c and d is from 0 to about 0.99;

$A^4$, $A^5$, and $A^6$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), (XX), and (XXI), or are each independently a single bond, —O—, —S—, —SO$_2$—, —CO—, —C(CH$_3$)$_2$—, —C(CD$_3$)$_2$—, or —C(CF$_3$)$_2$—

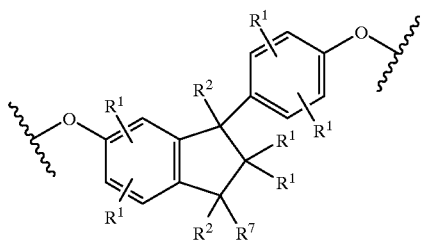 (IX)

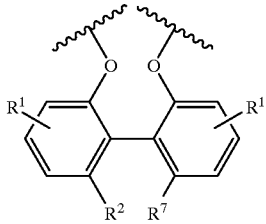 (X)

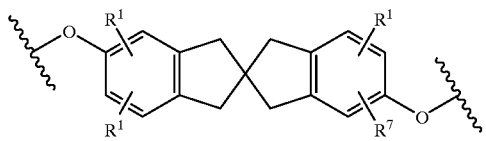 (XI)

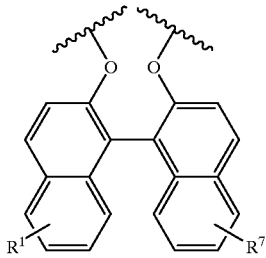 (XII)

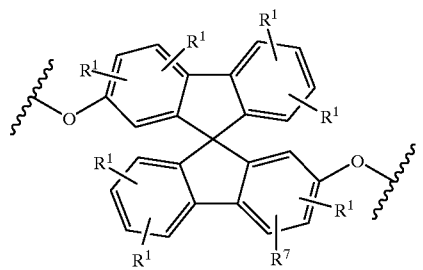 (XIII)

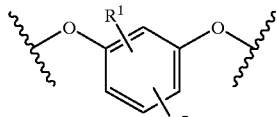 (XV)

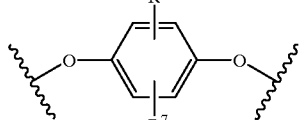 (XVI)

(XX)

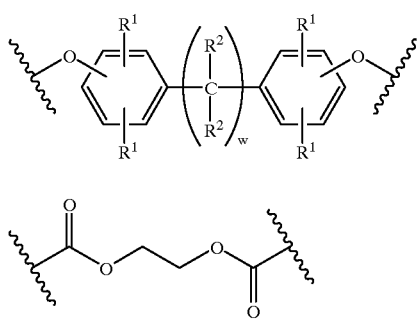

(XXI)

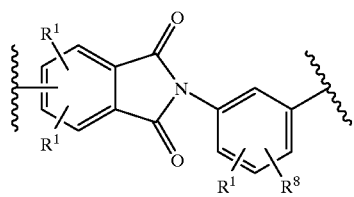

wherein w is 0 or 1;

wherein at least one of $A^4$, $A^5$, and $A^6$ is said chiral moiety selected from formulae (IA), (IB), (IIA), (IIB), (IIIA), (IIIB), (IVA), (IVB), (VA), (VB), (VIA), (VIB), (VIIA), and (VIIB);

wherein the sum of the mole fractions of said structural units (4), (5) and (6) containing said selected chiral moiety having formula (IA), (IIA), (IIIA), (IVA), (VA), (VIA), or (VIIA) differs from the sum of the mole fractions of said structural units (4), (5), and (6) containing a selected corresponding enantiomer (IB), (IIB), (IIIB), (IVB), (VB), (VIB), or (VIIB);

$Z^2$ is selected from the group of structural moieties having formulae (Z1), (Z2), (Z3), (Z4), (Z5), (Z6), (Z7), and (Z8)

(Z1)

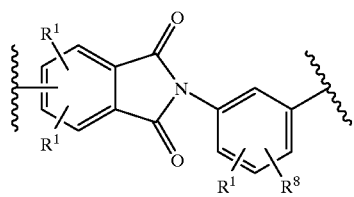

(Z2)

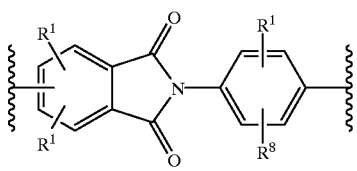

(Z3)

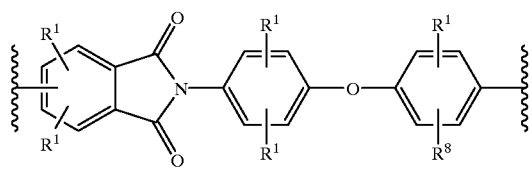

(Z4)

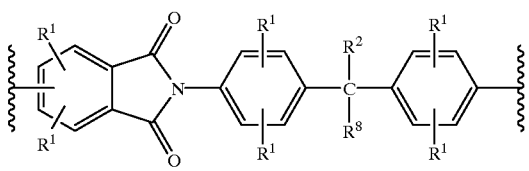

(Z5)

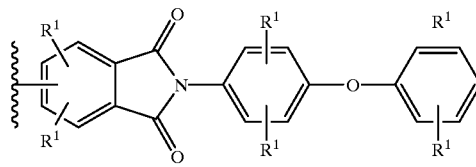

(Z6)

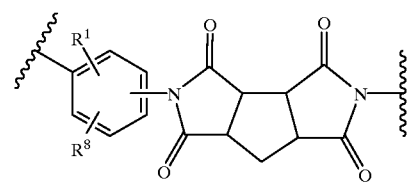

(Z7)

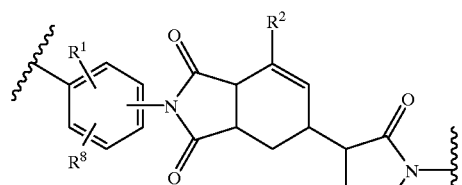

(Z8)

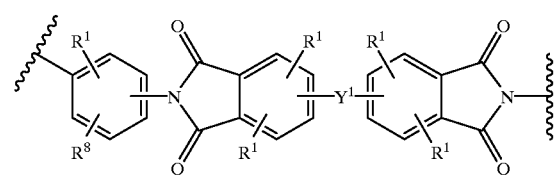

wherein $R^8$ is hydrogen, deuterium, alkyl, cycloalkyl, alkenyl, cycloalkenyl, aryl alkoxyaryl, alkylaryl, arylalkyl, alkoxy, alkoxyalkyl, aryloxyalkyl, haloalkyl, haloaryl, halogen, or a deuterated equivalent thereof; except in structural units (6) when said pendent side-group B is chemically bonded to $Z^2$, then $R^8$ in formulae (Z1) through (Z8) of structural units (6) is a radical through which said polymer backbone is chemically bonded to B;

$Y^1$ is a single bond or is selected from the group of —O—, —S—, —SO$_2$—, —CO—, —C(CH$_3$)$_2$—, —C(CD$_3$)$_2$—, and —C(CF$_3$)$_2$—, or from the group of structural moieties having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), (XX), and (XXI); except when c and d are both 0, then $Y^1$ is other than (IA), (IIA), (IIIA), (IVA), (VA), (VIA), or (VIIA) when $A^6$ is respectively formula (IB), (IIB), (IIIB), (IVB), (VB), (VIB), or (VIIB); and $Y^1$ is other than (IB), (IIB), (IIIB), (IVB), (VB), (VIB), or (VIIB) when $A^6$ is respectively formula (IA), (IIA), (IIIA), (IVA), (VA), (VIA), or (VIIA); and when c is 0, and d is other than 0, and $A^5$ and $A^6$ are each the same said selected chiral moiety, then $Y^1$ is other than (IA), (IIA), (IIIA), (IVA), (VA), (VIA), or (VIIA) when $A^5$ and $A^6$ each have respective formula (IB), (IIB), (IIIB), (IVB), (VB), (VIB), or (VIIB); and $Y^1$ is other than (IB), (IIB), (IIIB), (IVB), (VB), (VIB), or (VIIB) when $A^5$ and $A^6$ each have respective formula (IA), (IIA), (IIIA), (IVA), (VA), (VIA), or (VIIA);

$Z^1$ has structural formula (Z16') when $Z^2$ has formula (Z1), (Z2), (Z3), (Z4), or (Z5) and $Z^1$ has formula (Z17') when $Z^2$ has formula (Z6), (Z7), or (Z8)

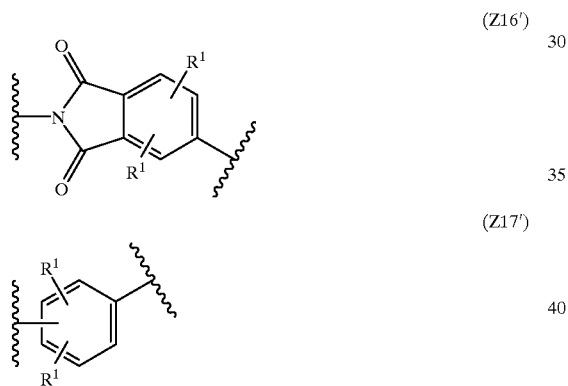

wherein each wavy line indicates a point of attachment to said chiral polymer backbone, each $R^1$, $R^2$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, except when said pendent sidegroup B is chemically bonded to $A^6$, then $R^7$ in $A^6$ is a radical through which said polymer backbone is chemically bonded to said pendent sidegroup B.

43. The material of claim 9, wherein said nonlinear optical component is chemically bonded to the backbone of said chiral polymer as said pendent sidegroup, wherein said material comprises polymeric structural units having formulae (17), (18), and (19)

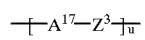 (17)

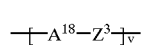 and (18)

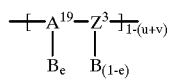 (19)

wherein B is said pendent sidegroup selected from the group of (NL1) through (NL12) which is chemically bonded to said chiral polymer backbone through $R^3$; e is 0 or 1; wherein when e is 1, then said pendent sidegroup B is chemically bonded to $A^{19}$; and when e is 0, then said pendent sidegroup B is chemically bonded to $Z^3$ of said structural units (19);

u is the mole fraction of structural units (17), v is the mole fraction of structural units (18), and the quantity (1−(u+v)) is the mole fraction of structural units (19) wherein u and v each independently have a value from 0 to about 0.99, and the sum of u and v is from 0 to about 0.99;

$A^{17}$, $A^{18}$, and $A^{19}$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), and (XX)

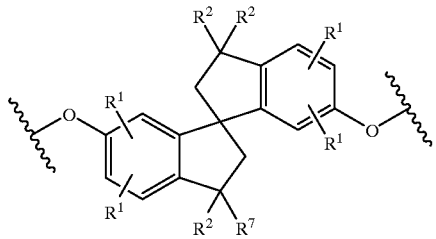 (VIII)

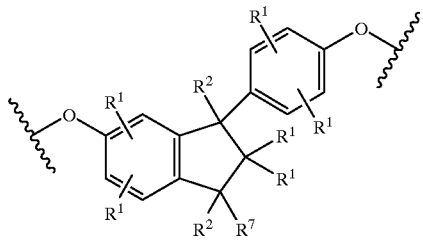 (IX)

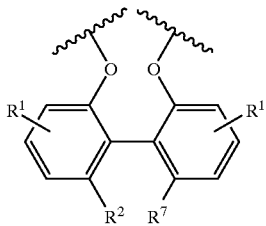 (X)

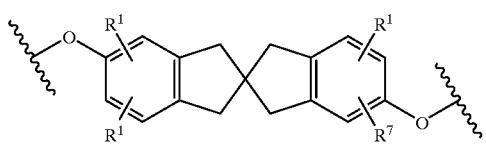 (XI)

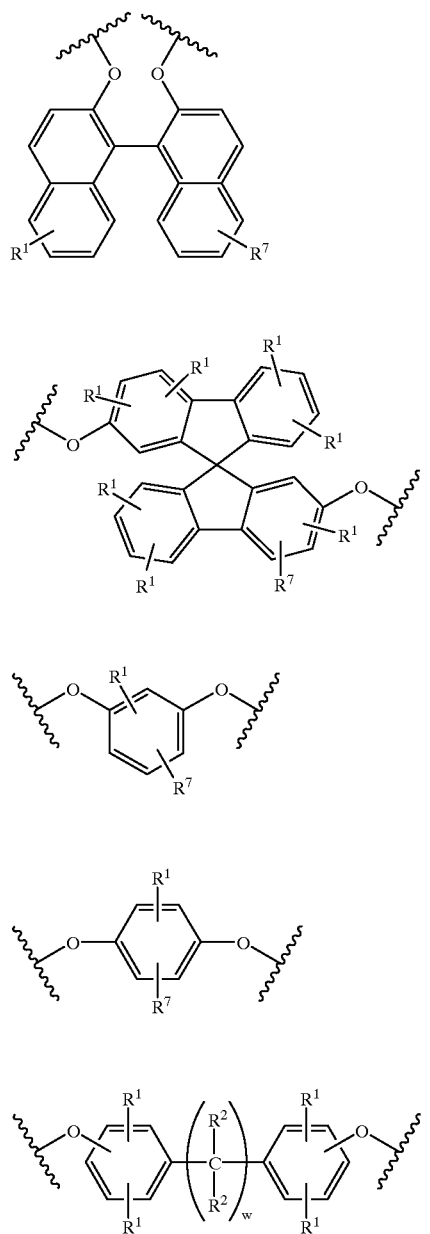

(XII)

(XIII)

(XV)

(XVI)

(XX)

wherein w is 0 or 1;

wherein at least one of $A^{17}$, $A^{18}$, and $A^{19}$ is said chiral moiety selected from formulae (IA), (IB), (IIA), (IIB), (IIIA), (IIIB), (IVA), (IVB), (VA), (VB), (VIA), (VIB), (VIIA), and (VIIB);

wherein the sum of the mole fractions of said structural units (17), (18) and (19) containing said selected chiral moiety having formula (IA), (IIA), (IIIA), (IVA), (VA), (VIA), or (VIIA) differs from the sum of the mole fractions of said structural units (17), (18), and (19) containing a selected corresponding enantiomer (IB), (IIB), (IIIB), (IVB), (VB), (VIB), or (VIIB);

$Z^3$ is a structural moiety selected from the group having formulae (Z10), (Z11), (Z12), and (Z13)

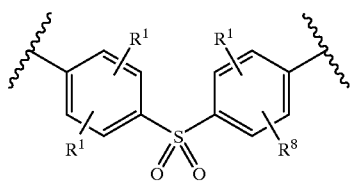

(Z10)

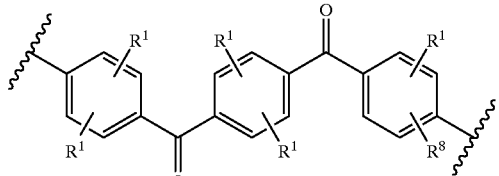

(Z11)

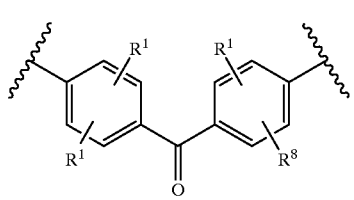

(Z12)

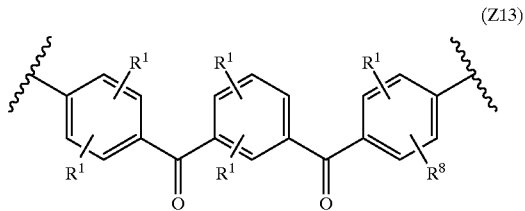

(Z13)

wherein $R^8$ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof; except in structural units (19) when said pendent sidegroup B is chemically bonded to $Z^3$, then $R^8$ in formulae (Z10) through (Z13) of structural units (19) is a radical through which said polymer backbone is chemically bonded to B;

wherein each wavy line indicates a point of attachment to said chiral polymer backbone, each $R^1$, $R^2$, and $R^7$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, except when said pendent sidegroup B is chemically bonded to $A^{19}$, then $R^7$ in $A^{19}$ is a radical through which said polymer backbone is chemically bonded to said pendent sidegroup B.

44. The material of claim 8, wherein said nonlinear optical component is a pendent sidegroup chemically bonded to the backbone of said chiral polymer, and said pendent sidegroup is selected from the group having formulae (NL18) through (NL28)

(NL18)
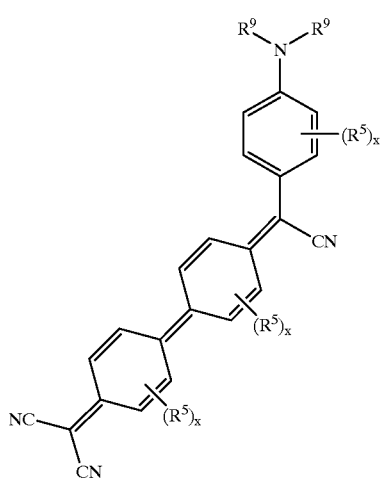
(NL21)
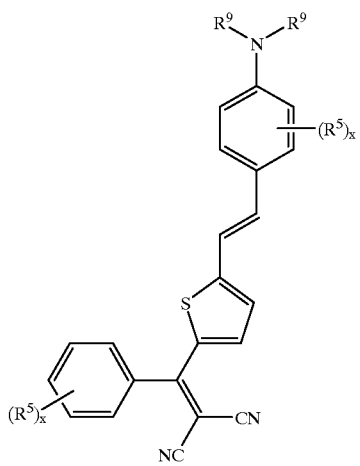
(NL19)
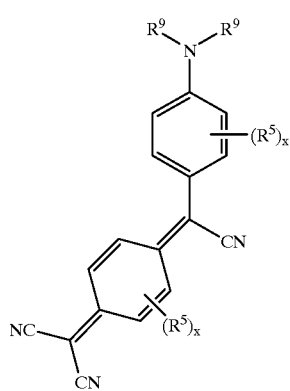
(NL22)
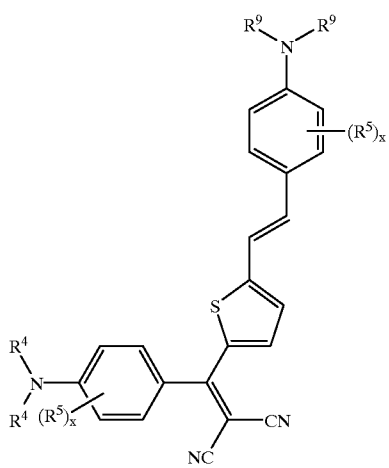
(NL20)
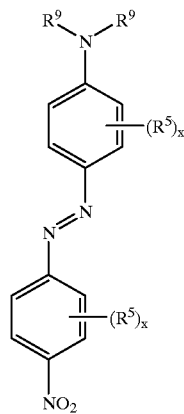
(NL23)
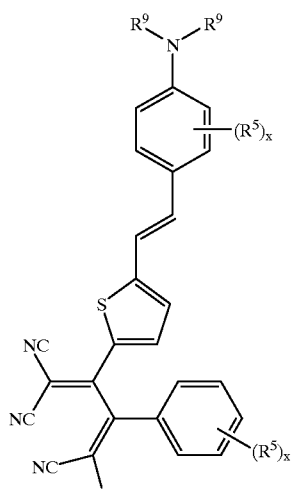

(NL24)

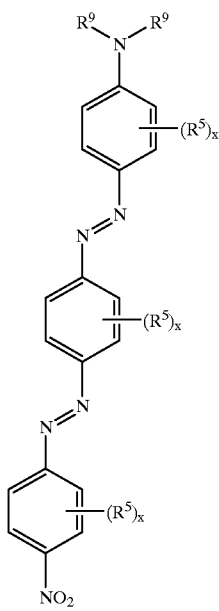

(NL25)

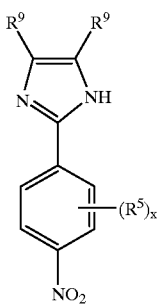

(NL26)

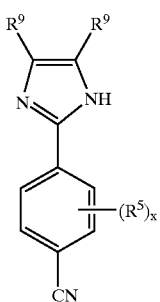

(NL27)

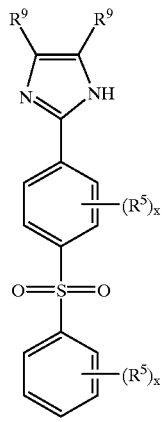

(NL28)

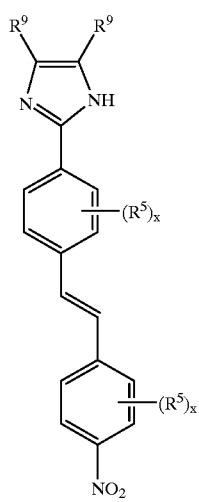

wherein said pendent sidegroup is chemically bonded to said chiral polymer backbone through each $R^9$, and each $R^9$ is independently a radical or an alkyl radical having from 1 to 6 carbon atoms or a deuterated equivalent thereof; and each $R^5$ is independently deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof; and each x is independently 0 or an integer from 1 to 4.

45. The material of claim 43 comprising polymeric structural units having formulae (7), (8), and (9)

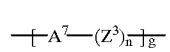 (7)

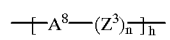 (8)

and

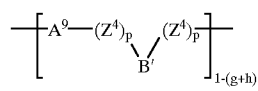 (9)

wherein g is the mole fraction of structure (7), h is the mole fraction of structure (8), and the quantity (1−(g+h)) is the mole fraction of structure (9); wherein g and h each independently have a value from 0 to about 0.99, and the sum of g and h is from 0 to about 0.99;

n is 0 or 1;

B' is said pendent sidegroup selected from the group of (NL18) through (NL28);

p is 0 when B' has formula (NL18), (NL19), (NL20), (NL21), (NL22), (NL23), or (NL24), and p is 1 when B' has formula (NL25), (NL26), (NL27), or (NL28);

$A^7$, $A^8$, and $A^9$ are each independently a structural moiety selected from the group having formulae (IA), (IB), (IIA), (IIB), (IIIA), (IIIB), (IVA), (IVB), (VA), (VB), (VIA), (VIB), (VIIA), (VIIB), (VIII), (IX), (X), (XI), (XII), (XIII), (XV), (XVI), and (XX)

(VIII)
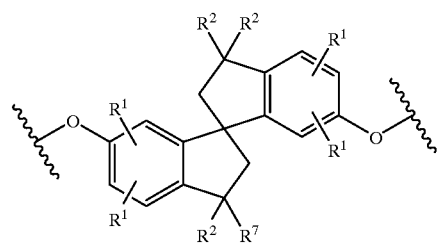

(IX)
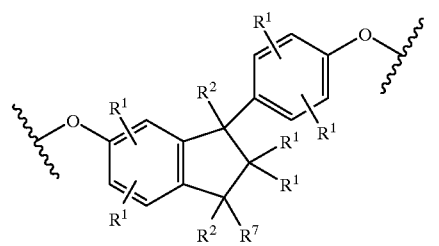

(X)
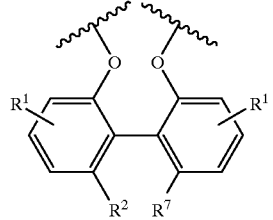

(XI)
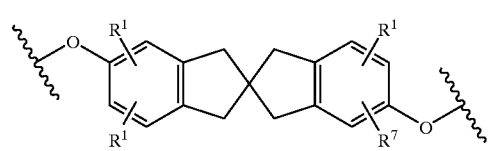

(XII)
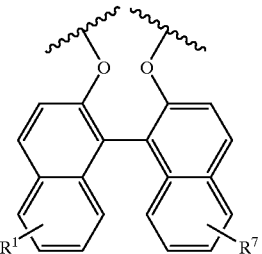

(XIII)
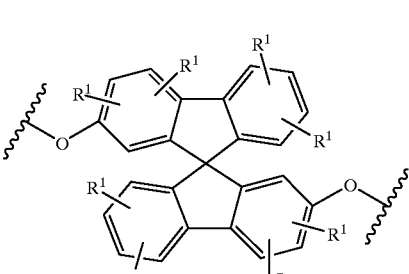

(XV)
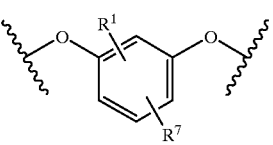

(XVI)
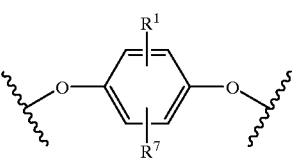

(XX)
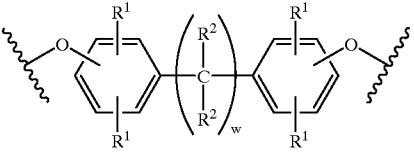

wherein w is 0 or 1;

wherein at least one of $A^7$, $A^8$, and $A^9$ is said chiral moiety selected from formulae (IA), (IB), (IIA), (IIB), (IIIA), (IIIB), (IVA), (IVB), (VA), (VB), (VIA), (VIB), (VIIA), and (VIIB);

wherein the sum of the mole fractions of said structural units (7), (8) and (9) containing said selected chiral moiety having formula (IA), (IIA), (IIIA), (IVA), (VA), (VIA), or (VIIA) differs from the sum of the mole fractions of said structural units (7), (8), and (9) containing a selected corresponding enantiomer (IB), (IIB), (IIIB), (IVB), (VB), (VIB), or (VIIB);

$Z^3$ is a structural moiety selected from the group having formulae (Z10), (Z11), (Z12), and (Z13)

(Z10) 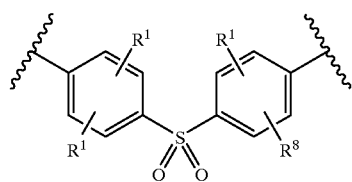

(Z11) 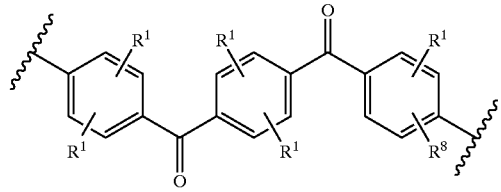

(Z12) 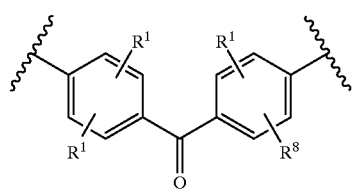

(Z13) 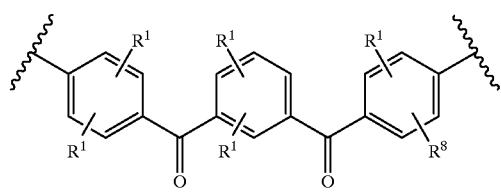

wherein R⁸ is hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, each Z⁴ is a structural moiety selected from the group having formulae (Z14) and (Z15)

(Z14) 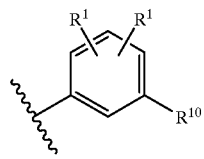

(Z15) 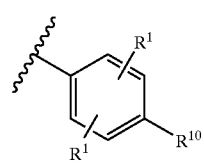

wherein each wavy line indicates a point of attachment to said chiral polymer backbone, each R¹, R², and R⁷ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, halogen, or a deuterated equivalent thereof, and R¹⁰ is a radical through which said chiral polymer backbone is chemically bonded to said sidegroup B'.

\* \* \* \* \*

UNITED STATES PATENT AND TRADEMARK OFFICE
CERTIFICATE OF CORRECTION

PATENT NO.   : 6,288,206 B1
DATED        : September 11, 2001
INVENTOR(S)  : Stewart et al.

It is certified that error appears in the above-identified patent and that said Letters Patent is hereby corrected as shown below:

<u>Title page,</u>
Inventors: delete "Janet L. Gordon, Clifton Park" and insert -- Janet L. Krahn, Schenectady, N.Y. --

<u>Column 81, claim 17,</u>
Line 59, delete "14" and insert -- 15 --

<u>Column 81, claim 18,</u>
Line 63, delete "16" and insert -- 17 --

<u>Column 100, claim 41,</u>
Line 56, delete "reach" and insert -- r each --

<u>Column 114, claim 45,</u>
Line 52, delete "43" and insert -- 44 --

Signed and Sealed this

Ninth Day of April, 2002

Attest:

Attesting Officer

JAMES E. ROGAN
Director of the United States Patent and Trademark Office